(12) United States Patent
Hanamura et al.

(10) Patent No.: US 6,895,052 B2
(45) Date of Patent: May 17, 2005

(54) CODED SIGNAL SEPARATING AND MERGING APPARATUS, METHOD AND COMPUTER PROGRAM PRODUCT

(75) Inventors: Tsuyoshi Hanamura, Tokyo (JP); Isao Nagayoshi, Tokyo (JP); Hiroyuki Kasai, Tokyo (JP); Hideyoshi Tominaga, c/o Global Information and Telecommunication Institute, Waseda University 3-10, Nishi-Waseda 1-chome, Shinjuku-ku, Tokyo (JP)

(73) Assignee: Hideyoshi Tominaga, Tokyo (JP)

( * ) Notice: Subject to any disclaimer, the term of this patent is extended or adjusted under 35 U.S.C. 154(b) by 777 days.

(21) Appl. No.: 09/931,038

(22) Filed: Aug. 17, 2001

(65) Prior Publication Data

US 2002/0054638 A1 May 9, 2002

(30) Foreign Application Priority Data

Aug. 18, 2000 (JP) ......................................... 2000-248514
Jun. 28, 2001 (JP) ......................................... 2001-197194

(51) Int. Cl.⁷ ............................ H04N 7/12; H04N 11/02

(52) U.S. Cl. ............................... 375/240.03; 375/240.2

(58) Field of Search ........................ 375/240.01–240.07, 375/240.12–240.16, 240.21, 240.22, 240.26, 240.2

(56) References Cited

U.S. PATENT DOCUMENTS

| | | | | |
|---|---|---|---|---|
| 6,208,745 B1 | * | 3/2001 | Florencio et al. | 382/100 |
| 6,275,536 B1 | * | 8/2001 | Chen et al. | 375/240.25 |
| 6,452,973 B1 | * | 9/2002 | Hwang | 375/240.27 |
| 6,498,865 B1 | * | 12/2002 | Brailean et al. | 382/239 |
| 6,625,211 B1 | * | 9/2003 | Etoh et al. | 375/240.03 |
| 6,639,943 B1 | * | 10/2003 | Radha et al. | 375/240.11 |
| 6,697,426 B1 | * | 2/2004 | Van Der Schaar et al. | 375/240.01 |

* cited by examiner

Primary Examiner—Chris Kelley
Assistant Examiner—David Czekaj
(74) Attorney, Agent, or Firm—Venable LLC; Andrew C. Aitken

(57) ABSTRACT

Herein disclosed a bit stream separating apparatus for inputting and transcoding an original MPEG-2 bit stream, and separating the transcoded MPEG-2 bit stream to generate a transcoded MPEG-2 bit stream and a differential bit stream, which is a differential bit stream between the original MPEG-2 bit stream and the transcoded MPEG-2 bit stream, and a bit stream merging apparatus for inputting and merging the transcoded MPEG-2 bit stream and the differential bit stream to reconstruct the original MPEG-2 bit stream. The bit stream separating apparatus makes it possible for the bit stream merging apparatus to reconstruct the original, high quality, MPEG-2 bit stream from the transcoded MPEG-2 bit stream already received and the differential bit stream, thereby eliminating the effort and time to send the original MPEG-2 bit stream again.

102 Claims, 33 Drawing Sheets

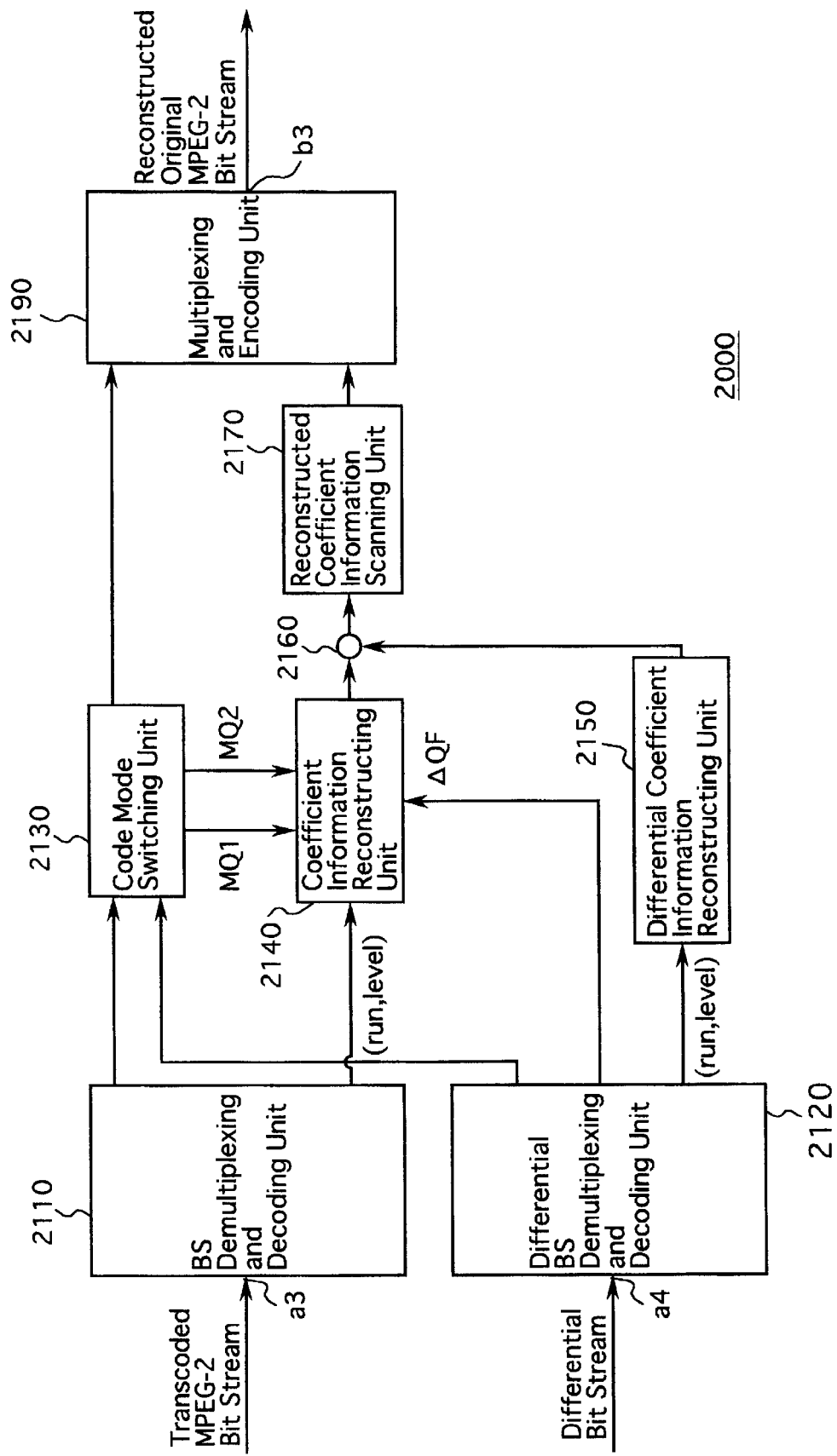

FIG. 6

(a) Sequence Header (Sequence Layer)

| Code Name | Contents | Bit Length[bit] |
|---|---|---|
| Sequence Header Code | Sequence Header Start Code | 32 |
| Sequence Start Code | Differential Sequence Layer Start Code | 32 |
| Original Bit Rate Value | Value of Bit Rate of Original MPEG-2 Bit Stream Divided by 400 | 18 |

(b) Picture Header (Picture Layer)

| Code Name | Contents | Bit Length[bit] |
|---|---|---|
| Picture Start Code | Picture Header Start Code | 32 |
| Temporal Reference | Temporal Reference Value of MPEG-2 Bit Stream | 10 |
| Picture Coding Type | Picture Coding Type | 2 |
| VBV Delay | Original VBV Delay Value | 16 |

(c) Slice Header (Slice Layer)

| Code Name | Contents | Bit Length[bit] |
|---|---|---|
| Slice Start Code | Slice Header Start Code | 32 |
| Slice MQ_m Value | SliceQuantization Parameter Reconstructing Code | 1–31 |

(d) MB Attribute Information (MB Layer)

| Code Name | Contents | Bit Length[bit] |
|---|---|---|
| MBAI | Differential MB Quantization Parameter Reconstructing Code Address and Previous Bit Stream MB Address | 1–11 |
| MQ_Δm Value | MB Quantization Parameter Reconstructing Code | 1–31 |
| CBP_y | Differential MB Brightness CBP Value String | 0–6 |
| CBP_uv | Differential MB Color-Difference CBP Value String | 0–4 |

FIG. 12

| |Δm| | Code Word |
|---|---|
| 0 | 0 |
| 1 | 10s |
| 2 | 110s |
| 3 | 1110s |
| 4 | 11110s |
| ...... | |

F I G. 1 3
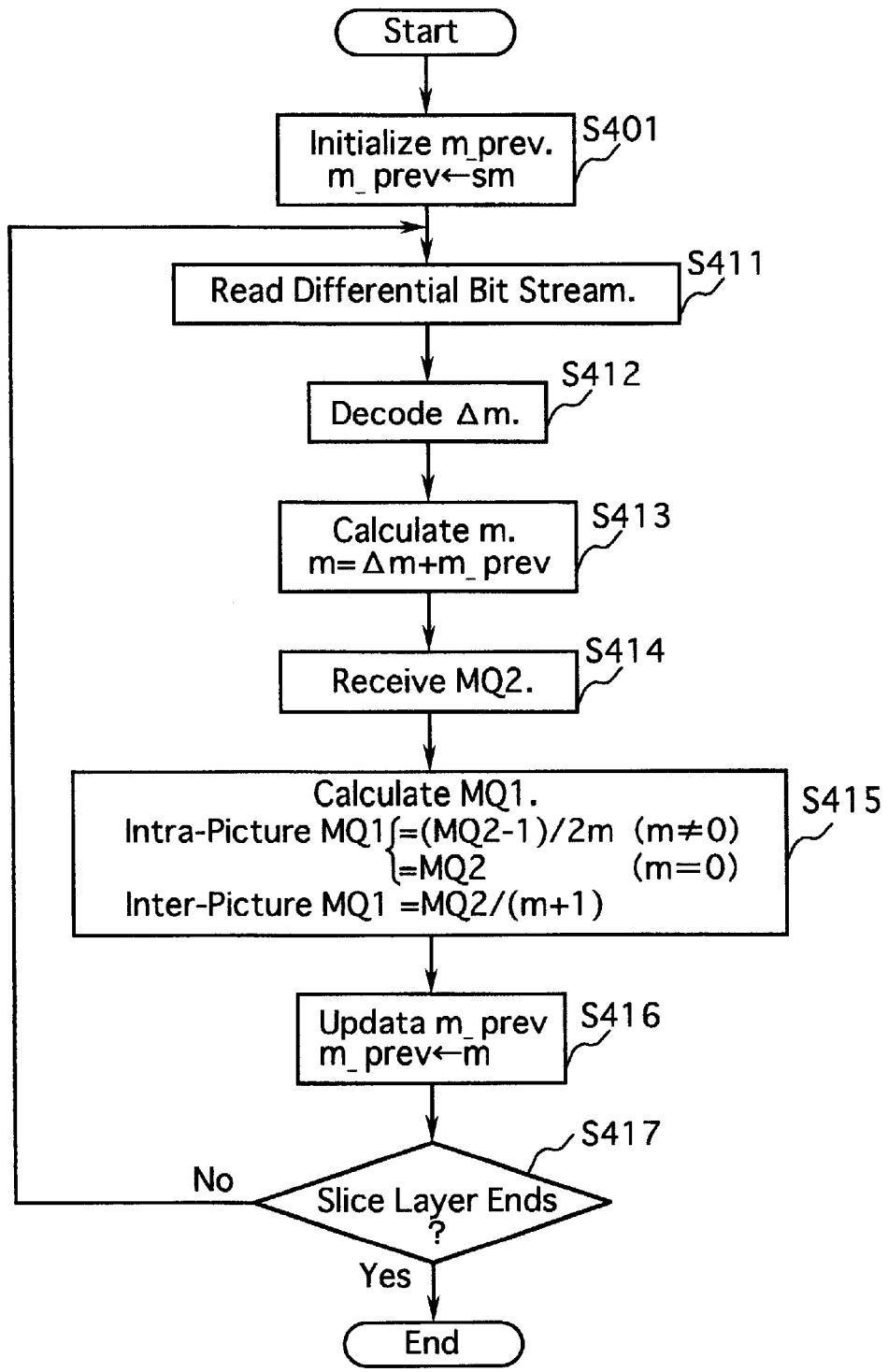

FIG. 16

(a) Code Word of CBP_y[](n_y=1)

| CBP_y[] | Code Word |
|---|---|
| 0 | 0 |
| 1 | 1 |

(b) Code Word of CBP_y[](n_y=2)

| CBP_y[] | Code Word |
|---|---|
| 00 | 110 |
| 01 | 111 |
| 10 | 10 |
| 11 | 0 |

(c) Code Word of CBP_y[](n_y=3)

| CBP_y[] | Code Word |
|---|---|
| 000 | 101110 |
| 001 | 1010 |
| 010 | 101111 |
| 011 | 100 |
| 100 | 10110 |
| 101 | 110 |
| 110 | 111 |
| 111 | 0 |

(d) Code Word of CBP_y[](n_y=4)

| CBP_y[] | Code Word |
|---|---|
| 0000 | 100010 |
| 0001 | 100011 |
| 0010 | 101100 |
| 0011 | 10010 |
| 0100 | 100110 |
| 0101 | 10011 |
| 0110 | 10000 |
| 0111 | 1100 |
| 1000 | 101101 |
| 1001 | 101111 |
| 1010 | 10100 |
| 1011 | 1101 |
| 1100 | 10101 |
| 1101 | 1110 |
| 1110 | 1111 |
| 1111 | 0 |

(e) Code Word of CBP_uv[](n_y=1)

| CBP_uv[] | Code Word |
|---|---|
| 0 | 0 |
| 1 | 1 |

(f) Code Word of CBP_uv[](n_y=2)

| CBP_uv[] | Code Word |
|---|---|
| 00 | 00 |
| 01 | 01 |
| 10 | 10 |
| 11 | 11 |

| \|run\| | Code Word |
|---|---|
| 0 | 0 |
| 1 | 10 |
| 2 | 1100 |
| 3 | 11010 |
| 4 | 111110 |
| 5 | 111100 |
| ... | ... |
| ... | ... |
| 62 | 111101110111111110 |
| 63 | 111101110111111111 |
| #EOB | 1110 |
| #ESC | 111101110111111 |

(b)

| \|run\| | Code Word |
|---|---|
| 0 | 0 |
| 1 | 100 |
| 2 | 1100 |
| 3 | 1010 |
| 4 | 11010 |
| 5 | 10110 |
| ... | ... |
| ... | ... |
| 62 | 10111110111101110 |
| 63 | 10111110111101111 |
| #EOB | 1110 |
| #ESC | 10111110111101 |

FIG. 22

| |level| | Code Word |
|---|---|
| 1 | 0s |
| 2 | 10s |
| 3 | 110s |
| 4 | 1110s |
| 5 | 11110s |
| 6 | 11111s |

FIG. 23

| $|\Delta QF|$ | Code Word |
|---|---|
| 0 | 0 |
| 1 | 10s |
| 2 | 110s |
| 3 | 1110s |
| 4 | 11110s |
| 5 | 111110s |
| 6 | 111111s |

FIG. 24

Differential Coefficient Information (3,1)(1,1)(1,1)(0,-1)(0,1)(1,-1)(2,1)(0,1)(2,1)(0,-1)EOB

0,-1,0,1,0,-1,0

(3,1)(1,1)(1,1)(0,-1)(0,1)(1,-1)(2,1)
(0,1)(2,1)(0,-1)EOB $\Delta QF[w] = \{0,-1,0,1,0,-1,0\}$ QFnonzero-out[w]
$= \{1,-1,1,2,1,-1,1\}$ QFnonzero-in[w]
$= \{2,-3,2,5,2,-3,2\}$

| 0 | ✗ | ✗ | 0 | 1 | 0 | 0 | 0 |
|---|---|---|---|---|---|---|---|
| 0 | 1 | ✗ | ✗ | -1 | -1 | 0 | 0 |
| 0 | ✗ | -1 | 0 | 1 | 0 | 0 | 0 |
| 1 | 1 | ✗ | 0 | 0 | 0 | 0 | 0 |
| 0 | 0 | 0 | 0 | 0 | 0 | 0 | 0 |
| ✗ | 1 | 0 | 0 | 0 | 0 | 0 | 0 |
| 1 | 0 | 0 | 0 | 0 | 0 | 0 | 0 |
| 0 | 0 | 0 | 0 | 0 | 0 | 0 | 0 |

✗ No Data or Not Defined

| 0 | 1 | -1 | 0 | 0 | 0 | 0 | 0 |
|---|---|---|---|---|---|---|---|
| 0 | 0 | 1 | 1 | 0 | 0 | 0 | 0 |
| 0 | 2 | 0 | 0 | 0 | 0 | 0 | 0 |
| 0 | 0 | -1 | 0 | 0 | 0 | 0 | 0 |
| 0 | 0 | 0 | 0 | 0 | 0 | 0 | 0 |
| 1 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

| 0 | 2 | -3 | 0 | 0 | 0 | 0 | 0 |
|---|---|---|---|---|---|---|---|
| 0 | 0 | 2 | 2 | 0 | 0 | 0 | 0 |
| 0 | 5 | 0 | 0 | 0 | 0 | 0 | 0 |
| 0 | 0 | -3 | 0 | 0 | 0 | 0 | 0 |
| 0 | 0 | 0 | 0 | 0 | 0 | 0 | 0 |
| 2 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

| 0 | 2 | -3 | 0 | 1 | 0 | 0 | 0 |
|---|---|---|---|---|---|---|---|
| 0 | 1 | 2 | 2 | -1 | -1 | 0 | 0 |
| 0 | 5 | -1 | 0 | 1 | 0 | 0 | 0 |
| 1 | 1 | -3 | 0 | 0 | 0 | 0 | 0 |
| 0 | 0 | 0 | 0 | 0 | 0 | 0 | 0 |
| 2 | 1 | 0 | 0 | 0 | 0 | 0 | 0 |
| 1 | 0 | 0 | 0 | 0 | 0 | 0 | 0 |
| 0 | 0 | 0 | 0 | 0 | 0 | 0 | 0 |

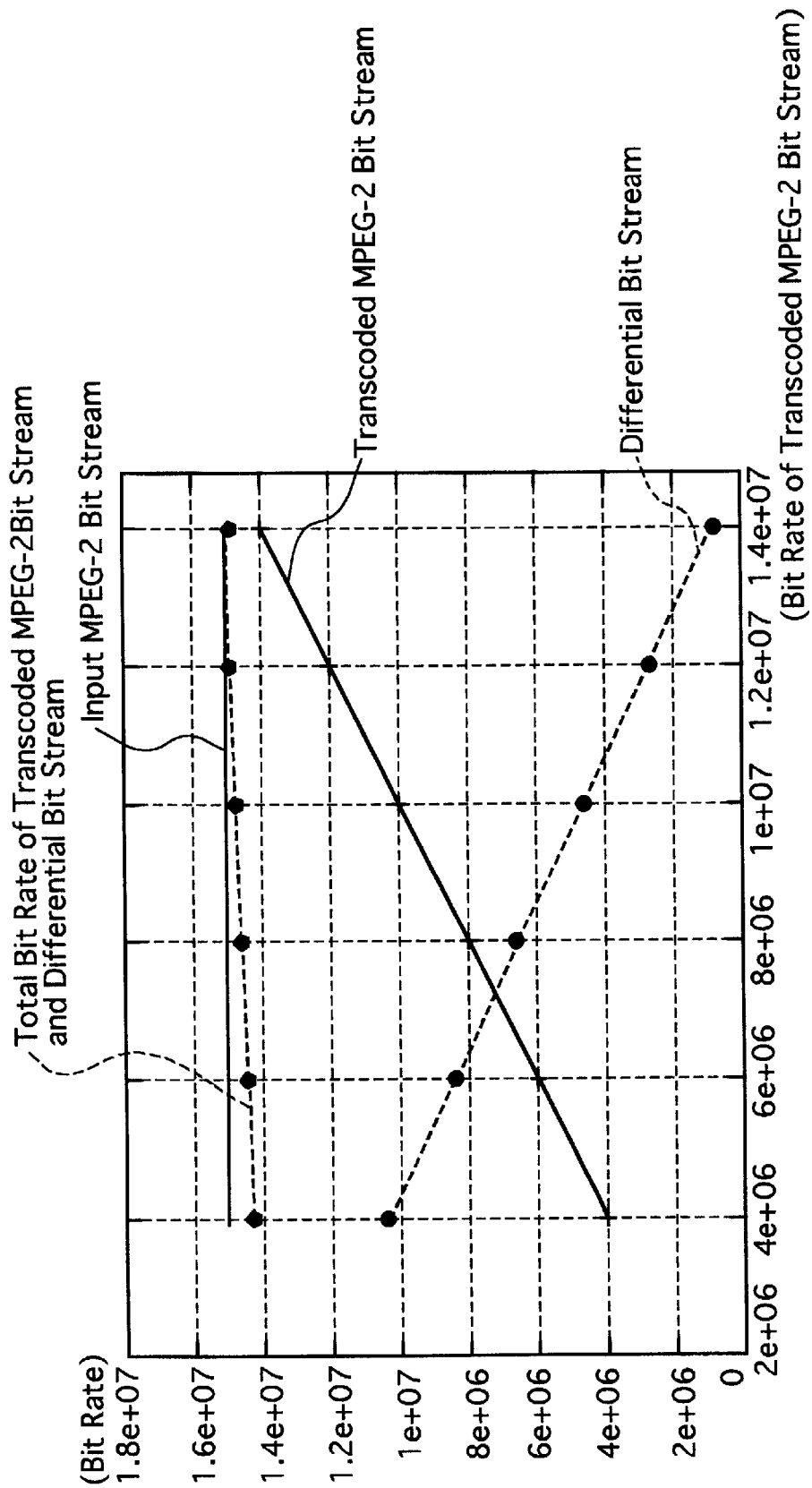
F I G. 2 5

FIG. 26

| Layer | Sequence | GOP | Upper Layer / Picture | | |
|---|---|---|---|---|---|
| Original MPEG-2 BS | Sequence Header SHC:0000 01B3(H) | GOP Header GSC:0000 01B8(H) | Picture Header PSC:0000 0100(H), TR(Before),PCT(Before),VBV_Delay(Before) | | Picture Coding Extension (Before Transcoding) |
| Transcoded MPEG-2 BS | Sequence Header SHC:0000 01B3(H) | GOP Header GSC:0000 01B8(H) | Picture Header PSC:0000 0100(H), TR(After),PCT(After),Vbv_Delay(After) | | Picture Coding Extension (After Transcoding) |
| Differential BS | Sequence Header SHC | None | Picture Header PSC ,TR(After),PCT(After),VBV Delay(Before) | | None |
| Remarks | SHC same as original MPEG-2 | | TR:Same as the One After Transcoding PCT:Same as the One After Transcoding VBV Delay:Same as the One Before Transcoding | | |

| Layer | Upper Level / Slice | Middle Layer / Macroblock | Lower Layer / Block | |
|---|---|---|---|---|
| Original MPEG-2 BS | Slice Header SSC:0000 01AF(H) ,QSC(SMQ1) | MB Attribute Information MBAI(Before),QSC(MQ1) ,CBP(CBPin) | Coefficient Information (Before) | |
| Transcoded MPEG-2 BS | Slice Header SSC:0000 01AF(H) ,QSC(SMQ2) | MB Attribute Information MBAI(After),QSC(MQ2) ,CBP(CBPout) | Coefficient Information (After) | |
| Differential BS | Slice Header SSC ,Slice MQm Value(sm) | MB Attribute Information MBAI(Difference),MQΔmVlue(Δm) ,CBP y,CBP uv | Coefficient Information (Difference) Zero Conversion Coefficient Information ((run-Length,Level)×n),EOB,Non-Zero Conversion Coefficient Information (Prediction Error ΔQF) | |
| Remarks | Slice MQm Value :Variable Length Code of sm Constant Used to Reconstruct SMQ2 | Δm=m- prev(Intialm prev=sm) m:Calculated Value,Constant Used to Reconstruct MQ2 | ΔQF=QF1 -《QF2×MQ2/MQ1+1/2》 (《》 Is Intended to Mean Rounding Operation | |

QSC:MQuant (H) Is Intended to Mean Hexadecimal Number
(Before) is intended to mean Before the Transcoding Operation
(After) is intended to mean After the transcoding operation

CODED SIGNAL SEPARATING AND MERGING APPARATUS, METHOD AND COMPUTER PROGRAM PRODUCT

BACKGROUND OF THE INVENTION

1. Field of the Invention

The present invention relates to apparatuses, methods and computer program products for separating and merging a coded moving picture sequence signals, and more particularly, to apparatuses, methods and computer program products for transcoding a first coded moving picture sequence signal to separate into and generate a second coded moving picture sequence signal and a differential coded moving picture sequence signal, which is a difference between the first coded moving picture sequence signal and the second coded moving picture sequence signal, and merging the second coded moving picture sequence signal and the differential coded moving picture sequence signal to reconstruct the first coded moving picture sequence signal.

2. Description of the Related Art

There has so far been proposed a wide variety of systems for compressing and encoding a moving picture having a considerable amount of data to produce a coded moving picture sequence signal. The international standard, ISO-IEC 13818, was created for a system operable to encode a digital video signal with an associated digital audio signal and commonly called "Moving Picture Expert Group Phase 2", i.e., "MPEG-2". In such an encoding system, the coded moving picture sequence signal is outputted in the form of bit streams. In particular, the bit streams conformable to the above MPEG-2 standard will be referred to as "MPEG-2 bit streams" hereinlater. Recently, the system of this type becomes more utilizable for various technical fields, such as a communications system, a television broadcasting service system, and so on.

The above MPEG-2 bit stream have a hierarchical structure consisting of: in turn, a top, sequence layer; a GROUP OF PICTURES layer; a picture layer; a slice layer; a macroblock layer; and a low, block layer.

The typical encoder is operable under the MPEG-2 standard through a method of compressing and encoding a moving picture as follows. The method comprises the steps of:

(a) inputting the moving picture sequence consisting of a series of pictures;
(b) temporally storing the series of pictures as frames in memories, respectively;
(c) computing a difference between one frame and another frame to eliminate redundancy in a time axis direction; and
(d) orthogonal transforming, e.g., discrete cosine transforming (DCT), a plurality of picture elements within each of the frames to eliminate redundancy in a spatial axis direction.

The encoder thus constructed can compress and encode the moving picture to generate and output a coded moving picture sequence signal in the form of the MPEG-2 bit stream through a transmitting path at a predetermined bit rate. The coded moving picture sequence signal is then transmitted from the encoder to a decoder which is operated to decode the coded signal to reproduce the moving picture.

The typical decoder is operated to decode the coded moving picture sequence signal through a so-called bi-directionally predicting method which comprises the steps of:

(a) storing one reproduced picture, generally referred to as "intra-picture", i.e., "I-picture", in a first frame memory;
(b) estimating another picture generally referred to as "predictive-picture", i.e., "P-picture", followed by the I-picture, on the basis of the information on a difference between the I-picture and P-picture;
(c) storing the estimated P-picture in a second frame memory; and
(d) estimating further another picture interposed between the I-picture and P-picture, generally referred to as "bi-directionally predictive-picture", i.e., "B-picture".

Here, the I-picture is encoded independently of the pictures of the other types, so that an I-picture can be reproduced as a single static image only by itself. A P-picture can be predicted on the basis of the I-picture or another P-picture located on a position prior to the P-picture to be encoded. I-picture is referred to as "intra-picture" while P-picture and B-picture are referred to as "inter-pictures".

In the above encoder, the amount of information on the coded moving picture sequence signal is, however, variable. In particular, the amount of information increases remarkably when a scene is changed. The decoder is generally provided with an input buffer for receiving the coded moving picture sequence signal from the encoder. The input buffer of the decoder, however, has a limited storage capacity. Therefore, when a large number of bits of the coded moving picture sequence signal are transmitted from the encoder to the decoder, the input buffer overflows with the bits of the coded moving picture sequence signal thereby making the decoder difficult to process the coded moving picture sequence signal. In order to transmit such coded moving picture sequence signal having a variable number of bits through the transmitting path at a predetermined bit rate and to make it possible for any decoder to receive the whole of the coded moving picture sequence signal without overflow, the encoder comprises: an output buffer for temporally storing the coded moving picture sequence signal before transmitting the coded moving picture sequence signal through the transmitting path; and a rate controller for controlling the amount of bits of the coded moving picture sequence signal stored in the output buffer so as to keep the amount of bits of the coded moving picture sequence signal to be transmitted to the decoder for a predetermined time from exceeding the capacity of the input buffer of the decoder, thereby controlling the bit rate of the coded moving picture sequence signal.

A typical rate controlling method in MPEG-2 standard is described in "ISO-IEC/JTC1/SC29/WG11/N0400 Test Model 5", April, 1993, hereinlater referred to as "TM-5". The rate controlling method according to the TM-5 comprises the steps of:

(I) allocating a target number of bits to a picture of each type on the basis of the total number of bits, i.e., R, available to the pictures to be encoded in the GROUP OF PICTURES;
(II) computing the reference value of a quantization parameter used for the quantization of each of macroblocks in the picture on the basis of the utilization capacity of a "virtual buffer" to perform the rate control; and
(III) modulating the reference value of the quantization parameter in accordance with the spatial activity in the macroblock.

Furthermore, there are many types of decoders. For instance, a decoder is designed to decode the coded signal in a unique compression format different from that of the MPEG-2 bit stream, and another decoder is connectable to a transmitting path having a different bit rate. The decoder of those types is therefore required to provide with an apparatus, a so-called transcoder, for converting the MPEG-2 bit streams into another appropriate coded signal in the specified format having the required bit rate. The transcoder makes it possible for the encoder to transmit the coded signal to any types of decoders.

Referring to FIG. 27 of the drawings, there is shown a transcoder of one typical type as a first conventional transcoder 50. The conventional transcoder 50 has an input terminal $a_1$ electrically connected to a first transmitting path, not shown, and an output terminal $a_2$ electrically connected to a second transmitting path, not shown. The conventional transcoder 50 is designed to input first bit streams $b_1$ at a predetermined input bit rate through the input terminal $a_1$, to convert the first bit streams $b_1$ into second bit streams $b_2$ to be outputted at a predetermined output bit rate, i.e., a target bit rate, lower than the input bit rate of the inputted first bit streams $b_1$, and then to output the second bit streams $b_2$ through the output terminal $a_2$. The conventional transcoder 50 comprises a variable length decoder 51, referred to as "VLD" in the drawings, an inverse quantizer 53, referred to as "IQ" in the drawings, a quantizer 55, referred to as "Q" in the drawings, a variable length encoder 57, referred to as "VLC" in the drawings, and a rate controller 59.

The variable length decoder 51 is electrically connected to the input terminal $a_1$ and designed to decode a coded moving picture sequence signal within the first bit streams $b_1$ inputted through the input terminal $a_1$ to reconstruct original picture data for each of pictures including a matrix of original quantization coefficients, referred to as "level", for each of macroblocks within each of the pictures and an original quantization parameter, hereinlater referred to as "first quantization parameter $Q_1$".

The inverse quantizer 53 is electrically connected to the variable length decoder 51 and designed to input the matrix of original quantization coefficients level from the variable length decoder 51 and the first quantization parameter $Q_1$. The inverse quantizer 53 is further designed to inversely quantize the inputted matrix of original quantization coefficients level with the first quantization parameter $Q_1$ to generate a matrix of inveres-quantization coefficients, referred to as "dequant", i.e., DCT coefficients, for each of macroblocks as follows:

$$dequant = \{2 \times level + \text{sign}(level)\} \times \frac{Q_1 \times QM}{32} \quad \text{equation (a1)}$$

or $$dequant = level \times \frac{Q_1 \times QM}{16} \quad \text{equation (a2)}$$

where the equation (a1) is used for the intra-picture while the equation (a2) is used for the inter-picture. QM is a matrix of quantization parameters stored in a predetermined quantization table. The first quantization parameter $Q_1$ and the matrix of quantization parameters QM are derived from the inputted first bit streams $b_1$ by the decoder 51. Here, the original quantization coefficients level, the inverse-quantization coefficients dequant, the matrix of quantization parameters QM, and the first quantization parameter $Q_1$ are integers. The inverse-quantization coefficients dequant calculated by the equations (a1) and (a2) should be rounded down to the nearest one.

The quantizer 55 is electrically connected to the inverse quantizer 53 and designed to input the matrix of inverse-quantization coefficients dequant from the inverse quantizer 53 and then quantize the inputted matrix of inverse-quantization coefficients dequant for each of macroblocks with a second quantization parameter, referred to as "$Q_2$" hereinlater, to generate a matrix of re-quantization coefficients, referred to as "tlevel", as follows:

$$tlevel = dequant \times \frac{16}{Q_2 \times QM} \quad \text{equation (a3)}$$

or $$tlevel = dequant \times \frac{16}{Q_2 \times QM} + \text{sign}(dequant) \times \frac{1}{2} \quad \text{equation (a4)}$$

where the equation (a3) is used for the inter-picture, while the equation (a4) is used for the inter-picture. The second quantization parameter $Q_2$ is obtained by the rate controller 59. Here, the re-quantization coefficients tlevel and the second quantization parameter $Q_2$ are also integers. The re-quantization coefficients tlevel calculated by the equations (a3) and (a4) should be rounded down to the nearest one. Such rounding operation for the integers will be omitted from the later description for avoiding tedious repetition.

The variable length encoder 57 is electrically connected to the quantizer 55 and designed to input the re-quantization coefficients tlevel from the quantizer 55 and then encode the inputted matrix of the re-quantization coefficients tlevel to generate objective picture data for each of pictures to sequentially output the objective picture data in the form of the second bit streams $b_2$ through the output terminal $a_2$. The variable length encoder 57 is further electrically connected to the variable length decoder 51 and designed to input a diversity of information data included in the first bit streams $b_1$ necessary for the second bit streams $b_2$ from the variable length decoder 51.

The rate controller 59 is electrically connected to the inverse quantizer 53 and designed to perform rate control process in accordance with the TM-5 on the basis of the information obtained from the inverse quantizer 53 as described below.

Referring to FIG. 28 of the drawings, there is shown a flowchart of the rate controlling process in accordance with the TM-5 carried out in the conventional transcoder 50. As shown in FIG. 20, the rate controlling process comprises steps A1 to A14.

In the step A1, "1" is assigned to a picture number variable n representing the serial number of a picture within the first bit streams $b_1$. Hereinlater, a n-th picture in the first bit streams $b_1$ is referred to as "pic(n)".

In the following step A2, a global complexity measure, referred to as $X_i$, $X_p$, or $X_b$, for a picture of the corresponding type, i.e., I, P or B-picture is computed as follows:

$$X_i = S_i \times Q_i \quad \text{equation (a5)}$$

or $$X_p = S_p \times Q_p \quad \text{equation (a6)}$$

or $$X_b = S_b \times Q_b \quad \text{equation (a7)}$$

where $S_i$, $S_p$, or $S_b$ is the number of bits generated for an encoded I, P or B-picture, and $Q_i$, $Q_p$, or $Q_b$ is the average quantization parameter computed by averaging the actual quantization values used during the quantization of the all macroblocks within I, P or B-picture. The average quantization parameters $Q_1$, $Q_p$, and $Q_b$ are normalized within a range of 1 to 31. The average quantization parameters $Q_i$, $Q_p$, and $Q_b$ respectively correspond to the first quantization parameters $Q_1$ obtained from the variable length decoder 51.

The global complexity measure $X_i$, $X_p$, or $X_b$ of the corresponding picture is inversely proportional to the compressing ratio of the moving picture, namely, the ratio of the amount of information in the second bit streams $b_2$ to that in the first bit streams $b_1$. Namely, as the amount of information in the first bit streams $b_1$ becomes larger, the compressing ratio is decreased. Therefore, the global complexity measure $X_i$, $X_p$, or $X_b$ of the corresponding picture becomes larger, as the compressing ratio is decreased. In contrast, the global complexity measure $X_i$, $X_p$, or $X_b$ of the corresponding picture becomes smaller, as the compressing ratio is increased.

The initial value of global complexity measure $X_i$, $X_p$, or $X_b$ of the corresponding picture is given as follows:

$$X_i = 160 \times \text{Target\_Bitrate}/115 \quad \text{equation (a8)}$$

or $$X_p = 60 \times \text{Target\_Bitrate}/115 \quad \text{equation (a9)}$$

or $$X_b = 42 \times \text{Target\_Bitrate}/115 \quad \text{equation (a10)}$$

where Target_Bitrate is measured in bits/s and corresponds to the target bit rate of the first conventional transcoder 50.

In the following step A3, the target number of bits for a picture of the corresponding type, i.e., I, P or B-picture to be encoded in the current GROUP OF PICTURES, referred to as $T_i$, $T_p$, or $T_b$ is computed as:

$$T_i = \frac{R}{1 + \frac{N_p X_p}{X_i K_p} + \frac{N_b X_b}{X_i K_b}} \quad \text{equation (a11)}$$

or $$T_p = \frac{R}{N_p + \frac{N_b K_p X_b}{K_b X_p}} \quad \text{equation (a12)}$$

or $$T_b = \frac{R}{N_b + \frac{N_p K_b X_p}{K_p X_b}} \quad \text{equation (a13)}$$

where $N_p$ and $N_b$ are the number of P-pictures and B-pictures remained not yet encoded in the current GROUP OF PICTURES, respectively. $K_p$ and $K_b$ are constants computed on the basis of the ratio of the quantization value of P-picture to the quantization value of I-picture, and the ratio of the quantization parameter of B-picture to the quantization value of I-picture, respectively. When it is assumed that the quality of the image can be always optimized with $K_p=1.0$ and $K_b=1.4$.

In the following step A4, it is judged upon whether the picture number variable n is "1" or not, i.e., the current picture is the first picture pic(1) or not. When it is judged that the picture number variable n is "1", i.e., the current picture is the first picture pic(1), the step A4 goes forward to the step A5. When, on the other hand, it is judged that the picture number variable n is not "1", i.e., the current picture is not the first picture, the step A4 goes forward to the step A6. In the step A5, the total number of bits available to the pictures to be encoded in the current GROUP OF PICTURES, i.e., the remaining number of bits available to the GROUP OF PICTURES, hereinlater referred to as R, is initialized in accordance with the following equation (a14). This remaining number of bits available to the GROUP OF PICTURES R is computed before encoding the first picture pic(1) within the GROUP OF PICTURES, as follows:

$$R = \text{Target\_Bitrate} \times \text{NPIC}/\text{picture\_rate} + R \quad \text{equation (a14)}$$

where NPIC is the total number of pictures of any type in the GROUP OF PICTURES, and picture_rate is expressed in the number of pictures decoded and indicated per second. At the start of the sequence R=0.

In the step A6, the above remaining number of bits available to the GROUP OF PICTURES R is updated before encoding the current picture pic(n) as follows:

$$R = R - S_i \quad \text{equation (a15)}$$

or $$R = R - S_p \quad \text{equation (a16)}$$

or $$R = R - S_b \quad \text{equation (a17)}$$

where $S_i$, $S_p$, or $S_b$ is the number of bits generated in the previously encoded picture pic(n−1) of the corresponding type (I, P or B).

The step A5 or A6 goes forward to the step A7 wherein "1" is assigned to a macroblock number variable j (j>=1) representing the serial number of a macroblock within one of the pictures. Hereinlater, the j-th macroblock in the picture is referred to as "MB(j)".

In the following step A8, a utilization volume of the capacity of a virtual buffer for I, P or B-pictures, referred to as $d_i(j)$, $d_p(j)$ or $d_b(j)$, is computed before encoding the macroblock MB(j) as follows:

$$d_i(j) = d_i(0) + B(j-1) - \frac{T_i \times (j-1)}{NMB} \quad \text{equation (a18)}$$

or $$d_p(j) = d_p(0) + B(j-1) - \frac{T_p \times (j-1)}{NMB} \quad \text{equation (a19)}$$

or $$d_b(j) = d_b(0) + B(j-1) - \frac{T_b \times (j-1)}{NMB} \quad \text{equation (a20)}$$

where B(j−1) is the total number of bits generated for encoded macroblocks in the picture up to and including the (j−1)th macroblock MB(j−1). NMB is the total number of macroblocks in the picture. $d_i(j)$, $d_p(j)$, or $d_b(j)$ is the utilization volume of the capacity of the virtual buffer at the j-th macroblock MBA) for I, P, or B-picture.

$d_i(0)$, $d_p(0)$, or $d_{b(0)}$ is the initial utilization volume of the virtual buffer for I, P, or B-picture and given by:

$$d_i(0) = 10 \times r/13 \quad \text{equation (a21)}$$

or $$d_p(0) = K_p \times d_i(0) \quad \text{equation (a22)}$$

or $$d_{b(0)} = K_b \times d_i(0) \quad \text{equation (a23)}$$

where r is referred to as "reaction parameter" and used for the control of the reaction rate of the feed back loop as follows:

$$r = 2 \times \text{Target\_Bitrate}/\text{picture\_rate} \quad \text{equation (a24)}$$

The final utilization volume of the virtual buffer, referred to as, $d_I(NMB)$, $d_P(NMB)$, or $d_b(NMB)$ of the last macroblock, i.e., NMB-th macroblock MB(NMB) of the current picture pic(n) will be used as the initial utilization volume of the virtual buffer for I, P, or B-picture, i.e., $d_I(0)$, $d_P(0)$, or $d_{b(0)}$ of the same type to encode the first macroblock MB(1) within the next picture pic(n+1).

In the following step A9, the reference quantization parameter Q(j) of the j-th macroblock MB(j) for each of the pictures is computed on the basis of the aforesaid utilization volume of the virtual buffer, i.e., d(j) as follows:

$$Q(j)=d(j)\times 31/r \qquad \text{equation (a25)}$$

Here, the reference quantization parameter Q(j) is identical with the aforesaid second quantization parameter $Q_2$ of the j-th macroblock MB(j).

In the following step A10, the j-th macroblock MB(j) is quantized with the reference quantization parameter Q(j) computed in the step A9. In the following step A11, the macroblock number variable j is incremented by one. The step A11 goes forward to the step A12 wherein it is judged upon whether the macroblock number variable j is more than the total number of macroblocks NMB within the n-th picture pic(n) or not. When it is judged that the macroblock number variable j is not more than the total number of macroblocks NMB within the n-th picture pic(n), the step A12 returns to the step A8. When, on the other hand, it is judged that the macroblock number variable j is more than the total number of macroblocks NMB within the n-th picture pic(n), the step A12 goes forward to the step A13.

The macroblock number variable j thus serves as a loop counter for repeating the process from the steps A8 to A11 to encode all the macroblocks from the $1^{st}$ macroblock MB(1) up to the j-th macroblock MB(j) in the present picture pic(n). The entire macroblocks starting from the first macroblock MB(1) up to the NMB-th macroblock MB(NMB) in the n-th picture pic(n) can be thus encoded sequentially.

In the step A13, the picture number variable n is incremented by one. Then the step A13 goes forward to the step A14 wherein it is judged upon whether the picture number variable n is more than the total number of pictures, i.e., NPIC or not. When it is judged that the picture number variable n is not more than the total number of pictures, NPIC, the step A14 returns to the step A2. When, on the other hand, it is judged that the picture number variable n is more than the total number of pictures, NPIC, this routine of the rate controlling process is terminated. The picture number variable n thus serves as a loop counter for repeating the process from steps A2 to A13 to process all the pictures from the first picture pic(1) to the n-th picture pic(n) in the present GROUP OF PICTURES. The entire pictures starting from the first picture pic(1) up to the NPIC-th picture pic(NPIC), in the present GROUP OF PICTURES can be therefore processed sequentially.

The aforesaid conventional transcoder 50, however, has no information on the structure of GROUP OF PICTURES such as a picture cycle of I or P-pictures within each of the GROUP OF PICTURES, so that the transcoder 50 must estimate the structure of GROUP OF PICTURES within the inputted moving picture sequence signal to allocate the number of bits to pictures of each type within the estimated structure of GROUP OF PICTURES.

Furthermore, the first conventional transcoder 50 is required to decode the first bit streams $b_1$ almost all over the layers such as the sequence layer, the GROUP OF PICTURES layer, the picture layer, the slice layer and the macroblock layer in order to derive necessary data for transcoding the first bit streams $b_1$ into the second bit streams $b_2$. The operation takes time, thereby causing the delay in the transcoding process.

Referring to FIG. 29 of the drawings, there is shown an improvement of the above transcoder 50 as a second conventional transcoder 60. The second conventional transcoder 60 is operated to perform the rate control without estimating the structure of GROUP OF PICTURES. As shown in FIG. 29, the second conventional transcoder 60 comprises a delay circuit 61 and a rate controller 62 in addition to the variable length decoder 51, the inverse quantizer 53, the quantizer 55 and the variable length encoder 57 same as those of the first conventional transcoder 50 shown in FIG. 27. The same constitutional elements are simply represented by the same reference numerals as those of the conventional transcoder 50, and will be thus omitted from description for avoiding tedious repetition.

The delay circuit 61 is interposed between the variable length decoder 51 and the inverse quantizer 53 and designed to control the flow of the signal from the variable length decoder 51 to the inverse quantizer 53. The delay circuit 61 is operated to delay the operation start time of the inverse quantizer 53 so that the inverse quantizer 53 does not start the inverse-quantizing process until the variable length decoder 51 terminates the process of decoding one of the pictures in the coded moving picture sequence signal.

As shown in FIG. 29, the rate controller 62 of the second conventional transcoder 60 includes a target ratio computing unit 63, an input bit summing unit 65, a bit difference computing unit 67, a target output bit updating unit 69, and a quantization parameter computing unit 71.

The target ratio computing unit 63 is electrically connected to the variable length decoder 51 and designed to input an input bit rate of the first bit streams $b_1$ hereinlater referred to as "Input_Bitrate", from the variable length decoder 51, and input a target bit rate, hereinlater referred to as "Target_Bitrate" through a terminal $a_3$. Alternatively, the target bit rate Target_Bitrate may have been stored in an internal memory, or determined on the basis of internal switches. The target ratio computing unit 63 is designed to then compute a target ratio, hereinlater referred to as "ioRatio" of the target bit rate Target_Bitrate to the input bit rate Input_Bitrate for each of pictures as follows:

$$ioRatio = \frac{\text{Target\_Bitrate}}{\text{Input\_Bitrate}} \qquad \text{equation (a26)}$$

The input bit summing unit 65 is designed to sum up the number of inputting bits of the picture decoded by the variable length decoder 51 to produce the total number of inputting bits, hereinlater referred to as "$T_{in}$". On the other hand, the target output bit updating unit 69 is designed to compute a target number of outputting bits to be generated by the variable length encoder 57, hereinlater referred to as "$T_{out}$". The target number of outputting bits $T_{out}$ is computed by multiplying the total number of inputting bits $T_{in}$ by the target ratio ioRatio as follows:

$$T_{out}=T_{in}\times ioRatio \qquad \text{equation (a27)}$$

The bit difference computing unit 67 is electrically connected to the variable length encoder 57 and the target output bit updating unit 69, and designed to input a real number of outputting bits encoded by the variable length encoder 57, hereinlater referred to as "$T_{real}$", and input the target number of outputting bits $T_{out}$. The bit difference computing unit 67 is designed to then compute a difference between the target number of outputting bits $T_{out}$ and the real number of outputting bits $T_{real}$, hereinlater referred to as a "difference number of bits", i.e., "$T_{diff}$" as follows:

$$T_{diff} = T_{real} - T_{out} \quad \text{equation (a28)}$$

The target output bit updating unit 69 is electrically connected to the target ratio computing unit 63, the input bit summing unit 65, and the bit difference computing unit 67. The target output bit updating unit 69 is designed to update the target number of outputting bits $T_{out}$ on the basis of the difference number of bits $T_{diff}$ as follows:

$$T_{out} = T_{out} - T_{diff} \quad \text{equation (a29)}$$

The quantization parameter computing unit 71 is electrically connected to the target output bit updating unit 69 and designed to compute the reference quantization parameter Q(j) for each of macroblocks MB(j) on the basis of the target outputting bits $T_{out}$ updated by the target output bit updating unit 69 in accordance with the step II of the TM-5.

FIG. 30 shows the flowchart of the rate controlling process performed by the above conventional transcoder 60. The rate controlling process performed in the transcoder 60 comprises the steps B1 to B13. The steps B6 to B13 are almost the same as those of the steps A7 to A14, respectively, in the rate controlling process shown in FIG. 20 except for the step B7 wherein the utilization volume of the capacity of the virtual buffer is computed on the basis of the target number of outputting bits $T_{out}$ given by the target output bit updating unit 69 instead of the target number of bits $T_i$, $T_p$ or $T_b$ computed in the step A3 shown in FIG. 20. The same steps will be thus omitted from description for avoiding tedious repetition.

In the step B1, "1" is assigned to the picture number variable n. The step B1 then goes forward to the step B2 wherein the target ratio ioRatio is computed by the above equation (a26). In the following step B3, the difference number of bits $T_{diff}$ is computed for the present picture pic(n) by the above equation (a28). The step B3 then goes forward to the step B4 wherein the number of inputting bits $T_{in}$ is summed up within the first bit streams $b_1$. In the step B5, the target number of outputting bits $T_{out}$ is computed by the above equation (a27), and further updated by the above equation (a29).

In the second conventional transcoder 60 thus constructed, the inverse quantizer 53, however, cannot start the inverse-quantization process until the target transcoding frame is completely decoded, thereby causing the delay in the transcoding process.

Referring to FIGS. 32 and 33 of the drawings, there is shown another improvement of the above transcoder 50 as a third conventional transcoder 80. The third conventional transcoder 80 is also adaptable to perform the rate control without estimating the structure of GROUP OF PICTURES. As shown in FIG. 31, the third conventional transcoder 80 comprises an input terminal $a_1$ electrically connected to a first transmitting path and designed to input an input bit streams $b_3$ at the input bit rate, and an output terminal $a_2$ electrically connected to a second transmitting path and designed to output an output bit streams $b_4$ at the target bit rate. In the third conventional transcoder 80, the input bit streams $b_3$ may have a format, non-adaptable for the MPEG-2, different from that of the bit streams $b_1$ of the first and second conventional transcoders 50 and 60. The input bit streams $b_3$ have information on the number of coding bits previously recorded thereon by the encoder, not shown.

The third conventional transcoder 80 comprises a variable length decoder 81 electrically connected to the input terminal $a_1$, and a rate controller 82 in addition to the inverse quantizer 53, the quantizer 55, and the variable length encoder 57 which are same as those of the second transcoder 60 shown in FIG. 29. The rate controller 82 includes a target output bit updating unit 83, and a quantization parameter computing unit 85 in addition to the target ratio computing unit 63, and the bit difference computing unit 67 which are same as those of the second transcoder 60 shown in FIG. 29.

The third conventional transcoder 80 thus constructed can perform the rate control on the basis of the formation on the number of coding bits previously recorded in the input bit streams $b_3$. The variable length decoder 81 is operated to decode the coded moving picture sequence signal within the third bit streams $b_3$ to reconstruct the pictures and the information on the number of coding bits, and transmit the information to the inverse quantizer 53. The variable length decoder 81 is also operated to transmit the number of inputting bits $T_{in}$ to the target output bit updating unit 83.

The outputting bit updating unit 83 is designed to compute the target number of outputting bits $T_{out}$ on the basis of the number of inputting bits $T_{in}$ and the target ratio ioRatio by the above equation (a26). The quantization parameter computing unit 85 is designed to compute the reference quantization parameter Q(j) of the macroblocks MB(j) for each of pictures on the basis of the target number of outputting bits $T_{out}$ updated by the outputting bit updating unit 83 in accordance with the step II in the TM-5. The quantizer 55 is then operated to quantize the j-th macroblock MB(j) on the basis of the reference quantization parameter Q(j) given by the quantization parameter computing unit 85.

FIG. 32 shows the flowchart of the rate controlling process performed by the above third conventional transcoder 80. The rate controlling process performed in the transcoder 80 comprises the steps C1 to C13. All the steps C1 to C13 are the same as those of the steps B1 to B13, respectively, in the rate controlling process shown in FIG. 30 except for the step C4 wherein the number of inputting bits $T_{in}$ in the current picture pic(n) is derived from the third bit streams $b_3$ by the decoder 81 to compute the total number of inputting bits $T_{in}$.

The third conventional transcoder 80 thus constructed has information on the number of coding bits previously recorded in the third bit streams b3 thereby making it possible to solve the problem of the delay in the second conventional transcoder 60. The third conventional transcoder 80, however, encounters another problem to restrict the form of the inputted bit streams. Moreover, the encoder which is linked with the third transcoder 80 must provide with the above information on the number of coding bits to be recorded in the bit streams, thereby causing the delay of process in the encoder.

In any one of the conventional transcoders 50, 60 and 80, the matrix of the inverse-quantization coefficients dequant is necessary for only the quantizer 55, but unnecessary for the transcoder itself to generate the desired bit streams. In order to eliminate the redundant matrix of the inverse-quantization coefficients dequant, there is proposed a fourth conventional transcoder 90 comprising a level converter 91 instead of the inverse quantizer 53 and the quantizer 55 of the transcoder 50, as shown in FIG. 33.

The level converter 91 is interposed between the variable length decoder 51 and the variable length encoder 57. The level converter 91 is designed to input the original picture data for each of pictures. The original picture data includes a matrix of original quantization coefficients level for each of macroblocks within the corresponding picture. The level converter 91 is electrically connected to the rate controller 59 and designed to input the second quantization parameter $Q_2$ from the rate controller 59.

The level converter 91 is further designed to convert the original picture data for each of pictures including the matrix of original quantization coefficients level into the objective picture data including the matrix of re-quantization coefficients tlevel without generating the matrix of the inverse-quantization coefficients dequant. The following equations (30a) and (31a) for the matrix of re-quantization coefficients tlevel are lead by eliminating the matrix of the inverse-quantization coefficients dequant from the above equations (a1), (a2), (a3) and (a4).

$$tlevel = \left\{(level + \text{sign}(level) \times \frac{1}{2}\right\} \times \frac{Q_1}{Q_2} \qquad \text{equation (30a)}$$

or $$tlevel = level \times \frac{Q_1}{Q_2} + \frac{\text{sign}(level)}{2} \qquad \text{equation (31a)}$$

where the above equation (30a) is used for the inter-picture, while the above equation (31a) is used for the intra-picture. The level converter 91 is thus operable to convert the original picture data, for each of pictures, into the second picture data with the first quantization parameter $Q_1$ and the second quantization parameter $Q_2$. The first quantization parameter $Q_1$ is decoded from the first bit streams $b_1$ by the variable length decoder 51, while the second quantization parameter $Q_2$ is obtained from the rate controller 59.

In the fourth conventional transcoder 90, the rate controller 59 is designed to perform the rate control over the encoding process in the transcoder 90 according to the TM-5. The variable length encoder 57 is electrically connected to the level converter 91 and to input the above matrix of re-quantization coefficients tlevel from the level converter 91.

The fourth conventional transcoder 90 thus constructed can efficiently perform the transcoding process at high speed without storing the matrix of inverse-quantization coefficients dequant in a memory.

The above conventional transcoders 50, 60, 80 and 90, however, encounters another problem with the rate-distortion performance in converting the quantization level. In short, the rate-distortion performance in converting the quantization level is unstable and variable in accordance with the first and second quantization parameters and the level of the original quantization coefficients level. Therefore, as the amount of reduced information becomes larger, the quantization error is liable to increase, thereby causing the unstable rate control in transcoding.

The applicant of the present application filed patent application No. H11-278867.

The applicant disclosed an apparatus, a method and a computer program product for transcoding a coded moving picture sequence signal, being operable to compute the optimized quantization parameter on the basis of the inverse-quantization parameter and the previously computed quantization parameter in consideration of the characteristics of the rate-distortion performance dependent on the quantization parameter and the inverse-quantization parameter in the patent application No. H11-278867.

The transcoder disclosed in the aforesaid patent application No. H11-278867, comprising the inverse quantizer for performing the inverse-quantization operation and the quantizer for performing the quantization operation, is characterized in that the transcoder further comprises quantization parameter switching means for switching the quantization parameter in consideration of the characteristics of the rate-distortion performance dependent on the inputted quantization parameter, thereby making it possible for the transcoder to minimize the quantization error occurred when the matrix of original quantization coefficients is transformed to the matrix of re-quantization coefficients.

There are provided methods such as data partitioning and SNR scalability for dividing picture signals conveying picture information into two separate picture signals consisting of base layer picture signal indicative of basic picture information and enhancement layer picture signal indicative of high quality picture information in order to prevent the quality of picture from deteriorating.

More particularly, the data partitioning is a method of dividing bit streams conveying picture information into two separate bit streams consisting of base layer bit streams indicative of low-frequency DCT coefficients and enhancement layer bit streams indicative of high-frequency DCT coefficients before encoding, and the thus divided base layer bit streams and enhancement layer bit streams are recombined before decoding. Original picture information can be roughly decoded and reproduced on the basis of the base layer bit streams indicative of low-frequency DCT coefficients, but not on the basis of the enhancement layer bit streams indicative of high-frequency DCT coefficients alone. The high quality of the original picture information can be decoded and reproduced on the basis of the recombination of the base layer bit streams indicative of low-frequency DCT coefficients and the enhancement layer indicative of high-frequency DCT coefficients.

The SNR scalability is a method of dividing picture signals containing picture information into two separate picture signals consisting of base layer picture signals indicative of low-SNR image and enhancement layer picture signals indicative of high-SNR image before encoding. The method of SNR scalability is described in detail. The original picture signals have original DCT coefficients. The quantizer is operated to roughly quantize base layer bit picture signals indicative of low-SNR image to generate low-SNR bit streams. The inverse quantizer is operated to inversely quantize the thus generated low-SNR bit streams to roughly reproduce DCT coefficients. Then, the difference information between the original DCT coefficients and the reproduced DCT coefficients is extracted and quantized to generate the enhancement layer picture signals. The enhancement layer picture signals thus generated are used as additional information in combination with the base layer picture signals (low-SNR signals) to reproduce high-SNR signals.

The above described methods, however, encounter a problem of decreasing the quality of service, i.e., QoS. The transcoding process above described is non-reversible. The transcoder, in general, is operated to decode and inversely quantized DCT coefficients of input bit streams and re-quantize the DCT coefficients thus inversely quantized with re-quantization parameters greater then the original quantization parameters to reduce the amount of bits. This means that the QoS for the input bit streams cannot be reproduced.

The data partitioning is operated to divide bit streams into two separate bit streams consisting of base layer bit streams indicative of low-frequency DCT coefficients and enhancement layer bit streams indicative of high-frequency DCT coefficients before encoding. There is, however, provided no method of dividing MPEG-2 bit streams in conformable with MP@ML, which are not in a hierarchical structure, into base layer bit streams and enhancement layer bit streams. Furthermore, although the data partitioning is performed to divide bit streams into the base layer bit streams and enhancement layer bit streams before encoding, a MP@ML conformable decoder cannot decode the base layer bit streams and enhancement layer bit streams thus divided. This leads to the fact that a decoder dedicated to the data partitioning is required in place of the MP@ML conformable decoder. According to the syntax of the data partitioning, the code specifing a boundary between low-frequency coefficients and high-frequency coefficients is defined as "Priority_break_point", which makes it possible for a decoder to distinguish the low-frequency coefficients from the high-frequency coefficients. The MP@ML conformable decoder, on the other hand, cannot recognize "Priority_break_point". The bit streams indicative of low-frequency coefficients include no EOB code, thereby making it impossible for the MP@ML decoder cannot reproduce the bit streams indicative of low-frequency coefficients.

Similarly to the data partitioning, the SNR scalability is operated to divide bit streams into two separate bit streams consisting of base layer bit streams indicative of low-SNR signals and enhancement layer bit streams indicative of high-SNR signals before encoding. A MP@ML conformable encoder cannot divide bit streams into base layer bit streams indicative of low-SNR signals and enhancement layer bit streams indicative of high-SNR signals and encode the base layer bit streams and enhancement layer bit streams thus divided. Nor can a MP@MP conformable decoder decode the base layer bit streams and the enhancement layer bit streams. This leads to the fact that an encoder and a decoder dedicated to the SNR scalability are required in place of the MP@ML conformable encoder and decoder.

Furthermore, the base layer bit streams and the enhancement layer bit streams are required to be processed in parallel, thereby making it complex and difficult to design such SNR scalability conformable encoder and decoder. Moreover, the SNR scalability conformable decoder is operated to receive the base layer bit streams and the enhancement layer bit streams to reproduce and output original picture signals but not in the form of bit streams. This means that the picture signal thus reproduced and outputted must be transcoded again if it is required be in the form of bit streams.

That the above data partitioning and SNR scalability operations require respective dedicated encoders and decoders is attributed to the fact that the respective decoders and encoders are operative to perform the process of dividing bit streams into base layer bit streams and the enhancement layer bit streams, and the process of recombining the base layer bit streams and the enhancement layer bit streams to reconstruct original bit streams.

In order to solve the above problems, the present invention is to propose an apparatus, a method and a computer program product for transcoding a first coded moving picture sequence signal to separate into and generate a second coded moving picture sequence signal and a differential coded moving picture sequence signal, which is a difference between the first coded moving picture sequence signal and the second coded moving picture sequence signal, and merging the second coded moving picture sequence signal and the differential coded moving picture sequence signal to reconstruct the first coded moving picture sequence signal. The apparatus, method and computer program product thus constructed make it possible for a user to receive transcoded MPEG-2 bit streams at a bit rate lower than that of original MPEG-2 bit streams to reproduce low-quality picture information, and later receive the differential bit streams to reproduce high-quality picture information in combining with the earlier received transcoded MPEG-2 bit streams.

Furthermore, the apparatus, method and computer program product thus constructed make it possible for a user to decode and transcode MPEG-2 bit streams without any additional devices unlike the aforesaid scalability and data partitioning methods.

SUMMARY OF THE INVENTION

It is therefore an object of the present invention to provide an apparatus for transcoding a first coded moving picture sequence signal to separate into and generate a second coded moving picture sequence signal and a differential coded moving picture sequence signal, which is a difference between the first coded moving picture sequence signal and the second coded moving picture sequence signal.

It is another object of the present invention to provide a method of transcoding a first coded moving picture sequence signal to separate into and generate a second coded moving picture sequence signal and a differential coded moving picture sequence signal, which is a difference between the first coded moving picture sequence signal and the second coded moving picture sequence signal.

It is further object of the present invention to provide a computer program product for transcoding a first coded moving picture sequence signal to separate into and generate a second coded moving picture sequence signal and a differential coded moving picture sequence signal, which is a difference between the first coded moving picture sequence signal and the second coded moving picture sequence signal.

It is a still further object of the present invention to provide an apparatus for merging a second coded moving picture sequence signal and a differential coded moving picture sequence signal, which is a difference between the first coded moving picture sequence signal and a second coded moving picture sequence signal, to reconstruct the first coded moving picture sequence signal.

It is a yet further object of the present invention to provide a method of merging a second coded moving picture sequence signal and a differential coded moving picture sequence signal, which is a difference between the first coded moving picture sequence signal and a second coded moving picture sequence signal, to reconstruct the first coded moving picture sequence signal.

It is further object of the present invention to provide a computer program for merging a second coded moving picture sequence signal and a differential coded moving picture sequence signal, which is a difference between the first coded moving picture sequence signal and a second coded moving picture sequence signal, to reconstruct the first coded moving picture sequence signal.

In accordance with a first aspect of the present invention, there is provided a coded signal separating apparatus for transcoding a first coded moving picture sequence signal to generate a second coded moving picture sequence and a differential coded moving picture sequence signal being a difference between the first coded moving picture sequence signal and the second coded moving picture sequence signal, comprising inputting means for inputting the first coded moving picture sequence signal therethrough, the first coded moving picture sequence signal consisting of a series of first picture information having first coefficient information, and generated as a result of encoding original moving picture sequence signal, the first coefficient information including a matrix of first coefficients; coded signal converting means for inputting the first coded moving picture sequence signal from the inputting means, and converting the first coded moving picture sequence signal inputted through the inputting means to generate the second coded moving picture sequence signal, the second coded moving picture sequence signal consisting of a series of second picture information having second coefficient information, the second coefficient information including a matrix of second coefficients, each of the original moving picture sequence signal, the first coded moving picture sequence signal, and the second coded moving picture sequence signal is in the form of a hierarchical structure including one or more sequence layers each having a plurality of screens sharing common information, one or more picture layers each having a plurality of slices sharing common information with respect to one of the screens, one or more slice layers each having a plurality of macroblocks with respect to one of the slices, one or more macroblock layers each having a plurality of blocks with respect to one of the macroblocks, and one or more block layers each having block information with respect to one of the blocks; and differential coded signal generating means for inputting the first coded moving picture sequence signal and the second coded moving picture sequence signal from the coded signal converting means to generate the differential coded moving picture sequence signal, whereby the differential coded signal generating means is operative to generate the differential coded moving picture sequence signal on the basis of the first coefficient information obtained from the series of first picture information of the first coded moving picture sequence signal, and the second coefficient information obtained from the series of the second picture information of the second coded moving picture sequence signal.

In the above coded signal separating apparatus, the differential coded signal generating means may be operative to generate the differential coded moving picture sequence signal in the form of the hierarchical structure.

In the above coded signal separating apparatus, the second coefficient information includes second zero coefficient information consisting of zero coefficients and second non-zero coefficient information consisting of non-zero coefficients, the first coefficient information includes zero conversion first coefficient information consisting of zero conversion first coefficients to be converted by the coded signal converting means to the zero coefficients, and non-zero conversion first coefficient information consisting of non-zero conversion first coefficients to be converted by the coded signal converting means to the non-zero coefficients. The differential coded signal generating means may include: a coefficient information separating unit for inputting the first coefficient information and the second coefficient information from the coded signal converting means to separate into the zero conversion first coefficient information and the second zero coefficient information from the non-zero conversion first coefficient information and the second non-zero coefficient information, respectively; a zero coefficient encoding unit for inputting the zero conversion first coefficient information from the coefficient information separating unit to extract differential information between the zero conversion first coefficient information and the second zero coefficient information to generate differential zero coefficient information; a non-zero coefficient encoding unit for inputting the non-zero conversion first coefficient information and the second non-zero coefficient information from the coefficient information separating unit to extract differential information between the non-zero conversion first coefficient information and the second non-zero coefficient information to generate differential non-zero coefficient information.

In the above coded signal separating apparatus, the non-zero coefficient encoding unit may be operative to generate the differential non-zero coefficient information on the basis of the values of the first coefficients of the non-zero conversion first coefficient information and the values of the second coefficients of the second non-zero coefficient information.

In the above coded signal separating apparatus, the coded signal converting means may be operated to obtain a first macroblock quantization parameter used for the quantization of each of the macroblocks contained in the original moving picture sequence signal to generate the macroblocks contained in the first coded moving picture sequence signal from the first coded moving picture sequence signal, and a second macroblock quantization parameter to be used for the inverse-quantization of each of the macroblocks contained in the second coded moving picture sequence signal from the second coded moving picture sequence signal. The non-zero coefficient encoding unit may be operative to input the first macroblock quantization parameter and the second macroblock quantization parameter from the coded signal converting means, compute a prediction error between the non-zero conversion first coefficient information and an estimated non-zero conversion first coefficient information on the basis of a ratio of the second macroblock quantization parameter to the first macroblock quantization parameter, and the second non-zero coefficient information.

In the above coded signal separating apparatus, the zero coefficient encoding unit may be operative to scan the zero conversion first coefficient information in a zigzag fashion to generate the differential zero coefficient information including combinations of run and level, the run being the number of consecutive zero-value coefficients, the level being the value of a non-zero value coefficient immediately followed by the consecutive zero-value coefficients whereby the zero coefficient encoding unit is operative to eliminate zero coefficients in the zero conversion first coefficient information to compress the amount of information in the differential zero coefficient information.

In the above coded signal separating apparatus, the macroblock layer includes blocks consisting of encoded blocks and non-encoded blocks, and a coded block pattern indicating the positions of the respective encoded blocks and non-encoded blocks in the macroblock layer. The differential coded signal generating means may be provided with a coded block pattern generating unit operative to generate differential coded block patterns between the coded block patterns of the first coded moving picture sequence signal and the coded block patterns of the second coded moving picture sequence signal.

In the above coded signal separating apparatus, the coded block pattern generating unit may be operative to generate differential CBP value strings each indicating the positions of the encoded blocks and non-encoded blocks in the macroblock layer of the first coded moving picture sequence signal with respect to non-encoded blocks of the macroblock layer of the second coded moving picture sequence signal.

In the above coded signal separating apparatus, the macroblock layer contains macroblock attribute information including a macroblock address indicating the position of the macroblock, and a macroblock address increment, i.e., MBAI indicating the number of the macroblock addresses to be skipped. The differential coded signal generating means may include: a differential macroblock coding unit operative to input macroblocks of the first coded moving picture sequence signal and macroblocks of the second coded moving picture sequence signal from the coded signal converting means to generate macroblocks of the differential coded moving picture sequence signal, the macroblocks of the differential coded moving picture sequence signal being differences between the macroblocks of the first coded moving picture sequence signal and the macroblocks of the second coded moving picture sequence signal with respect to the respective macroblock addresses so as to eliminate macroblocks remained unchanged between the first coded moving picture sequence signal and the second coded moving picture sequence signal with respect to the respective macroblock addresses; and a MBAI coding unit operative to generate the MBAIs of the macroblock attribute information of the differential coded moving picture sequence signal, the MBAIs of the differential coded moving picture sequence signal indicates the number of macroblock addresses of the macroblocks eliminated by the differential macroblock coding unit with respect to the macroblocks of the differential coded moving picture sequence signal generated by the differential macroblock coding unit so that the macroblocks of the differential coded moving picture sequence signal correspond to the macroblocks of the first coded moving picture sequence signal and the macroblocks of the second coded moving picture sequence signal with respect to the respective macroblock addresses.

In the above coded signal separating apparatus, the coded signal converting means may be operative to inversely quantize each of the macroblocks contained in the first coded moving picture sequence signal in accordance with the first macroblock quantization parameter to reconstruct the original moving picture sequence signal, and quantize each of the macroblocks of the reconstructed original moving picture sequence signal in accordance with the second macroblock quantization parameter to generate the second coded moving picture sequence signal; and the differential coded signal generating means may include a macroblock quantization parameter reconstruction information generating unit operative to generate macroblock quantization parameter reconstruction information used to reconstruct the first macroblock quantization parameter.

In the above coded signal separating apparatus, the coded signal converting means may be operative to convert each of the macroblocks contained in the first coded moving picture sequence signal on the basis of the ratio of the first macroblock quantization parameter to the second macroblock quantization parameter to generate the second coded moving picture sequence signal; and the differential coded signal generating means may include a macroblock quantization parameter reconstruction information generating unit operative to generate macroblock quantization parameter reconstruction information used to reconstruct the first macroblock quantization parameter.

In the above coded signal separating apparatus, the macroblock quantization parameter reconstruction information generating unit may be operative to generate the macroblock quantization parameter reconstruction information on the basis of a first quantization parameter derivation constant used to reconstruct the first macroblock quantization parameter from the second macroblock quantization parameter.

In the above coded signal separating apparatus, the macroblock quantization parameter reconstruction information generating unit may be operative to generate the macroblock quantization parameter reconstruction information on the basis of a difference between the first quantization parameter derivation constant and previously generated macroblock quantization parameter reconstruction information of the macroblocks of the differential coded moving picture sequence signal.

In the above coded signal separating apparatus, the coded signal converting means may be operative to inversely quantize each of the macroblocks contained in the slice layers of the first coded moving picture sequence signal in accordance with a first slice quantization parameter used for the quantization of each of the macroblocks contained in the slice layers of the original moving picture sequence signal to reconstruct the original moving picture sequence signal, and quantize each of the macroblocks in the slice layers of the reconstructed original moving picture sequence signal in accordance with a second slice quantization parameter used for the inverse-quantization of each of the macroblocks contained in the slice layers of the second coded moving picture sequence signal to generate the second coded moving picture sequence signal; and the differential coded signal generating means may include a slice quantization parameter reconstruction information generating unit operative to generate slice quantization parameter reconstruction information used to reconstruct the first slice quantization parameter.

In the above coded signal separating apparatus, the coded signal converting means may be operative to convert each of the macroblocks contained in the slice layers of the first coded moving picture sequence signal on the basis of the ratio of the first slice quantization parameter to the second slice quantization parameter to generate the second coded moving picture sequence signal; and the differential coded signal generating means may include a slice quantization parameter reconstruction information generating unit operative to generate slice quantization parameter reconstruction information used to reconstruct the first slice quantization parameter.

In the above coded signal separating apparatus, the slice quantization parameter reconstruction information generating unit may be operative to generate the slice quantization parameter reconstruction information on the basis of a first slice quantization parameter derivation constant used to reconstruct the first slice quantization parameter from the second slice quantization parameter.

In the above coded signal separating apparatus, the differential coded signal generating means may be provided with a VBV_Delay attaching unit operative to obtain VBV_Delay information indicative of the capacity of VBV buffer from the first coded moving picture sequence signal and attach the VBV_Delay information to the differential coded moving picture sequence signal.

In the above coded signal separating apparatus, variable length codes are assigned to the respective differential zero coefficient information and the respective differential non-zero coefficient information in accordance with respective tables, the differential coded signal generating means may be provided with a variable length code table selecting unit operative to switch the tables in response to the first quantization parameter derivation constants; and a variable-length coding unit operative to assign the differential zero coefficient information and the differential non-zero coefficient information to variable length codes in accordance with the tables switched by the variable length code table selecting unit.

In the above coded signal separating apparatus, the differential coded signal generating means may be operative to compute a variable length code to be assigned to the prediction error on the basis of a first quantization parameter derivation constant used to reconstruct the first macroblock quantization parameter from the second macroblock quantization parameter, and the prediction error.

In the above coded signal separating apparatus, the differential coded signal generating means may be provided with: a run coding unit operative to assign the runs to variable length codes in accordance with a run table in consideration of the frequency of occurrences; and a level coding unit operative to assign the levels to variable length codes in accordance with a level table in consideration of the frequency of occurrences.

In the above coded signal separating apparatus, each of the macroblocks includes the blocks consisting of brightness blocks and color-difference blocks, the differential CBP value strings consisting of differential brightness CBP value strings and differential color-difference CBP value strings, the differential brightness CBP value strings each indicating the positions of the encoded brightness blocks and non-encoded brightness blocks in the respective macroblock layer of the first coded moving picture sequence signal with respect to non-encoded brightness blocks in the respective macroblock layer of the second coded moving picture sequence signal, differential color-difference CBP value strings each indicating the positions of the encoded color-difference blocks and non-encoded color-difference blocks in the respective macroblock layer of the first coded moving picture sequence signal with respect to non-encoded color-difference blocks in the respective macroblock layer of the second coded moving picture sequence signal. The coded block pattern generating unit may be further equipped with: an unnecessary block counting section operative to count the number of the unnecessary brightness blocks and the number of the unnecessary color-difference blocks in the macroblock of the second coded moving picture sequence signal; a differential brightness CBP encoding section operative to assign the differential brightness CBP value strings to variable length codes in accordance with a brightness variable length code table; and a differential color-difference CBP encoding section operative to assign the differential color-difference CBP value strings to variable length codes in accordance with a color-difference variable length code table. The differential brightness CBP encoding section may be operative to switch the variable length code brightness table in response to the number of the unnecessary brightness blocks counted by the unnecessary block counting section, and the differential color-difference CBP encoding section is operative to switch the color-difference variable length code table in response to the number of the unnecessary differential color-difference blocks counted by the unnecessary block counting section.

In the above coded signal separating apparatus, the macroblock quantization parameter reconstruction information generating unit may be operative to compute variable length codes to be assigned to the macroblock quantization parameter reconstruction information in accordance with the absolute value of the macroblock quantization parameter reconstruction information.

In accordance with a second aspect of the present invention, there is provided a differential coded signal generating apparatus for inputting a first coded moving picture sequence signal and a second coded moving picture sequence signal to generate a differential coded moving picture sequence signal, the second coded moving picture sequence signal being generated as a result of transcoding the first coded moving picture sequence signal, the differential coded moving picture sequence signal being a difference between the first coded moving picture sequence signal and the second coded moving picture sequence signal, comprising: first coded signal inputting means for inputting the first coded moving picture sequence signal therethrough, the first coded moving picture sequence signal consisting of a series of first picture information having first coefficient information, and generated as a result of encoding original moving picture sequence signal, the first coefficient information including a matrix of first coefficients; second coded signal inputting means for inputting the second coded moving picture sequence signal therethrough, the second coded moving picture sequence signal consisting of a series of second picture information having second coefficient information, the second coefficient information including a matrix of second coefficients; and differential coded signal generating means for inputting the first coded moving picture sequence signal from the first coded signal inputting means and the second coded moving picture sequence signal from the second coded signal inputting means to generate the differential coded moving picture sequence signal, whereby the differential coded signal generating means is operative to generate the differential coded moving picture sequence signal on the basis of the first coefficient information obtained from the series of the first picture information of the first coded moving picture sequence signal, and the second coefficient information obtained from the series of the second picture information of the second coded moving picture sequence signal.

In accordance with a third aspect of the present invention, there is provided a coded signal merging apparatus for inputting a second coded moving picture sequence signal and a differential coded moving picture sequence signal to reconstruct a first coded moving picture sequence signal, the differential coded moving picture sequence signal being a difference between the first coded moving picture sequence signal and the second coded moving picture sequence signal, comprising: second coded signal inputting means for inputting the second coded moving picture sequence signal therethrough, the second coded moving picture sequence signal consisting of a series of second picture information having second coefficient information, and generated as a result of transcoding the first coded moving picture sequence signal, the second coefficient information including a matrix of second coefficients, the first coded moving picture sequence signal consisting of a series of first picture information having first coefficient information, and generated as a result of encoding original moving picture sequence signal, the first coefficient information including a matrix of first coefficients; differential coded signal inputting means for inputting the differential coded moving picture sequence signal therethrough, the differential coded moving picture sequence including differential coefficient information between the first coefficient information and the second coefficient information, each of the original moving picture sequence signal, the first coded moving picture sequence signal, the second coded moving picture sequence signal, and the differential coded moving picture sequence signal is in the form of a hierarchical structure including one or more sequence layers each having a plurality of screens sharing common information, one or more picture layers each having a plurality of slices sharing common information with respect to one of the screens, one or more slice layers each having a plurality of macroblocks with respect to one of the slices, one or more macroblock layers each having a plurality of blocks with respect to one of the macroblocks, and one or more block layers each having block information with respect to one of the blocks; and first coded signal merging means for inputting the second coded moving picture sequence signal from the second coded signal inputting means and the differential coded moving picture sequence signal from the differential coded signal inputting means to reconstruct the first coded moving picture sequence signal, whereby the first coded signal merging means is operative to reconstruct the first coded moving picture sequence signal on the basis of the second coefficient information obtained from the series of second picture information of the second coded moving picture sequence signal, and the differential coefficient information obtained from the differential coded signal inputting means.

In the above coded signal merging apparatus, the second coefficient information may include second zero coefficient information consisting of zero coefficients and second non-zero coefficient information consisting of non-zero coefficients, the first coefficient information includes zero conversion first coefficient information consisting of zero conversion first coefficients to be converted to the zero coefficients, and non-zero conversion first coefficient information consisting of non-zero conversion first coefficients to be converted to the non-zero coefficients. The first coded signal merging means may be provided with: a zero conversion first coefficient information generating unit operative to reconstruct the zero conversion first coefficients on the basis of the second zero coefficient information of the second coded moving picture sequence signal and the differential coefficient information of the differential coded moving picture sequence signal; a non-zero conversion first coefficient information generating unit operative to reconstruct the non-zero conversion first coefficients on the basis of the second non-zero coefficient information of the second coded moving picture sequence signal and the differential coefficient information of the differential coded moving picture sequence signal; and a first coefficient information merging unit operative to merge the zero conversion first coefficients information reconstructed by the zero conversion first coefficient information generating unit and non-zero conversion first coefficient information reconstructed by the non-zero conversion first coefficient information generating unit to reconstruct the first coefficient information.

In the above coded signal merging apparatus, each of the macroblock layers of the first coded moving picture sequence signal and the second coded moving picture sequence signal includes blocks consisting of encoded blocks and non-encoded blocks, and a coded block pattern indicating the positions of the respective encoded blocks and non-encoded blocks in the macroblock layer, each of the macroblock layers of differential coded moving picture sequence signal includes a differential coded block pattern being a difference between the coded block patterns of respective macroblock layers of the first coded moving picture sequence signal and the second coded moving picture sequence signal, the first coefficient information merging unit is provided with a coded block pattern reconstructing section operative to reconstruct the coded block patterns of the macroblock layers of the first coded moving picture sequence signal on the basis of the differential coded block patterns of the differential coded moving picture sequence signal.

In the above coded signal merging apparatus, the first coded moving picture sequence signal may include a first macroblock quantization parameter used for the quantization of each of the macroblocks contained in the original moving picture sequence signal, the second coded moving picture sequence signal includes a second macroblock quantization parameter to be used for the inverse-quantization of each of the macroblocks contained in the second coded moving picture sequence signal, the first coefficient information merging unit is provided with a macroblock quantization parameter reconstruction information reconstructing section operative to reconstruct the first macroblock quantization parameter reconstruction information used to reconstruct the first macroblock quantization parameter from the differential coded moving picture sequence signal to reconstruct the first macroblock quantization parameter.

In the above coded signal merging apparatus, the first coded moving picture sequence signal may include a first slice quantization parameter used for the quantization of each of the macroblocks contained in the slice layer of the original moving picture sequence signal, the second coded moving picture sequence signal includes a second slice quantization parameter to be used for the inverse-quantization of each of the macroblocks contained in the slice layer of the second coded moving picture sequence signal, the first coefficient information merging unit is provided with a slice quantization parameter reconstruction information reconstructing section operative to reconstruct the first slice quantization parameter reconstruction information used to reconstruct the first slice quantization parameter from the differential coded moving picture sequence signal to reconstruct the first slice quantization parameter.

In the above coded signal merging apparatus, the first coefficient information merging unit may be provided with a VBV_Delay attaching unit operative to obtain VBV_Delay information indicative of the capacity of VBV buffer from the differential coded moving picture sequence signal and attach the VBV_Delay information to the first coded moving picture sequence signal.

In accordance with a fourth aspect of the present invention, there is provided a coded signal separating and merging apparatus comprising: coded signal separating means for transcoding a first coded moving picture sequence signal to generate a second coded moving picture sequence signal and a differential coded moving picture sequence signal being a difference between the first coded moving picture sequence signal and the second coded moving picture sequence signal; and coded signal merging means for inputting the second coded moving picture sequence signal and the differential coded moving picture sequence signal to reconstruct the first coded moving picture sequence signal. The coded signal separating means may include: an inputting unit for inputting the first coded moving picture sequence signal therethrough; a coded signal converting unit for inputting the first coded moving picture sequence signal from the inputting unit, and converting the first coded moving picture sequence signal inputted through the inputting unit to generate the second coded moving picture sequence signal; a differential coded signal generating unit for inputting the first coded moving picture sequence signal and the second coded moving picture sequence signal from the coded signal converting unit to generate the differential coded moving picture sequence signal; a second coded signal outputting unit for outputting the second coded moving picture sequence signal generated by the coded signal converting unit; and a differential coded signal outputting unit for outputting the differential coded moving picture sequence signal generated by the differential coded signal generating unit. The coded signal merging means may include: a second coded signal inputting unit for inputting the second coded moving picture sequence signal therethrough; a differential coded signal inputting unit for inputting the differential coded moving picture sequence signal therethrough; a first coded signal merging unit for inputting the second coded moving picture sequence signal from the second coded signal inputting unit and the differential coded moving picture sequence signal from the differential coded signal inputting unit to reconstruct the first coded moving picture sequence signal; and a first coded signal outputting unit for outputting the first coded moving picture sequence signal reconstructed by the first coded signal merging unit.

In accordance with a fifth aspect of the present invention, there is provided a coded signal separating method of transcoding a first coded moving picture sequence signal to generate a second coded moving picture sequence and a differential coded moving picture sequence signal being a difference between the first coded moving picture sequence signal and the second coded moving picture sequence signal, comprising the steps of: (a) inputting the first coded moving picture sequence signal therethrough, the first coded moving picture sequence signal consisting of a series of first picture information having first coefficient information, and generated as a result of encoding original moving picture sequence signal, the first coefficient information including a matrix of first coefficients; (b) converting the first coded moving picture sequence signal inputted in the step (a) to generate the second coded moving picture sequence signal, the second coded moving picture sequence signal consisting of a series of second picture information having second coefficient information, the second coefficient information including a matrix of second coefficients, each of the original moving picture sequence signal, the first coded moving picture sequence signal, and the second coded moving picture sequence signal is in the form of a hierarchical structure including one or more sequence layers each having a plurality of screens sharing common information, one or more picture layers each having a plurality of slices sharing common information with respect to one of the screens, one or more slice layers each having a plurality of macroblocks with respect to one of the slices, one or more macroblock layers each having a plurality of blocks with respect to one of the macroblocks, and one or more block layers each having block information with respect to one of the blocks; and (c) generating the differential coded moving picture sequence signal in response to the first coded moving picture sequence signal and the second coded moving picture sequence signal inputted in the step (b), whereby the step (c) has the step of generating the differential coded moving picture sequence signal on the basis of the first coefficient information obtained from the series of the first picture information of the first coded moving picture sequence signal, and the second coefficient information obtained from the series of the second picture information of the second coded moving picture sequence signal.

In the above coded signal separating method, the step (c) may have the step of generating the differential coded moving picture sequence signal in the form of the hierarchical structure.

In the above coded signal separating method, the second coefficient information includes second zero coefficient information consisting of zero coefficients and second non-zero coefficient information consisting of non-zero coefficients, the first coefficient information includes zero conversion first coefficient information consisting of zero conversion first coefficients to be converted to the zero coefficients in the step (b), and non-zero conversion first coefficient information consisting of non-zero conversion first coefficients to be converted to the non-zero coefficients in the step (b). The step (c) may further include the steps of: (c1) separating the zero conversion first coefficient information and the second zero coefficient information from the non-zero conversion first coefficient information and the second non-zero coefficient information, respectively; (c2) extracting differential information between the zero conversion first coefficient information and the second zero coefficient information separated in the step (c1) to generate differential zero coefficient information; and (c3) extracting differential information between the non-zero conversion first coefficient information and the second non-zero coefficient information separated in the step (c1) to generate differential non-zero coefficient information.

In the above coded signal separating method, the step (c3) may have the step of generating the differential non-zero coefficient information on the basis of the values of the first coefficients of the non-zero conversion first coefficient information and the values of the second coefficients of the second non-zero coefficient information.

In the above coded signal separating method, the step (b) may have the step of obtaining a first macroblock quantization parameter used for the quantization of each of the macroblocks contained in the original moving picture sequence signal to generate the macroblocks contained in the first coded moving picture sequence signal from the first coded moving picture sequence signal, and a second macroblock quantization parameter to be used for the inverse-quantization of each of the macroblocks contained in the second coded moving picture sequence signal from the second coded moving picture sequence signal, whereby the step (c3) has the step of computing a prediction error between the non-zero conversion first coefficient information and an estimated non-zero conversion first coefficient information on the basis of a ratio of the second macroblock quantization parameter to the first macroblock quantization parameter, and the second non-zero coefficient information.

In the above coded signal separating method, the step (c2) has the step of scanning the zero conversion first coefficient information in a zigzag fashion to generate the differential zero coefficient information including combinations of run and level, the run being the number of consecutive zero-value coefficients, the level being the value of a non-zero value coefficient immediately followed by the consecutive zero-value coefficients whereby the step (c2) has the step of eliminating zero coefficients in the zero conversion first coefficient information to compress the amount of information in the differential zero coefficient information.

In the above coded signal separating method, the macroblock layer includes blocks consisting of encoded blocks and non-encoded blocks, and a coded block pattern indicating the positions of the respective encoded blocks and non-encoded blocks in the macroblock layer. The step (c) further includes the step of (c4) generating differential coded block patterns between the coded block patterns of the first coded moving picture sequence signal and the coded block patterns of the second coded moving picture sequence signal.

In the above coded signal separating method, the step (c4) has the step of generating differential CBP value strings each indicating the positions of the encoded blocks and non-encoded blocks in the macroblock layer of the first coded moving picture sequence signal with respect to non-encoded blocks of the macroblock layer of the second coded moving picture sequence signal.

In the above coded signal separating method, the macroblock layer contains macroblock attribute information including a macroblock address indicating the position of the macroblock, and a macroblock address increment, i.e., MBAI indicating the number of the macroblock addresses to be skipped. The step (c) further includes the steps of: (c5) generating macroblocks of the differential coded moving picture sequence signal being differences between the macroblocks of the first coded moving picture sequence signal and the macroblocks of the second coded moving picture sequence signal with respect to the respective macroblock addresses so as to eliminate macroblocks remained unchanged between the first coded moving picture sequence signal and the second coded moving picture sequence signal with respect to the respective macroblock addresses; and (c6) generating the MBAIs of the macroblock attribute information of the differential coded moving picture sequence signal, the MBAIs of the differential coded moving picture sequence signal indicates the number of macroblock addresses of the macroblocks eliminated in the step (c5) with respect to the macroblocks of the differential coded moving picture sequence signal generated in the step (c5) so that the macroblocks of the differential coded moving picture sequence signal correspond to the macroblocks of the first coded moving picture sequence signal and the macroblocks of the second coded moving picture sequence signal with respect to the respective macroblock addresses.

In the above coded signal separating method, the step (b) has the step of inversely quantizing each of the macroblocks contained in the first coded moving picture sequence signal in accordance with the first macroblock quantization parameter to reconstruct the original moving picture sequence signal, and quantize each of the macroblocks of the reconstructed original moving picture sequence signal in accordance with the second macroblock quantization parameter to generate the second coded moving picture sequence signal. The step (c) includes the step of (c7) generating macroblock quantization parameter reconstruction information used to reconstruct the first macroblock quantization parameter.

In the above coded signal separating method, the step (b) has the step of converting each of the macroblocks contained in the first coded moving picture sequence signal on the basis of the ratio of the first macroblock quantization parameter to the second macroblock quantization parameter to generate the second coded moving picture sequence signal. The step (c) includes the step of (c7) generating macroblock quantization parameter reconstruction information used to reconstruct the first macroblock quantization parameter.

In the above coded signal separating method, the step (c7) has the step of generating the macroblock quantization parameter reconstruction information on the basis of a first quantization parameter derivation constant used to reconstruct the first macroblock quantization parameter from the second macroblock quantization parameter.

In the above coded signal separating method, the step (c7) has the step of generating the macroblock quantization parameter reconstruction information on the basis of a difference between the first quantization parameter derivation constant and previously generated macroblock quantization parameter reconstruction information of the macroblocks of the differential coded moving picture sequence signal.

In the above coded signal separating method, the step (b) has the step of inversely quantizing each of the macroblocks contained in the slice layers of the first coded moving picture sequence signal in accordance with a first slice quantization parameter used for the quantization of each of the macroblocks contained in the slice layers of the original moving picture sequence signal to reconstruct the original moving picture sequence signal, and quantize each of the macroblocks in the slice layers of the reconstructed original moving picture sequence signal in accordance with a second slice quantization parameter used for the inverse-quantization of each of the macroblocks contained in the slice layers of the second coded moving picture sequence signal to generate the second coded moving picture sequence signal; and the step (c) further includes the step of (c8) generating slice quantization parameter reconstruction information used to reconstruct the first slice quantization parameter.

In the above coded signal separating method, the step (b) has the step of converting each of the macroblocks contained in the slice layers of the first coded moving picture sequence signal on the basis of the ratio of the first slice quantization parameter to the second slice quantization parameter to generate the second coded moving picture sequence signal; and the step (c) further includes the step of (c8) generating slice quantization parameter reconstruction information used to reconstruct the first slice quantization parameter.

In the above coded signal separating method, the step (c8) has the step of generating the slice quantization parameter reconstruction information on the basis of a first slice quantization parameter derivation constant used to reconstruct the first slice quantization parameter from the second slice quantization parameter.

In the above coded signal separating method, the step (c) has the step of (c9) obtaining VBV_Delay information indicative of the capacity of VBV buffer from the first coded moving picture sequence signal and attaching the VBV_Delay information to the differential coded moving picture sequence signal.

In the above coded signal separating method, variable length codes are assigned to the respective differential zero coefficient information and the respective differential non-zero coefficient information in accordance with respective tables. The step (c) further includes the steps of: (c10) switching the tables in response to the first quantization parameter derivation constants; and (c11) assigning the differential zero coefficient information and the differential non-zero coefficient information to variable length codes in accordance with the tables switched in the step (c10).

In the above coded signal separating method, the step (c) has the step of computing a variable length code to be assigned to the prediction error on the basis of a first quantization parameter derivation constant used to reconstruct the first macroblock quantization parameter from the second macroblock quantization parameter, and the prediction error.

In the above coded signal separating method, the step (c) further includes the steps of: (c12) assigning the runs to variable length codes in accordance with a run table in consideration of the frequency of occurrences; and (c13) assigning the levels to variable length codes in accordance with a level table in consideration of the frequency of occurrences.

In the above coded signal separating method, each of the macroblocks includes the blocks consisting of brightness blocks and color-difference blocks, the differential CBP value strings consisting of differential brightness CBP value strings and differential color-difference CBP value strings, the differential brightness CBP value strings each indicating the positions of the encoded brightness blocks and non-encoded brightness blocks in the respective macroblock layer of the first coded moving picture sequence signal with respect to non-encoded brightness blocks in the respective macroblock layer of the second coded moving picture sequence signal, differential color-difference CBP value strings each indicating the positions of the encoded color-difference blocks and non-encoded color-difference blocks in the respective macroblock layer of the first coded moving picture sequence signal with respect to non-encoded color-difference blocks in the respective macroblock layer of the second coded moving picture sequence signal. The step (c4) further includes the steps of: (c41) counting the number of the unnecessary brightness blocks and the number of the unnecessary color-difference blocks in the macroblock of the second coded moving picture sequence signal; (c42) assigning the differential brightness CBP value strings to variable length codes in accordance with a brightness variable length code table; and (c43) assigning the differential color-difference CBP value strings to variable length codes in accordance with a color-difference variable length code table, whereby the step (c42) has the step of switching the variable length code brightness table in response to the number of the unnecessary brightness blocks counted in the step (c41), and the step (c43) has the step of switching the color-difference variable length code table in response to the number of the unnecessary differential color-difference blocks counted in the step (c41).

In the above coded signal separating method, the step (c7) has the step of computing variable length codes to be assigned to the macroblock quantization parameter reconstruction information in accordance with the absolute value of the macroblock quantization parameter reconstruction information.

In accordance with a sixth aspect of the present invention, there is provided a differential coded signal generating method of inputting a first coded moving picture sequence signal and a second coded moving picture sequence signal to generate a differential coded moving picture sequence signal, the second coded moving picture sequence signal being generated as a result of transcoding the first coded moving picture sequence signal, the differential coded moving picture sequence signal being a difference between the first coded moving picture sequence signal and the second coded moving picture sequence signal, comprising the steps of: (d) inputting the first coded moving picture sequence signal therethrough, the first coded moving picture sequence signal consisting of a series of first picture information having first coefficient information, and generated as a result of encoding original moving picture sequence signal, the first coefficient information including a matrix of first coefficients; (e) inputting the second coded moving picture sequence signal therethrough, the second coded moving picture sequence signal consisting of a series of second picture information having second coefficient information, the second coefficient information including a matrix of second coefficients; and (f) generating the differential coded moving picture sequence signal, whereby the step (f) has the step of generating the differential coded moving picture sequence signal on the basis of the first coefficient information obtained from the series of first picture information of the first coded moving picture sequence signal, and the second coefficient information obtained from the series of second picture information of the second coded moving picture sequence signal.

In accordance with a seventh aspect of the present invention, there is provided a coded signal merging method of inputting a second coded moving picture sequence signal and a differential coded moving picture sequence signal to reconstruct a first coded moving picture sequence signal, the differential coded moving picture sequence signal being a difference between the first coded moving picture sequence signal and the second coded moving picture sequence signal, comprising the steps of: (g) inputting the second coded moving picture sequence signal therethrough, the second coded moving picture sequence signal consisting of a series of second picture information having second coefficient information, and generated as a result of transcoding the first coded moving picture sequence signal, the second coefficient information including a matrix of second coefficients, the first coded moving picture sequence signal consisting of a series of first picture information having first coefficient information, and generated as a result of encoding original moving picture sequence signal, the first coefficient information including a matrix of first coefficients; (h) inputting the differential coded moving picture sequence signal therethrough, the differential coded moving picture sequence including differential coefficient information between the first coefficient information and the second coefficient information, each of the original moving picture sequence signal, the first coded moving picture sequence signal, the second coded moving picture sequence signal, and the differential coded moving picture sequence signal is in the form of a hierarchical structure including one or more sequence layers each having a plurality of screens sharing common information, one or more picture layers each having a plurality of slices sharing common information with respect to one of the screens, one or more slice layers each having a plurality of macroblocks with respect to one of the slices, one or more macroblock layers each having a plurality of blocks with respect to one of the macroblocks, and one or more block layers each having block information with respect to one of the blocks; and (i) reconstructing the first coded moving picture sequence signal from the second coded moving picture sequence signal inputted in the step (g) and the differential coded moving picture sequence signal inputted in the step (h), whereby the step (i) has the step of reconstructing the first coded moving picture sequence signal on the basis of the second coefficient information obtained from the series of second picture information of the second coded moving picture sequence signal, and the differential coefficient information obtained in the step (h).

In the above coded signal merging method, the second coefficient information includes second zero coefficient information consisting of zero coefficients and second non-zero coefficient information consisting of non-zero coefficients, the first coefficient information includes zero conversion first coefficient information consisting of zero conversion first coefficients to be converted to the zero coefficients, and non-zero conversion first coefficient information consisting of non-zero conversion first coefficients to be converted to the non-zero coefficients. The step (i) further includes the steps of: (i1) reconstructing the zero conversion first coefficients on the basis of the second zero coefficient information of the second coded moving picture sequence signal and the differential coefficient information of the differential coded moving picture sequence signal; (i2) reconstructing the non-zero conversion first coefficients on the basis of the second non-zero coefficient information of the second coded moving picture sequence signal and the differential coefficient information of the differential coded moving picture sequence signal; and (i3) merging the zero conversion first coefficients information reconstructed in the step (i1) and non-zero conversion first coefficient information reconstructed in the step (i2) to reconstruct the first coefficient information.

In the above coded signal merging method, each of the macroblock layers of the first coded moving picture sequence signal and the second coded moving picture sequence signal includes blocks consisting of encoded blocks and non-encoded blocks, and a coded block pattern indicating the positions of the respective encoded blocks and non-encoded blocks in the macroblock layer, each of the macroblock layers of differential coded moving picture sequence signal includes a differential coded block pattern being a difference between the coded block patterns of respective macroblock layers of the first coded moving picture sequence signal and the second coded moving picture sequence signal, the step (i3) includes the step of (i31) reconstructing the coded block patterns of the macroblock layers of the first coded moving picture sequence signal on the basis of the differential coded block patterns of the differential coded moving picture sequence signal.

In the above coded signal merging method, the first coded moving picture sequence signal includes a first macroblock quantization parameter used for the quantization of each of the macroblocks contained in the original moving picture sequence signal, the second coded moving picture sequence signal includes a second macroblock quantization parameter to be used for the inverse-quantization of each of the macroblocks contained in the second coded moving picture sequence signal, the step (i3) has the step of (i32) reconstructing the first macroblock quantization parameter reconstruction information used to reconstruct the first macroblock quantization parameter from the differential coded moving picture sequence signal to reconstruct the first macroblock quantization parameter.

In the above coded signal merging method, the first coded moving picture sequence signal includes a first slice quantization parameter used for the quantization of each of the macroblocks contained in the slice layer of the original moving picture sequence signal, the second coded moving picture sequence signal includes a second slice quantization parameter to be used for the inverse-quantization of each of the macroblocks contained in the slice layer of the second coded moving picture sequence signal, the step (i3) includes the step of (i33) reconstructing the first slice quantization parameter reconstruction information used to reconstruct the first slice quantization parameter from the differential coded moving picture sequence signal to reconstruct the first slice quantization parameter.

In the above coded signal merging method as set forth in any one of claim 54 to 58, in which the step (i3) includes the step of (i34) obtaining VBV_Delay information indicative of the capacity of VBV buffer from the differential coded moving picture sequence signal and attach the VBV_Delay information to the first coded moving picture sequence signal.

In accordance with an eighth aspect of the present invention, there is provided a coded signal separating and merging method comprising the steps of: (j) transcoding a first coded moving picture sequence signal to generate a second coded moving picture sequence and a differential coded moving picture sequence signal being a difference between the first coded moving picture sequence signal and the second coded moving picture sequence signal; and (k) inputting the second coded moving picture sequence signal and the differential coded moving picture sequence signal to reconstruct the first coded moving picture sequence signal. The step (j) further includes the steps of: (j1) inputting the first coded moving picture sequence signal therethrough; (j2) converting the first coded moving picture sequence signal inputted through the step (j1) to generate the second coded moving picture sequence signal; (j3) generating the differential coded moving picture sequence signal from the first coded moving picture sequence signal inputted in the step (j1) and the second coded moving picture sequence signal generated in the step (j2); (j4) outputting the second coded moving picture sequence signal generated in the step (j2); and (j5) outputting the differential coded moving picture sequence signal generated in the step (j3). The step (k) includes the steps of: (k1) inputting the second coded moving picture sequence signal therethrough; (k2) inputting the differential coded moving picture sequence signal therethrough; (k3) reconstructing the first coded moving picture sequence signal from the second coded moving picture sequence signal inputted in the step (k1) and the differential coded moving picture sequence signal inputted in the step (k2); and (k4) outputting the first coded moving picture sequence signal reconstructed in the step (k3).

In accordance with a ninth aspect of the present invention, there is provided a computer program product comprising a computer usable storage medium having computer readable code embodied therein for transcoding a first coded moving picture sequence signal to generate a second coded moving picture sequence and a differential coded moving picture sequence signal being a difference between the first signal. The computer readable code comprising: (a) computer readable program code for inputting the first coded moving picture sequence signal therethrough, the first coded moving picture sequence signal consisting of a series of first picture information having first coefficient information, and generated as a result of encoding original moving picture sequence signal, the first coefficient information including a matrix of first coefficients; (b) computer readable program code for converting the first coded moving picture sequence signal inputted by the computer readable program code (a) to generate the second coded moving picture sequence signal, the second coded moving picture sequence signal consisting of a series of second picture information having second coefficient information, the second coefficient information including a matrix of second coefficients, each of the original moving picture sequence signal, the first coded moving picture sequence signal, and the second coded moving picture sequence signal is in the form of a hierarchical structure including one or more sequence layers each having a plurality of screens sharing common information, one or more picture layers each having a plurality of slices sharing common information with respect to one of the screens, one or more slice layers each having a plurality of macroblocks with respect to one of the slices, one or more macroblock layers each having a plurality of blocks with respect to one of the macroblocks, and one or more block layers each having block information with respect to one of the blocks; and (c) computer readable program code for generating the differential coded moving picture sequence signal in response to the first coded moving picture sequence signal and the second coded moving picture sequence signal inputted by the computer readable program code (b), whereby the computer readable program code (c) has the computer readable program code for generating the differential coded moving picture sequence signal on the basis of the first coefficient information obtained from the series of the first picture information of the first coded moving picture sequence signal, and the second coefficient information obtained from the series of the second picture information of the second coded moving picture sequence signal.

In the above computer program product, the computer readable program code (c) has the computer readable program code for generating the differential coded moving picture sequence signal in the form of the hierarchical structure.

In the above computer program product, the second coefficient information includes second zero coefficient information consisting of zero coefficients and second non-zero coefficient information consisting of non-zero coefficients, the first coefficient information includes zero conversion first coefficient information consisting of zero conversion first coefficients to be converted to the zero coefficients by the computer readable program code (b), and non-zero conversion first coefficient information consisting of non-zero conversion first coefficients to be converted to the non-zero coefficients by the computer readable program code (b). The computer readable program code (c) further includes: (c1) computer readable program code for separating the zero conversion first coefficient information and the second zero coefficient information from the non-zero conversion first coefficient information and the second non-zero coefficient information, respectively; (c2) computer readable program code for extracting differential information between the zero conversion first coefficient information and the second zero coefficient information separated by the computer readable program code (c1) to generate differential zero coefficient information; and (c3) computer readable program code for extracting differential information between the non-zero conversion first coefficient information and the second non-zero coefficient information separated by the computer readable program code (c1) to generate differential non-zero coefficient information.

In the above computer program product, the computer readable program code (c3) has the computer readable program code for generating the differential non-zero coefficient information on the basis of the values of the first coefficients of the non-zero conversion first coefficient information and the values of the second coefficients of the second non-zero coefficient information.

In the above computer program product, the computer readable program code (b) has the computer readable program code for obtaining a first macroblock quantization parameter used for the quantization of each of the macroblocks contained in the original moving picture sequence signal to generate the macroblocks contained in the first coded moving picture sequence signal from the first coded moving picture sequence signal, and a second macroblock quantization parameter to be used for the inverse-quantization of each of the macroblocks contained in the second coded moving picture sequence signal from the second coded moving picture sequence signal, whereby the computer readable program code (c3) has the computer readable program code for computing a prediction error between the non-zero conversion first coefficient information and an estimated non-zero conversion first coefficient information on the basis of a ratio of the second macroblock quantization parameter to the first macroblock quantization parameter, and the second non-zero coefficient information.

In the above computer program product, the computer readable program code (c2) has the computer readable program code for scanning the zero conversion first coefficient information in a zigzag fashion to generate the differential zero coefficient information including combinations of run and level, the run being the number of consecutive zero-value coefficients, the level being the value of a non-zero value coefficient immediately followed by the consecutive zero-value coefficients whereby the computer readable program code (c2) has the computer readable program code for eliminating zero coefficients in the zero conversion first coefficient information to compress the amount of information in the differential zero coefficient information.

In the above computer program product, the macroblock layer includes blocks consisting of encoded blocks and non-encoded blocks, and a coded block pattern indicating the positions of the respective encoded blocks and non-encoded blocks in the macroblock layer. The computer readable program code (c) further includes (c4) computer readable program code for generating differential coded block patterns between the coded block patterns of the first coded moving picture sequence signal and the coded block patterns of the second coded moving picture sequence signal.

In the above computer program product, the computer readable program code (c4) has the computer readable program code for generating differential CBP value strings each indicating the positions of the encoded blocks and non-encoded blocks in the macroblock layer of the first coded moving picture sequence signal with respect to non-encoded blocks of the macroblock layer of the second coded moving picture sequence signal.

In the above computer program product, the macroblock layer contains macroblock attribute information including a macroblock address indicating the position of the macroblock, and a macroblock address increment, i.e., MBAI indicating the number of the macroblock addresses to be skipped. The computer readable program code (c) further includes: (c5) computer readable program code for generating macroblocks of the differential coded moving picture sequence signal being differences between the macroblocks of the first coded moving picture sequence signal and the macroblocks of the second coded moving picture sequence signal with respect to the respective macroblock addresses so as to eliminate macroblocks remained unchanged between the first coded moving picture sequence signal and the second coded moving picture sequence signal with respect to the respective macroblock addresses; and (c6) computer readable program code for generating the MBAIs of the macroblock attribute information of the differential coded moving picture sequence signal, the MBAIs of the differential coded moving picture sequence signal indicates the number of macroblock addresses of the macroblocks eliminated by the computer readable program code (c5) with respect to the macroblocks of the differential coded moving picture sequence signal generated by the computer readable program code (c5) so that the macroblocks of the differential coded moving picture sequence signal correspond to the macroblocks of the first coded moving picture sequence signal and the macroblocks of the second coded moving picture sequence signal with respect to the respective macroblock addresses.

In the above computer program product, the computer readable program code (b) has the computer readable program code for inversely quantizing each of the macroblocks contained in the first coded moving picture sequence signal in accordance with the first macroblock quantization parameter to reconstruct the original moving picture sequence signal, and quantize each of the macroblocks of the reconstructed original moving picture sequence signal in accordance with the second macroblock quantization parameter to generate the second coded moving picture sequence signal. The computer readable program code (c) includes (c7) computer readable program code for generating macroblock quantization parameter reconstruction information used to reconstruct the first macroblock quantization parameter.

In the above computer program product, the computer readable program code (b) has the computer readable program code for converting each of the macroblocks contained in the first coded moving picture sequence signal on the basis of the ratio of the first macroblock quantization parameter to the second macroblock quantization parameter to generate the second coded moving picture sequence signal.

The computer readable program code (c) includes (c7) computer readable program code for generating macroblock quantization parameter reconstruction information used to reconstruct the first macroblock quantization parameter.

In the above computer program product, the computer readable program code (c7) has the computer readable program code for generating the macroblock quantization parameter reconstruction information on the basis of a first quantization parameter derivation constant used to reconstruct the first macroblock quantization parameter from the second macroblock quantization parameter.

In the above computer program product, the computer readable program code (c7) has the computer readable program code for generating the macroblock quantization parameter reconstruction information on the basis of a difference between the first quantization parameter derivation constant and previously generated macroblock quantization parameter reconstruction information of the macroblocks of the differential coded moving picture sequence signal.

In the above computer program product, the computer readable program code (b) has the computer readable program code for inversely quantizing each of the macroblocks contained in the slice layers of the first coded moving picture sequence signal in accordance with a first slice quantization parameter used for the quantization of each of the macroblocks contained in the slice layers of the original moving picture sequence signal to reconstruct the original moving picture sequence signal, and quantize each of the macroblocks in the slice layers of the reconstructed original moving picture sequence signal in accordance with a second slice quantization parameter used for the inverse-quantization of each of the macroblocks contained in the slice layers of the second coded moving picture sequence signal to generate the second coded moving picture sequence signal. The computer readable program code (c) further includes (c8) computer readable program code for generating slice quantization parameter reconstruction information used to reconstruct the first slice quantization parameter.

In the above computer program product, the computer readable program code (b) has the computer readable program code for converting each of the macroblocks contained in the slice layers of the first coded moving picture sequence signal on the basis of the ratio of the first slice quantization parameter to the second slice quantization parameter to generate the second coded moving picture sequence signal. The computer readable program code (c) further includes (c8) computer readable program code for generating slice quantization parameter reconstruction information used to reconstruct the first slice quantization parameter.

In the above computer program product, the computer readable program code (c8) has the computer readable program code for generating the slice quantization parameter reconstruction information on the basis of a first slice quantization parameter derivation constant used to reconstruct the first slice quantization parameter from the second slice quantization parameter.

In the above computer program product, the computer readable program code (c) has (c9) computer readable program code for obtaining VBV_Delay information indicative of the capacity of VBV buffer from the first coded moving picture sequence signal and attaching the VBV_Delay information to the differential coded moving picture sequence signal.

In the above computer program product, variable length codes are assigned to the respective differential zero coefficient information and the respective differential non-zero coefficient information in accordance with respective tables. The computer readable program code (c) further includes: (c10) computer readable program code for switching the tables in response to the first quantization parameter derivation constants; and (c11) computer readable program code for assigning the differential zero coefficient information and the differential non-zero coefficient information to variable length codes in accordance with the tables switched by the computer readable program code (c10).

In the above computer program product, the computer readable program code (c) has the computer readable program code for computing a variable length code to be assigned to the prediction error on the basis of a first quantization parameter derivation constant used to reconstruct the first macroblock quantization parameter from the second macroblock quantization parameter, and the prediction error.

In the above computer program product, the computer readable program code (c) further includes: (c12) computer readable program code for assigning the runs to variable length codes in accordance with a run table in consideration of the frequency of occurrences; and (c13) computer readable program code for assigning the levels to variable length codes in accordance with a level table in consideration of the frequency of occurrences.

In the above computer program product, each of the macroblocks includes the blocks consisting of brightness blocks and color-difference blocks, the differential CBP value strings consisting of differential brightness CBP value strings and differential color-difference CBP value strings, the differential brightness CBP value strings each indicating the positions of the encoded brightness blocks and non-encoded brightness blocks in the respective macroblock layer of the first coded moving picture sequence signal with respect to non-encoded brightness blocks in the respective macroblock layer of the second coded moving picture sequence signal, differential color-difference CBP value strings each indicating the positions of the encoded color-difference blocks and non-encoded color-difference blocks in the respective macroblock layer of the first coded moving picture sequence signal with respect to non-encoded color-difference blocks in the respective macroblock layer of the second coded moving picture sequence signal. The computer readable program code (c4) further includes: (c41) computer readable program code for counting the number of the unnecessary brightness blocks and the number of the unnecessary color-difference blocks in the macroblock of the second coded moving picture sequence signal; (c42) computer readable program code for assigning the differential brightness CBP value strings to variable length codes in accordance with a brightness variable length code table; and (c43) computer readable program code for assigning the differential color-difference CBP value strings to variable length codes in accordance with a color-difference variable length code table, whereby the computer readable program code (c42) has the computer readable program code for switching the variable length code brightness table in response to the number of the unnecessary brightness blocks counted by the computer readable program code (c41), and the computer readable program code (c43) has the computer readable program code for switching the color-difference variable length code table in response to the number of the unnecessary differential color-difference blocks counted by the computer readable program code (c41).

In the above computer program product, the computer readable program code (c7) has the computer readable program code for computing variable length codes to be assigned to the macroblock quantization parameter reconstruction information in accordance with the absolute value of the macroblock quantization parameter reconstruction information.

In accordance with a tenth aspect of the present invention, there is provided a computer program product comprising a computer usable storage medium having computer readable code embodied therein for inputting a first coded moving picture sequence signal and a second coded moving picture sequence signal to generate a differential coded moving picture sequence signal, the second coded moving picture sequence signal being generated as a result of transcoding the first coded moving picture sequence signal, the differential coded moving picture sequence signal being a difference between the first coded moving picture sequence signal. The second coded moving picture sequence signal, comprises: (d) computer readable program code for inputting the first coded moving picture sequence signal therethrough, the first coded moving picture sequence signal consisting of a series of first picture information having first coefficient information, and generated as a result of encoding original moving picture sequence signal, the first coefficient information including a matrix of first coefficients; (e) computer readable program code for inputting the second coded moving picture sequence signal therethrough, the second coded moving picture sequence signal consisting of a series of second picture information having second coefficient information, the second coefficient information including a matrix of second coefficients; and (f) computer readable program code for generating the differential coded moving picture sequence signal, whereby the computer readable program code (f) has the computer readable program code for generating the differential coded moving picture sequence signal on the basis of the first coefficient information obtained from the series of first picture information of the first coded moving picture sequence signal, and the second coefficient information obtained from the series of second picture information of the second coded moving picture sequence signal.

In accordance with an eleventh aspect of the present invention, there is provided a computer program product comprising a computer usable storage medium having computer readable code embodied therein for inputting a second coded moving picture sequence signal and a differential coded moving picture sequence signal to reconstruct a first coded moving picture sequence signal, the differential coded moving picture sequence signal being a difference between the first coded moving picture sequence signal and the second coded moving picture sequence signal, comprising: (g) computer readable program code for inputting the second coded moving picture sequence signal therethrough, the second coded moving picture sequence signal consisting of a series of second picture information having second coefficient information, and generated as a result of transcoding the first coded moving picture sequence signal, the second coefficient information including a matrix of second coefficients, the first coded moving picture sequence signal consisting of a series of first picture information having first coefficient information, and generated as a result of encoding original moving picture sequence signal, the first coefficient information including a matrix of first coefficients; (h) computer readable program code for inputting the differential coded moving picture sequence signal therethrough, the differential coded moving picture sequence including differential coefficient information between the first coefficient information and the second coefficient information, each of the original moving picture sequence signal, the first coded moving picture sequence signal, the second coded moving picture sequence signal, and the differential coded moving picture sequence signal is in the form of a hierarchical structure including one or more sequence layers each having a plurality of screens sharing common information, one or more picture layers each having a plurality of slices sharing common information with respect to one of the screens, one or more slice layers each having a plurality of macroblocks with respect to one of the slices, one or more macroblock layers each having a plurality of blocks with respect to one of the macroblocks, and one or more block layers each having block information with respect to one of the blocks; and (i) computer readable program code for reconstructing the first coded moving picture sequence signal from the second coded moving picture sequence signal inputted by the computer readable program code (g) and the differential coded moving picture sequence signal inputted by the computer readable program code (h), whereby the computer readable program code (i) has the computer readable program code for reconstructing the first coded moving picture sequence signal on the basis of the second coefficient information obtained from the series of second picture information of the second coded moving picture sequence signal, and the differential coefficient information obtained by the computer readable program code (h).

In the above computer program product, the second coefficient information includes second zero coefficient information consisting of zero coefficients and second non-zero coefficient information consisting of non-zero coefficients, the first coefficient information includes zero conversion first coefficient information consisting of zero conversion first coefficients to be converted to the zero coefficients, and non-zero conversion first coefficient information consisting of non-zero conversion first coefficients to be converted to the non-zero coefficients. The computer readable program code (i) further includes: (i1) computer readable program code for reconstructing the zero conversion first coefficients on the basis of the second zero coefficient information of the second coded moving picture sequence signal and the differential coefficient information of the differential coded moving picture sequence signal; (i2) computer readable program code for reconstructing the non-zero conversion first coefficients on the basis of the second non-zero coefficient information of the second coded moving picture sequence signal and the differential coefficient information of the differential coded moving picture sequence signal; and (i3) computer readable program code for merging the zero conversion first coefficients information reconstructed by the computer readable program code (i1) and non-zero conversion first coefficient information reconstructed by the computer readable program code (i2) to reconstruct the first coefficient information.

In the above computer program product, each of the macroblock layers of the first coded moving picture sequence signal and the second coded moving picture sequence signal includes blocks consisting of encoded blocks and non-encoded blocks, and a coded block pattern indicating the positions of the respective encoded blocks and non-encoded blocks in the macroblock layer, each of the macroblock layers of differential coded moving picture sequence signal includes a differential coded block pattern being a difference between the coded block patterns of respective macroblock layers of the first coded moving picture sequence signal and the second coded moving picture sequence signal. The computer readable program code (i3) includes (i31) computer readable program code for reconstructing the coded block patterns of the macroblock layers of the first coded moving picture sequence signal on the basis of the differential coded block patterns of the differential coded moving picture sequence signal.

In the above computer program product, the first coded moving picture sequence signal includes a first macroblock quantization parameter used for the quantization of each of the macroblocks contained in the original moving picture sequence signal, the second coded moving picture sequence signal includes a second macroblock quantization parameter to be used for the inverse-quantization of each of the macroblocks contained in the second coded moving picture sequence signal. The computer readable program code (i3) has (i32) computer readable program code for reconstructing the first macroblock quantization parameter reconstruction information used to reconstruct the first macroblock quantization parameter from the differential coded moving picture sequence signal to reconstruct the first macroblock quantization parameter.

In the above computer program product, the first coded moving picture sequence signal includes a first slice quantization parameter used for the quantization of each of the macroblocks contained in the slice layer of the original moving picture sequence signal, the second coded moving picture sequence signal includes a second slice quantization parameter to be used for the inverse-quantization of each of the macroblocks contained in the slice layer of the second coded moving picture sequence signal. The computer readable program code (i3) includes (i33) computer readable program code for reconstructing the first slice quantization parameter reconstruction information used to reconstruct the first slice quantization parameter from the differential coded moving picture sequence signal to reconstruct the first slice quantization parameter.

In the above computer program product, the computer readable program code (i3) includes (i34) computer readable program code for obtaining VBV_Delay information indicative of the capacity of VBV buffer from the differential coded moving picture sequence signal and attach the VBV_Delay information to the first coded moving picture sequence signal.

In accordance with a twelfth aspect of the present invention, there is provided a computer program product comprising a computer usable storage medium having computer readable code embodied therein for separating and merging coded signal comprising: (j) computer readable program code for transcoding a first coded moving picture sequence signal to generate a second coded moving picture sequence and a differential coded moving picture sequence signal being a difference between the first coded moving picture sequence signal and the second coded moving picture sequence signal; and (k) computer readable program code for inputting the second coded moving picture sequence signal and the differential coded moving picture sequence signal to reconstruct the first coded moving picture sequence signal. The computer readable program code (j) further includes (j1) computer readable program code for inputting the first coded moving picture sequence signal therethrough; (j2) computer readable program code for converting the first coded moving picture sequence signal inputted through the computer readable program code (j1) to generate the second coded moving picture sequence signal; (j3) computer readable program code for generating the differential coded moving picture sequence signal from the first coded moving picture sequence signal inputted by the computer readable program code (j1) and the second coded moving picture sequence signal generated by the computer readable program code (j2); (j4) computer readable program code for outputting the second coded moving picture sequence signal generated by the computer readable program code (j2); and (j5) computer readable program code for outputting the differential coded moving picture sequence signal generated by the computer readable program code (j3). The computer readable program code (k) includes (k1) computer readable program code for inputting the second coded moving picture sequence signal therethrough; (k2) computer readable program code for inputting the differential coded moving picture sequence signal therethrough; (k3) computer readable program code for reconstructing the first coded moving picture sequence signal from the second coded moving picture sequence signal inputted by the computer readable program code (k1) and the differential coded moving picture sequence signal inputted by the computer readable program code (k2); and (k4) computer readable program code for outputting the first coded moving picture sequence signal reconstructed by the computer readable program code (k3).

In the above coded signal separating apparatus, each of the sequence layers includes a sequence header indicative of the start of the sequence layer, the differential coded signal generating means includes a sequence header attaching unit operative to attach the sequence headers to the respective sequence layers of the differential coded moving picture sequence signal.

In the above coded signal separating apparatus, the first coded moving picture sequence signal is to be transmitted at a first bit rate, the differential coded signal generating means includes a bit rate information attaching unit operative to generate first bit rate information indicative of the first bit rate and attach the first bit rate information to the differential coded moving picture sequence signal.

In the above coded signal separating apparatus, the bit rate information attaching unit is operative to generate the first bit rate information on the basis of the value of the first bit rate divided by 400 and attach the first bit rate information to the differential coded moving picture sequence signal.

In the above coded signal merging apparatus, the first coded moving picture sequence signal is to be transmitted at a first bit rate, the differential coded moving picture sequence signal includes first bit rate information indicative of the first bit rate, the first coded signal merging means includes a bit rate information reconstructing unit operative to obtain the first bit rate information from the differential coded moving picture sequence signal to reconstruct the first coded moving picture sequence signal at the first bit rate.

In the above coded signal separating method, each of the sequence layers includes a sequence header indicative of the start of the sequence layer. The step (c) includes the step of (c14) attaching the sequence headers to the respective sequence layers of the differential coded moving picture sequence signal.

In the above coded signal separating method, the first coded moving picture sequence signal is to be transmitted at a first bit rate, the step (c) includes the step of (c15) generating first bit rate information indicative of the first bit rate and attaching the first bit rate information to the differential coded moving picture sequence signal.

In the above coded signal separating method, the step (c15) has the step of generating the first bit rate information on the basis of the value of the first bit rate divided by 400 and attaching the first bit rate information to the differential coded moving picture sequence signal.

In the above coded signal merging method, the first coded moving picture sequence signal is to be transmitted at a first bit rate, the differential coded moving picture sequence signal includes first bit rate information indicative of the first bit rate, the step (i) includes the step of (i4) obtaining the first bit rate information from the differential coded moving picture sequence signal to reconstruct the first coded moving picture sequence signal at the first bit rate.

In the above computer program product, each of the sequence layers includes a sequence header indicative of the start of the sequence layer. The computer readable program code (c) includes (c14) computer readable program code for attaching the sequence headers to the respective sequence layers of the differential coded moving picture sequence signal.

In the above computer program product, the first coded moving picture sequence signal is to be transmitted at a first bit rate. The computer readable program code (c) includes (c15) computer readable program code for generating first bit rate information indicative of the first bit rate and attaching the first bit rate information to the differential coded moving picture sequence signal.

In the above computer program product, the computer readable program code (c15) has the computer readable program code for generating the first bit rate information on the basis of the value of the first bit rate divided by 400 and attaching the first bit rate information to the differential coded moving picture sequence signal.

In the above computer program product, the first coded moving picture sequence signal is to be transmitted at a first bit rate. The differential coded moving picture sequence signal includes first bit rate information indicative of the first bit rate.
The computer readable program code (i) includes (i4) computer readable program code for obtaining the first bit rate information from the differential coded moving picture sequence signal to reconstruct the first coded moving picture sequence signal at the first bit rate.

BRIEF DESCRIPTION OF THE DRAWINGS

The present invention and many of the advantages thereof will be better understood from the following detailed description when considered in connection with the accompanying drawings, wherein:

FIG. 5 is a block diagram of the bit stream merging apparatus 2000 shown in FIG. 1;

FIG. 6(a) is a table showing the contents of a sequence header of the differential bit stream;

FIG. 6(b) is a table showing the contents of a picture header of the differential bit stream;

FIG. 6(c) is a table showing the contents of a slice header of the differential bit stream;

FIG. 6(d) is a table showing the contents of MB attribute information of the differential bit stream;

FIG. 12 is a code table used to encode a differential MB quantization parameter derivation constant to a variable length code;

FIG. 13 is a flowchart showing the flow of the process of decoding coded differential quantization parameter information according to the present invention;

FIG. 16 is a set of code tables used to encode differential brightness CBP value strings, differential color-difference CBP value strings to respective variable length codes according to the present invention;

FIG. 21 is a set of code tables used to encode run to a variable length code according to the present invention;

FIG. 22 is a code tables used to encode level to a variable length code according to the present invention;

FIG. 23 is a code table used to encode a prediction error to a variable length code according to the present invention;

FIG. 24 is a schematic view explaining the principle of decoding differential coefficient information according to the present invention;

FIG. 25 is a graph comparing the bit rate of the original MPEG-2 bit stream with the total of bit rates of the transcoded MPEG-2 bit stream and the differential bit stream separated by the bit stream separating apparatus 1000 according to the present invention;

FIG. 26 is a table showing the various types of differential information according to the present invention;

DESCRIPTION OF THE PREFERRED EMBODIMENTS

Figure 1:
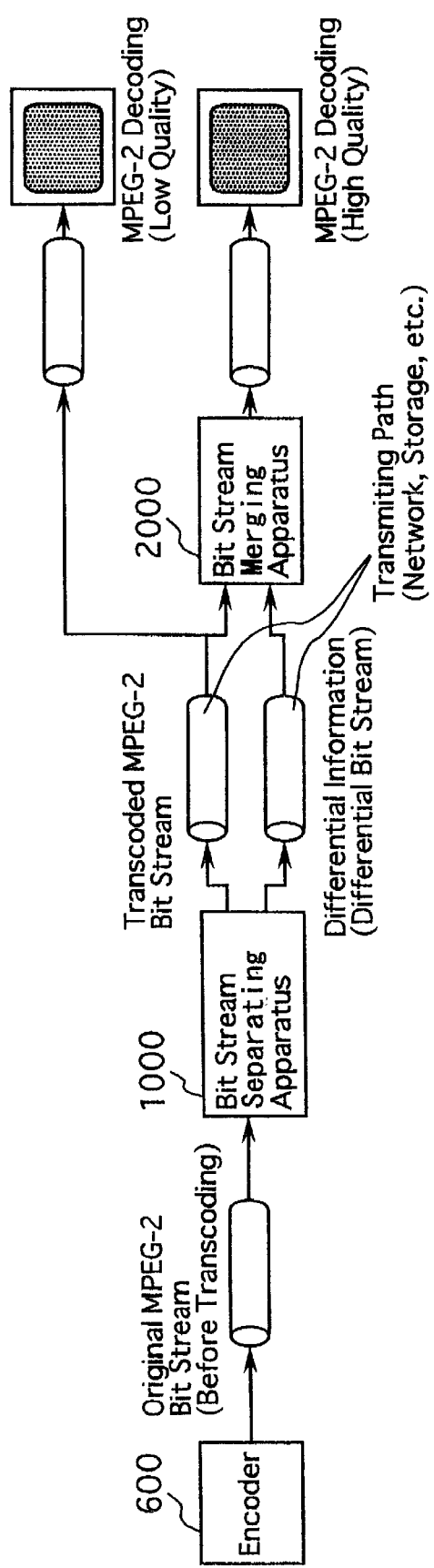
FIG. 1 is a diagram showing renderings of an environment in which preferred embodiments of a bit stream separating apparatus 1000 and a bit stream merging apparatus 2000 according to the present invention are utilized.

Referring now to FIG. 1 of the drawings, there is shown a preferred embodiment of a bit stream separating apparatus 1000 according to the present invention, a preferred embodiment of a bit stream merging apparatus 2000 according to the present invention, an encoder 600, and transmitting paths.

The encoder 600 is adapted to input original moving picture sequence information, i.e., high-quality moving picture sequence information to output high-quality MPEG-2 bit streams, i.e., original MPEG-2 bit streams. The bit stream separating apparatus 1000 according to the present invention is adapted to input the original MPEG-2 bit streams from the encoder 600, and transcode and separate the original MPEG-2 bit streams to generate transcoded MPEG-2 bit streams and differential bit streams. The differential bit streams are differences between the original MPEG-2 bit streams and the transcoded MPEG-2 bit streams. The transcoded MPEG-2 bit streams and differential bit streams are transmitted through the transmitting paths to users.

A user may operate a conventional transcoder, not shown, to decode the transcoded MPEG-2 bit streams to reproduce low-quality moving picture sequence information as shown in FIG. 1.

A user, on the other hand, may operate the bit stream merging apparatus 2000 according to present invention to merge the transcoded MPEG-2 bit streams and the differential bit streams to reconstruct the original MPEG-2 bit streams, i.e., high-quality MPEG-2 bit streams, thereby enabling to reproduce the original, high-quality moving picture sequence information. The differential bit streams may be transmitted simultaneously with the transcoded MPEG-2 bit streams or may be transmitted after the transcoded MPEG-2 bit streams are transmitted.

Conventionally, it is required to transmit the original MPEG-2 bit streams again through the transmitting path for reproducing the original, high-quality moving picture sequence information.

The bit stream separating apparatus 1000, on the other hand, enables to transcode the original MPEG-2 bit stream to separate into and generate the differential bit stream in addition to the transcoded MPEG-2 bit stream. The bit stream merging apparatus 2000 according to the present invention enables to reproduce the original, high-quality moving picture sequence information from the transcoded MPEG-2 bit stream and the differential bit stream.

The bit stream merging apparatus 2000 makes it possible to reproduce the high-quality moving picture sequence information, for instance, from the transcoded MPEG-2 bit stream already received and the differential bit stream just received, thereby eliminating the requirement of transmitting the original MPEG-2 bit streams again through the transmitting path. This leads to the fact that the bit stream separating apparatus 1000 and the bit stream merging apparatus 2000 according to the present invention make it possible to effectively utilize the transcoded MPEG-2 bit streams and the transmitting paths.

If the total of the bit rates of the transcoded MPEG-2 bit streams and differential bit streams, however, exceeds the bit rate of the original MPEG-2 bit streams, the efficiency of the bit stream separating apparatus 1000 and the bit stream merging apparatus 2000 is reduced. The bit stream separating apparatus 1000 and the bit stream merging apparatus 2000 according to the present invention are, therefore, adapted to prevent the total of the bit rates of the transcoded MPEG-2 bit streams and differential bit streams from exceeding the bit rate of the original MPEG-2 bit streams, which will be described later.

Figure 3:
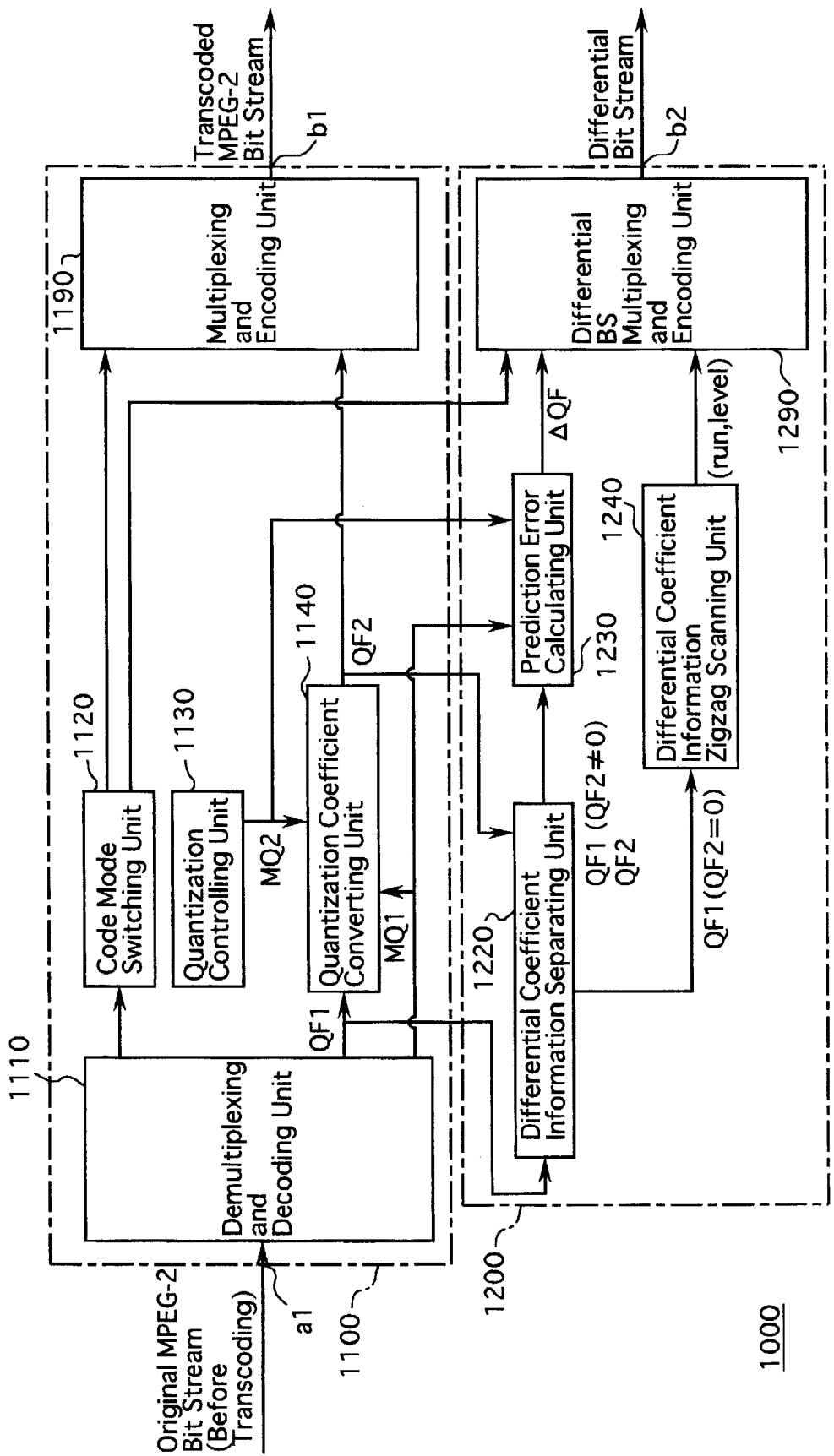
FIG. 3 is a block diagram of the bit stream separating apparatus 1000 shown in FIG. 1.

The bit stream separating apparatus 1000 is shown in FIG. 3 as comprising an inputting terminal a1 connected to an input transmission path, not shown, for inputting the original MPEG-2 bit streams therethrough, a transcoding portion 1100 for inputting the original MPEG-2 bit streams from the inputting terminal a1 and converting the original MPEG-2 bit streams inputted through the inputting terminal a1 to generate the transcoded MPEG-2 bit streams, a differential bit stream generating portion 1200 for inputting the original MPEG-2 bit streams and the transcoded MPEG-2 bit streams from the transcoding portion 1100 to generate the differential bit streams, a first outputting terminal b1 connected to the transcoding portion 1100 for outputting the transcoded MPEG-2 bit stream therethrough to an output transmission path, not shown, and a second outputting terminal b2 connected to the differential bit stream generating portion 1200 for outputting the differential bit streams therethrough to an output transmission path, not shown.

More specifically, the bit stream separating apparatus 1000 is adapted to input original MPEG-2 bit streams conformable to MP@ML ("Main Profile Main Lever", a form of MPEG-2 coding which covers broadcast television formats up to and including 720 pixels by 576 lines at 30 fps using 4:2:0 sampling) to separate into and generate transcoded MPEG-2 bit streams and differential bit streams. The differential bit streams are differences between the original MPEG-2 bit streams and the transcoded MPEG-2 bit streams.

The MPEG-2 bit streams are in the form of a hierarchical structure. This means that the MPEG-2 bit stream includes sequence layers each having a plurality of screens sharing common attribute information such as a picture size, picture layers each having a plurality of slices sharing common picture information such as a picture type with respect to one of the screens, slice layers each having a plurality of macroblocks with respect to one of the slices, macroblock layers each having a plurality of blocks with respect to one of the macroblocks, and block layers each having block information with respect to one of the blocks. The sequence layer, the picture layer, the slice layer, the macroblock layer, and the block layer contain sequence layer data elements, picture layer data elements, slice layer data elements, macroblock layer data elements, and block layer data elements, respectively. This means that the sequence layer contains the sequence layer data elements including a sequence header and the picture layer data elements. The picture layer contains picture layer data elements including a picture header and picture data elements. Picture data element contains slice layer data elements. The slice layer data element contains a slice header and MB layer data elements. The MB layer data element contains MB attribute information and block layer data elements. The block layer data element contains coefficient information. The coefficient information includes a matrix of coefficients.

The sequence layer, the picture layer, and the slice layer are as a whole referred to as "upper layer", the macroblock layer, i.e., MB layer is referred to as "middle layer", and the block layer is referred to as "lower layer", hereinlater. Furthermore, the information about the upper layer, the middle layer, and the lower layer is referred to as "upper layer information", "middle layer information", and "lower layer information, respectively.

The original MPEG-2 bit streams are generated as a result of encoding original moving picture sequence signal and consist of a series of first picture information having first coefficient information. The first coefficient information includes a matrix of first coefficients, which will be described later.

The transcoded MPEG-2 bit streams, thus transcoded by the transcoding portion 1100, consist of a series of second picture information having second coefficient information. The second coefficient information includes a matrix of second coefficients, which will be described later.

The differential bit stream generating portion 1200 is operative to generate the differential bit streams on the basis of the first coefficient information obtained from the series of first picture information of the original MPEG-2 bit streams, and the second coefficient information obtained from the series of the second picture information of the transcoded MPEG-2 bit streams.

Figure 2:
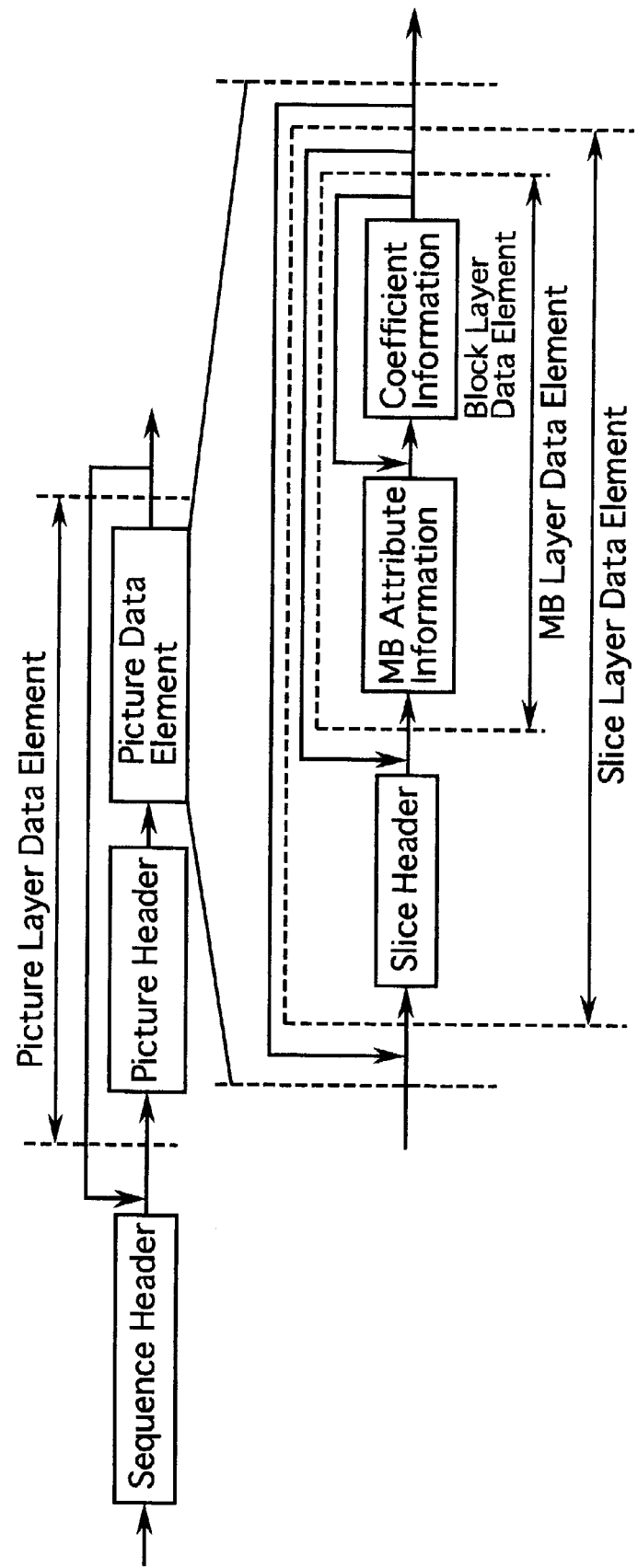
FIG. 2 is a data structural diagram showing the hierarchical structure of a differential bit stream.

Similar to the original MPEG-2 bit streams and the transcoded MPEG-2 bit streams, the differential bit streams, thus generated by the differential bit stream generating portion 1200, are in the form of the hierarchical structure including the sequence layers, the picture layers, the slice layers, the macroblock layers, and the block layers. The structure of the MPEG-2 bit stream is shown in FIG. 2. The differential bit stream starts from a sequence header of the sequence layer. Followed by the sequence header, picture layer data elements continue for the number of pictures contained in the sequence layer. The picture layer data element comprises a picture header and picture data elements. The picture data element includes a plurality of slice layer data elements. The slice layer data element comprises a slice header and a plurality of MB layer data elements. The MB layer data element comprises MB attribute information and block layer data elements. Block layer data element contains coefficient information. The coefficient information includes a matrix of coefficients.

The bit stream separating apparatus 1000 constitutes the coded signal separating apparatus according to the present invention. The inputting terminal a1 of the bit stream separating apparatus 1000 constitutes the inputting means according to the present invention. The original MPEG-2 bit stream, the transcoded MPEG-2 bit stream, the differential bit stream, and the original moving picture sequence signal constitute the first coded moving picture sequence signal, the second coded moving picture sequence signal, the differential coded moving picture sequence signal, and the original moving picture sequence information according to the present invention, respectively.

The transcoding portion 1100 constitutes the coded signal converting means according to the present invention.

The differential bit stream generating portion 1200 constitutes the differential coded signal generating means according to the present invention.

The coefficient information of the original MPEG-2 bit streams are referred to as "first coefficient information", the coefficient information of the transcoded MPEG-2 bit streams are referred to as "second coefficient information", and the coefficient information of the differential bit streams are referred to as "differential coefficient information".

The sequence header, the picture header, and the slice header are used to synchronize output MPEG-2 bit streams in units of the sequence layer, the picture layer, and the slice layer, respectively.

The MB attribute information is used to indicate the positions of macroblocks, i.e., MBs. The coefficient information includes the information about quantization coefficients.

The values of the coefficients contained in the coefficient information of the MPEG-2 bit streams include zero and non-zero. A coefficient whose value equals to zero is referred to as "zero coefficient", and a coefficient whose value is not zero is referred to as "non-zero coefficient", hereinlater. Accordingly, the second coefficient information of the transcoded MPEG-2 bit streams includes zero coefficients and non-zero coefficients. The second coefficient information is divided into second zero coefficient information consisting of zero coefficients and second non-zero coefficient information consisting of non-zero coefficients.

Coefficients in the first coefficient information of the original MPEG-2 bit streams are converted by the transcoding portion 1100 to zero coefficients or non-zero coefficients in the second coefficient information of the transcoded MPEG-2 bit streams. Accordingly, coefficients in the first coefficient information to be converted by the transcoding portion 1100 to zero coefficients are referred to as "zero conversion first coefficients" and coefficients in the first coefficient information to be converted by the transcoding portion 1100 to non-zero coefficients are referred to as "non-zero conversion first coefficients". The first coefficient information is divided into zero conversion first coefficient information consisting of zero conversion first coefficients and non-zero conversion first coefficient information consisting of non-zero conversion first coefficients.

As shown in FIG. 3, the transcoding portion 1100 includes a demultiplexing and decoding unit 1110, a code mode switching unit 1120, a quantization controlling unit 1130, a quantization coefficient converting unit 1140, and a multiplexing and encoding unit 1190.

The demultiplexing and decoding unit 1110 is adapted to input the original MPEG-2 bit streams from the inputting terminal a1, demultiplex and decode the original MPEG-2 bit streams inputted from the inputting terminal a1 to reconstruct the upper layer information, the middle layer information and the lower layer information, and output the upper layer information and the middle layer information to the code mode switching unit 1120, and the lower layer information to the quantization coefficient converting unit 1140 and the prediction error calculating unit 1230.

The code mode switching unit 1120 is adapted to input codes contained in the upper layer information and the middle layer information from the demultiplexing and decoding unit 1110 to judge if the codes are to be modified or not with reference to the types of codes. The types of codes to be modified are, for instance, codes of MB or CBP, which will be described later. If it is judged that the codes are to be modified, the code mode switching unit 1120 is adapted to modify the codes in accordance with the types of codes and output the upper layer information and the middle layer information including the codes thus modified to the multiplexing and encoding unit 1190 and the differential bit stream generating portion 1200. If it is judged that the codes are not to be modified with reference, the code mode switching unit 1120 is adapted to output the upper layer information and the middle layer information to the multiplexing and encoding unit 1190 and the differential bit stream generating portion 1200.

The quantization controlling unit 1130 is adapted to output a macroblock re-quantization parameter, i.e., MQ2 with respect to each of macroblocks, i.e., MB to the prediction error calculating unit 1230 and the quantization coefficient converting unit 1140 in order to control the amount of bits. MQ2 is used as a macroblock re-quantization parameter to quantize each of the macroblocks contained in the original moving picture sequence information decoded from the original MPEG-2 bit streams to generate macroblocks to be contained in the transcoded MPEG-2 bit streams as well as a macroblock inverse-quantization parameter to inversely quantize each of the macroblocks contained in the transcoded MPEG-2 bit streams to reconstruct the macroblocks of the original moving picture sequence information.

The quantization coefficient converting unit 1140 is adapted to input QF1 and MQ1 from the demultiplexing and decoding unit 1110, and the re-quantization parameter MQ2 from the quantization controlling unit 1130. QF1 is the first coefficient information, i.e., the matrix of coefficients decoded from the original MPEG-2 bit streams, and MQ1 is a macroblock quantization parameter used to quantize each of the macroblocks contained in the original moving picture sequence information to generate the macroblocks to be contained in the original MPEG-2 bit streams as well as a macroblock inverse-quantization parameter used to inversely quantize each of the macroblocks contained in the original MPEG-2 bit streams to reconstruct the macroblocks contained in the original moving picture sequence information. Then, the quantization coefficient converter unit 1140 is adapted to inversely quantize the first coefficient information QF1 with the quantization parameter MQ1 and quantize the coefficient information thus inversely quantized with the re-quantization parameter MQ2 to generate second coefficient information, i.e., QF2. The quantization coefficient converter unit 1140 is adapted to output the second coefficient information QF2 to the multiplexing and encoding unit 1190, and the first coefficient information QF1 and the second coefficient information QF2 to the differential bit stream generating portion 1200. The first coefficient information QF1 and he second coefficient information QF2 are the lower layer information.

The multiplexing and encoding unit 1190 is adapted to input the upper layer information and the middle layer information from the code mode switching unit 1120 and the lower layer information from the quantization coefficient converter unit 1140, encode and multiplex the upper layer information and the middle layer information inputted from the code mode switching unit 1120 and the lower layer information inputted from the quantization coefficient converter unit 1140 to generate transcoded MPEG-2 bit streams to be outputted to the outputting terminal b1.

As shown in FIG. 3, the differential bit stream generating portion 1200 includes a differential coefficient information separating unit 1220, a prediction error computing unit 1230, a differential coefficient information zigzag scanning unit 1240, and a differential BS multiplexing and encoding unit 1290.

The differential coefficient information separating unit 1220 is adapted to input the first coefficient information QF1 and the second coefficient information QF2 from the transcoding portion 1100 to separate into the zero conversion first coefficient information QF1 (QF2=0) and the second zero coefficient information QF2=0 from the non-zero conversion first coefficient information QF1 (QF2≠0) and the second non-zero coefficient information QF2≠0, respectively, and output the non-zero conversion first coefficient information QF1 (QF2≠0) and the second non-zero coefficient information QF2≠0 to the prediction error computing unit 1230 and the zero conversion first coefficient information QF1 (QF2=0) to the differential coefficient information zigzag scanning unit 1240.

The prediction error computing unit 1230 is adapted to input the non-zero conversion first coefficient information QF1 (QF2≠0), the second non-zero coefficient information QF≠0 from the differential coefficient information separating unit 1220, the macroblock quantization parameter MQ1 from the demultiplexing and decoding unit 1110, and the macroblock re-quantization parameter MQ2 from the quantization controlling unit 1130 to extract differential information between the non-zero conversion first coefficient information QF1 (QF2≠0) and the second non-zero coefficient information QF2≠0 to generate differential non-zero coefficient information.

The differential coefficient information zigzag scanning unit 1240 is adapted to input the zero conversion first coefficient information QF1 (QF2=0) from the differential coefficient information separating unit 1220 to extract differential information between the zero conversion first coefficient information QF1 (QF2=0) and the second zero coefficient information QF2=0 to generate differential zero coefficient information.

More specifically, the prediction error computing unit 1230 is adapted to input the non-zero conversion first coefficient information QF1 (QF2≠0) and the second non-zero coefficient information QF2≠0 from the differential coefficient information separating unit 1220, and the macroblock quantization parameter MQ1 and the macroblock re-quantization parameter MQ2 from the transcoding portion 1100 to compute a prediction error, hereinlater referred to as "Δ QF", between the real non-zero conversion first coefficient information QF1 (QF2≠0) and an estimated non-zero conversion first coefficient information on the basis of the ratio of the macroblock re-quantization parameter MQ2 to the macroblock quantization parameter MQ1, the values of coefficients of the non-zero conversion first coefficient information QF1 (QF2≠0) and the values of the coefficients of the second non-zero coefficient information QF2≠0, and output the prediction error Δ QF thus computed to the differential BS multiplexing and encoding unit 1290 as lower layer information.

Here, the estimated non-zero conversion first coefficient information is intended to mean non-zero conversion first coefficient information estimated on the basis of the macroblock re-quantization parameter MQ2 and the macroblock quantization parameter MQ1, and the second non-zero coefficient information QF2≠0.

More specifically, the differential coefficient information zigzag scanning unit 1240 is adapted to input the zero conversion first coefficient information QF1 (QF2=0) from the differential coefficient information separating unit 1220 to scan the zero conversion first coefficient information QF1 (QF2=0) in a zigzag fashion to generate the differential zero coefficient information and output the differential zero coefficient information to the differential BS multiplexing and encoding unit 1290 as lower layer information.

The differential zero coefficient information includes combinations of run and level. The run is the number of consecutive zero-value coefficients, and the level is the value of a non-zero value coefficient immediately followed by the consecutive zero-value coefficient.

The differential coefficient information zigzag scanning unit 1240 is therefore adapted to eliminate zero coefficients in the zero conversion first coefficient information QF1 (QF2=0), thereby reducing the amount of information in the differential zero coefficient information.

The differential BS multiplexing and encoding unit 1290 is adapted to encode and multiplex the upper layer information and the middle layer information inputted from the code mode switching unit 1120 and the lower layer information inputted from the prediction error computing unit 1230 and the differential coefficient information zigzag scanning unit 1240 to generate the differential bit streams to be outputted to the second outputting terminal b2.

The differential coefficient information separating unit 1220 constitutes the coefficient information separating unit according to the present invention. The prediction error calculating unit 1230 constitutes the non-zero coefficient encoding unit according to the present invention. The differential coefficient information zigzag scanning unit 1240 constitutes the zero coefficient encoding unit according to the present invention.

As will be understood from the foregoing description, the bit stream separating apparatus 1000 thus construct is adapted to input the original MPEG-2 bit streams and output the transcoded MPEG-2 bit streams and the differential bit streams. The bit stream separating apparatus 1000 is adapted to alternately output codes of the transcoded MPEG-2 bit streams and the differential bit streams in response to codes of the original MPEG-2 bit streams sequentially inputted. This means that the bit stream separating apparatus 1000 is adapted to alternately switch codes to be outputted from the transcoded MPEG-2 bit streams to the differential bit streams and vice versa during the output operation.

The operation of switching the transcoded MPEG-2 bit streams and the differential bit streams performed during the output operation will be described in detail hereinlater.

Figure 4:
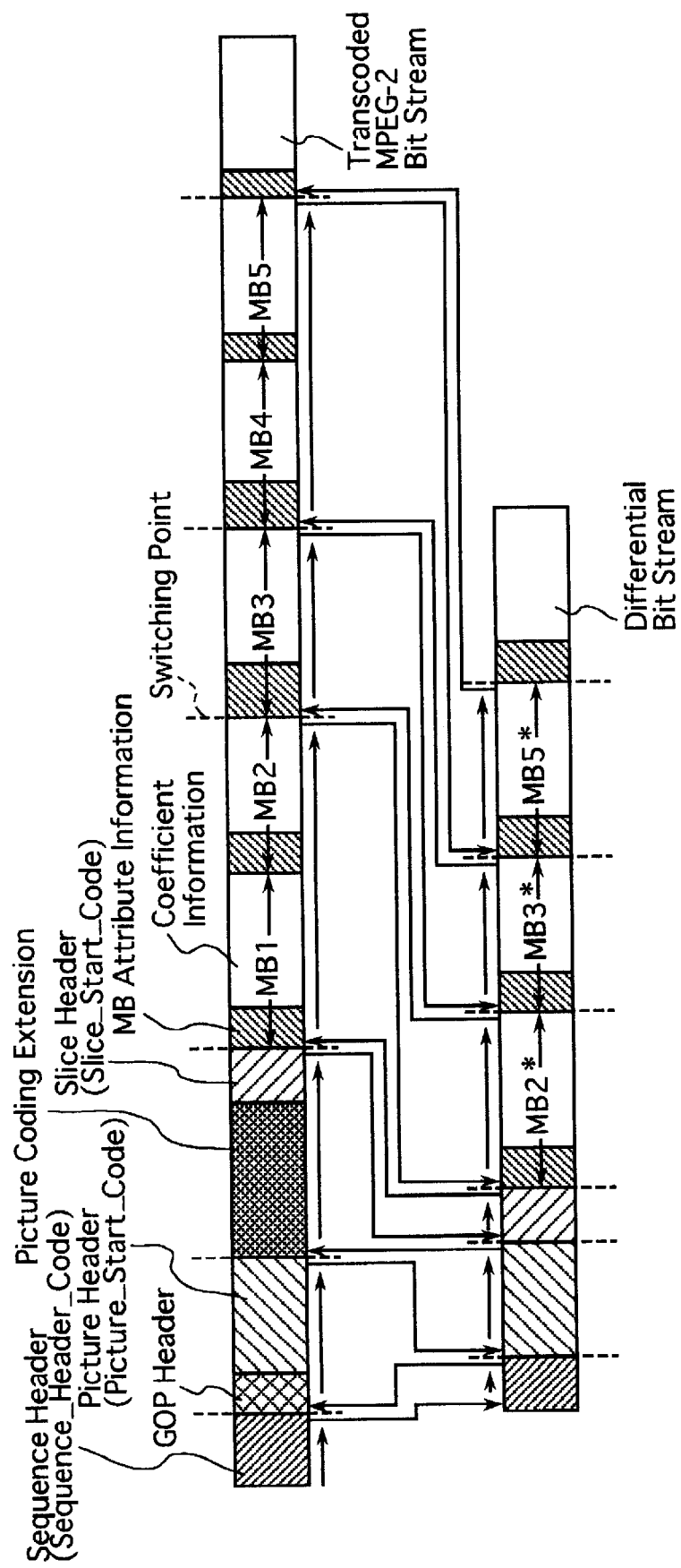
FIG. 4 is a conceptual diagram explaining the switching control of transcoded MPEG-2 bit streams and the differential bit streams according to the present invention.

The codes of the differential bit streams to be outputted are sequence headers, picture headers, slice headers, MB data elements, i.e., MB attribute information, and block data elements, i.e., coefficient information as shown in FIG. 4. The sequence headers, picture headers, and the slice headers are referred to as "codes of the upper layer information" or "upper layer codes". MB attribute information and coefficient information are referred to as "codes of middle layer information" and "codes of lower layer information", or "middle layer codes" and "lower layer codes", respectively.

With respect to upper layer codes, the codes of transcoded MPEG-2 bit stream correspond to the codes of the differential bit stream in a one-to-one relationship, thereby making it possible for the bit stream separating apparatus 1000 to alternately output the codes of the transcoded MPEG-2 bit streams and the differential bit streams one code after another as shown in FIG. 4.

This means that the bit stream separating apparatus 1000 is operated to output a sequence header Sequence_Header_Code of the transcoded MPEG-2 bit stream and subsequently output a sequence header Sequence_Header_Code of the differential bit stream.

In a similar manner, the bit stream separating apparatus 1000 is operated to output a picture header Picture_Start_Code of the differential bit stream followed by a picture header Picture_Start_Code of the transcoded MPEG-2 bit stream.

The bit stream separating apparatus 1000 is operated to output a slice header Slice_Start_Code of the transcoded MPEG-2 bit stream and subsequently output a picture header Slice_Start_Code of the differential bit stream.

With respect to the middle and lower layer codes, the bit stream separating apparatus 1000 is operated to judge if coefficient information is changed between the original MPEG-2 bit stream and the transcoded MPEG-2 bit stream for the corresponding macroblock after the middle layer and lower layer codes of the transcoded MPEG-2 bit stream is outputted, and sequentially output the middle layer codes and lower layer codes of the differential bit stream only when it is judged that the coefficient information is changed between the original MPEG-2 bit stream and the transcoded MPEG-2 bit stream as shown in FIG. 4.

This means that the bit stream separating apparatus 1000 is operated to generate and output differential information about the MB attribute information and coefficient information for the macroblocks for which it is judged that coefficient information is changed between the original and transcoded MPEG-2 bit streams and output the middle and output lower layer codes of the differential bit stream followed by the corresponding middle and lower layer codes of the transcoded MPEG-2 bit stream as shown in FIG. 4.

The bit stream merging apparatus 2000 is shown in FIG. 5 as comprising a transcoded bit stream inputting terminal a3 connected to a transmitting path such as network and storage, not shown, for inputting the transcoded MPEG-2 bit streams therethrough, a differential bit stream inputting terminal a4 connected to a transmitting path such as network and storage, not shown, for inputting the differential bit streams therethrough, a BS demultiplexing and decoding unit 2110, a differential BS demultiplexing and decoding unit 2120, a code mode switching unit 2130, a coefficient information reconstructing unit 2140, a differential coefficient information reconstructing unit 2150, an adding unit 2160, a reconstructed coefficient information scanning unit 2170, a multiplexing and encoding unit 2190, and a outputting terminal b3 connected to a transmission path, not shown.

The BS demultiplexing and decoding unit 2110 is adapted to input the transcoded MPEG-2 bit streams from the transcoded bit stream inputting terminal a3 to demultiplex and decode the upper layer information, the middle layer information, and the lower layer information, and output the upper layer information and the middle layer information thus demultiplexed and decoded to the code mode switching unit 2130 and the lower layer information thus demultiplexed and decoded to the coefficient information reconstructing unit 2140. The lower layer information of the transcoded MPEG-2 bit streams includes coefficient information, i.e., combinations of run and level.

The differential BS demultiplexing and decoding unit 2120 is adapted to input the differential bit streams from the differential bit stream inputting terminal a4 to demultiplex and decode the upper layer information, the middle layer information, and the lower layer information, and output the upper layer information and the middle layer information thus demultiplexed and decoded to the code mode switching unit 2130 and the lower layer information thus demultiplexed and decoded to the coefficient information reconstructing unit 2140 and the differential coefficient information reconstructing unit 2150.

The lower layer information of the differential bit streams includes coefficient information. The coefficient information of the differential bit stream, that is, differential coefficient information includes non-zero coefficient information, i.e., prediction error Δ QF, and zero coefficient information, i.e., combinations of runs and levels as described hereinbefore.

More specifically, the differential BS demultiplexing and decoding unit 2120 is adapted to output the differential non-zero coefficient information, i.e., the prediction error Δ QF to the coefficient information reconstructing unit 2140 and the differential zero coefficient information, i.e., the coefficient information run and level to the differential coefficient information reconstructing unit 2150.

The code mode switching unit 2130 is adapted to input the upper layer information and the middle layer information from the BS demultiplexing and decoding unit 2110 and the differential BS demultiplexing and decoding unit 2120 to reconstruct the upper layer information and the middle layer information of the original MPEG-2 bit stream information, macroblock quantization parameter MQ1, and macroblock re-quantization parameter MQ2, and output the upper layer information and the middle layer information of the original MPEG-2 bit stream information thus reconstructed to the multiplexing and encoding unit 2190 and the macroblock quantization parameter MQ1 and macroblock re-quantization parameter MQ2 thus reconstructed to the coefficient information reconstructing unit 2140.

The coefficient information reconstructing unit 2140 is adapted to input the lower layer information of the transcoded MPEG-2 bit stream, i.e., combinations of run and level from the BS demultiplexing and decoding unit 2110, the non-zero coefficient information of the differential bit stream, i.e., the prediction error Δ QF from the differential BS demultiplexing and decoding unit 2120, and the macroblock quantization parameter MQ1 and macroblock re-quantization parameter MQ2 from the code mode switching unit 2130 to reconstruct differential non-zero coefficient information, i.e., 8 by 8 matrices of coefficients and output the 8 by 8 matrices of coefficients thus reconstructed to the adding unit 2160.

The differential coefficient information reconstructing unit 2150 is adapted to input the differential zero coefficient information, i.e., the coefficient information run and level from the differential BS demultiplexing and decoding unit 2120 to reconstruct differential zero coefficient information, i.e., 8 by 8 matrices of coefficients and output the 8 by 8 matrices of coefficients thus reconstructed to the adding unit 2160.

The adding unit 2160 is adapted to input the differential non-zero coefficient information, i.e., 8 by 8 matrices of coefficients from the coefficient information reconstructing unit 2140 and the differential zero coefficient information, i.e., 8 by 8 matrices of coefficients from the differential coefficient information reconstructing unit 2150 and add the differential non-zero coefficient information, i.e., 8 by 8 matrices of coefficients to the differential zero coefficient information, i.e., 8 by 8 matrices of coefficients to reconstruct the 8 by 8 matrices of first coefficients of the original MPEG-2 bit streams and output the 8 by 8 matrices of the first coefficients of the original MPEG-2 bit streams thus reconstructed to the reconstructed coefficient information scanning unit 2170.

The reconstructed coefficient information scanning unit 2170 is adapted to input the reconstructed 8 by 8 matrices from the adding unit 2160 to scan runs and levels in a zigzag fashion to reconstruct one-dimensional combination of runs and levels, i.e., the first coefficient information, and output the first coefficient information, i.e., the lower layer information thus reconstructed to the multiplexing and encoding unit 2190.

The multiplexing and encoding unit 2190 is adapted to input the upper layer information and the middle layer information from the code mode switching unit 2130, and lower layer information from the reconstructed coefficient information scanning unit 2170, multiplex and encode the upper layer information, middle layer information, and the lower layer information to reconstruct the original MPEG-2 bit stream, and output the original MPEG-2 bit stream thus reconstructed to the outputting terminal b3.

The bit stream merging apparatus 2000 thus constructed is adapted to input and merge the transcoded MPEG-2 bit streams and the differential bit streams to reconstruct the original MPEG-2 bit streams.

The bit stream merging apparatus 2000 constitutes the coded signal merging apparatus according to the present invention. The transcoded bit stream inputting terminal a3 and the differential bit stream inputting terminal a4 constitute the second coded signal inputting means and the differential coded signal inputting means according to the present invention, respectively.

The BS demultiplexing and decoding unit 2110, the differential BS demultiplexing and decoding unit 2120, the code mode switching unit 2130, the coefficient information reconstructing unit 2140, the differential coefficient information reconstructing unit 2150, the adding unit 2160, the reconstructed coefficient information scanning unit 2170, and the multiplexing and encoding unit 2190 collectively constitute the first coded signal merging means according to the present invention.

The coefficient information reconstructing unit 2140 constitutes the non-zero conversion first coefficient information generating unit according to the present invention. The combinations of run and level from the BS demultiplexing and decoding unit 2110 and the prediction error Δ QF from the differential BS demultiplexing and decoding unit 2120 constitute the second non-zero coefficient information of the second coded moving picture sequence signal and the differential coefficient information of the differential coded moving picture sequence signal, respectively.

The differential coefficient information reconstructing unit 2150 and the adding unit 2160 collectively constitute the zero conversion first coefficient information generating unit according to the present invention. The combinations of run and level from the BS demultiplexing and decoding unit 2110 received through the coefficient information reconstructing unit 2140 and the coefficient information run and level from the differential BS demultiplexing and decoding unit 2120 constitutes the second zero coefficient information of the second coded moving picture sequence signal and the differential coefficient information of the differential coded moving picture sequence signal, respectively.

The adding unit 2160 and the reconstructed coefficient information scanning unit 2170 collectively constitute the first coefficient information merging unit according to the present invention.

The bit stream merging apparatus 2000 thus constructed can input the transcoded MPEG-2 bit streams and the differential bit streams to reconstruct the original MPEG-2 bit streams.

As will be understood from the foregoing description, the bit stream merging apparatus 2000 thus constructed is adapted to input the transcoded MPEG-2 bit streams and the differential bit streams to reconstruct the original MPEG-2 bit streams. The bit stream merging apparatus 2000 is adapted to alternately input codes of the transcoded MPEG-2 bit streams and the differential bit streams. This means that the bit stream merging apparatus 2000 is adapted to alternately input the codes of the transcoded MPEG-2 bit streams and the differential bit streams. This means that the bit stream merging apparatus 2000 is adapted to alternately switch codes to be inputted from the transcoded MPEG-2 bit streams to the differential bit streams and vice versa during the input operation.

The operation of switching the transcoded MPEG-2 bit streams and the differential bit streams performed during the input operation will be described in detail hereinlater.

With respect to the upper layer codes such as sequence headers, picture headers and slice headers, the codes of transcoded MPEG-2 bit stream correspond to the codes of the differential bit stream in a one-to-one relationship, thereby making it possible for the bit stream merging apparatus 2000 to alternately input the codes of the transcoded MPEG-2 bit streams and the differential bit streams one code after another code.

With respect to the middle layer codes and the lower layer codes such as MB attribute information and coefficient information, the bit stream merging apparatus 2000 is operated to judge if MB attribute information and coefficient information are provided in the macroblock of the differential bit stream every time when the MB attribute information and coefficient information in one macroblock of the transcoded MPEG-2 bit stream is read. The bit stream merging apparatus 2000 is operated to input the MB attribute information and coefficient information in the macroblock of the differential bit stream followed by the corresponding MB attribute information and coefficient information of the transcoded MPEG-2 bit stream in the macroblocks for which if it is judged that MB attribute information and coefficient information are provided in the macroblock of the differential bit stream.

Furthermore, the differential bit stream generating portion 1200 of the bit stream separating apparatus 1000 according to the present invention may be constructed separately from the transcoding portion 1100 of the bit stream separating apparatus 1000.

In this case, the differential bit stream generating portion 1200 may be provided with an original MPEG-2 bit stream inputting means and a transcoded MPEG-2 bit stream inputting means, not shown.

The original MPEG-2 bit stream inputting means may be operative to input the original MPEG-2 bit stream therethrough. The transcoded MPEG-2 bit stream inputting means is operative to input the transcoded MPEG-2 bit stream therethrough.

The original MPEG-2 bit stream inputting means constitutes the first coded signal inputting means according to the present invention, and the transcoded MPEG-2 bit stream inputting means constitutes the second coded signal inputting means according to the present invention.

The bit stream separating apparatus 1000 and bit stream merging apparatus 2000 according to the present invention, on the other hand, may be integrated to a single apparatus which enables to separate and merge the MPEG-2 bit stream.

The major constructions and functions of the bit stream separating apparatus 1000 and the bit stream merging apparatus 2000 according to the present invention have thus far been described.

The process of separating the original MPEG-2 bit stream to generate the transcoded MPEG-2 bit stream and the differential bit stream, and the process of merging the transcoded MPEG-2 bit stream and the differential bit stream to reconstruct the original MPEG-2 bit stream will be described in detail.

As described hereinbefore, the differential bit stream in the form of the hierarchical structure including the sequence layers, the picture layers, the slice layers, the macroblock layers, and the block layers.

The process of separating the original MPEG-2 bit stream to generate the transcoded MPEG-2 bit stream and the differential bit stream, and the process of merging the transcoded MPEG-2 bit stream and the differential bit stream to reconstruct the original MPEG-2 bit stream will be described hereinlater, in reference to the structure of the differential bit stream.

1. Upper Layer Codes of the Differential Bit Stream

The upper layer codes of the differential bit stream include the sequence header, the picture header, and the slice headers, as described hereinbefore.

As shown in FIG. 6(a), the sequence header of the differential bit stream contains "Sequence Header Code (Sequence_Header_Code)". Sequence Header Code is defined as a unique code of 32 bit length and used to synchronize bit streams per each of sequence layers.

The bit stream separating apparatus 1000 is operated to alternately output Sequence Start Codes of the transcoded MPEG-2 bit stream and the differential bit stream one code after another to synchronize the transcoded MPEG-2 bit stream and the differential bit stream. The bit stream merging apparatus 2000 is operated to alternately input Sequence Header Code of the transcoded MPEG-2 bit stream and only read the differential bit stream to synchronize the transcoded MPEG-2 bit stream and the differential bit stream.

As shown in FIG. 6(a), the sequence header of the differential bit stream may contain "Sequence Start Code (Sequence_Start_Code)", and "Original Bit Rate Value (Original_Bit_Rate Value)".

Sequence Start Code is defined as a defined as a unique code of 32 bit length and used to synchronize the differential bit stream and the transcoded MPEG-2 bit stream per each of sequence layers. Sequence Start Code can be searched in the MPEG-2 bit stream to detect the start of the sequence layer.

Original Bit Rate Value is defined as 18 bit length code and used to indicate the value of the bit rate of the original MPEG-2 bit stream divided by 400.

Each of the original MPEG-2 bit stream and the transcoded MPEG-2 bit stream contains Sequence Start Code and Bit Rate Value in place of Original Bit Rate Value. Bit Rate Value of the original MPEG2 bit stream or the transcoded MPEG-2 bit stream indicates the bit rate value of the original MPEG-2 bit stream or the transcoded MPEG-2 bit stream.

The differential BS multiplexing and encoding unit 1290 of the bit stream separating apparatus 1000 has a sequence header attaching unit, not shown, to generate and attach the sequence headers, i.e., Sequence Start Codes or Sequence Start Codes to the respective sequence layers of the differential bit stream.

Furthermore, the differential BS multiplexing and encoding unit 1290 of the bit stream separating apparatus 1000 has a bit rate information attaching unit, not shown, to generate first bit rate information, i.e., Original Bit Rate Value on the basis of the value of the bit rate divided by 400 and attach the first bit rate information to the respective sequence layers of the differential bit stream.

The multiplexing and encoding unit 2190 of the bit stream merging apparatus 2000 has a bit rate information reconstructing unit, not shown, to obtain the first bit rate information i.e., Original Bit Rate Value from the sequence layer of the differential bit stream to reconstruct the original MPEG-2 bit stream at the bit rate indicated by the first bit rate information.

The bit stream separating apparatus 1000 is operated to alternately output Sequence Start Code and Bit Rate Value of the transcoded MPEG-2 bit stream and Sequence Start Code and Original Bit Rate Value of the differential bit stream to synchronize transcoded MPEG-2 bit stream and differential bit stream. The bit stream merging apparatus 2000 is operated to alternately input Sequence Start Code and Bit Rate Value of the transcoded MPEG-2 bit stream and read Sequence Start Code and Original Bit Rate Value of the differential bit stream to synchronize the transcoded MPEG-2 bit stream and the differential bit stream. The multiplexing and encoding unit 2190 of the bit stream merging apparatus 2000 is operated to replace Bit Rate Value of the transcoded MPEG-2 bit stream with Original Bit Rate Value of the differential bit stream upon reading Original Bit Rate Value of the differential bit stream so as to precisely reconstruct the sequence header of the original MPEG-2 bit stream.

As shown in FIG. 6(b), the picture header of the differential bit stream contains "Picture Start Code (Picture_Start_Code)", "Temporal Reference (Temporal_Reference)", "Picture Coding Type (Picture_Coding_Type)", and "VBV Delay (VBV_Delay)".

Picture Start Code is defined as 32 bit length code and used to synchronize bit streams per each of picture layers. Temporal Reference, hereinlater referred to as "TR", is defined as 10 bit length code and used to indicate the sequence of picture in the GOP layer. Picture Coding Type, hereinlater referred to as "PCT" is defined as 2 bit length code and used to indicate the type of picture.

VBV Delay is defined as 16 bit length code and used to indicate the capacity of VBV buffer, i.e., Video Buffering Verifier in units of 90 kHz clock.

TR and PCT remain unchanged between the original MPEG-2 bit stream and the transcoded MPEG-2 bit stream. TR and PCT can be used to synchronize MPEG-2 bit streams in addition to Picture Start Code per each of picture layers.

The value of the VBV Delay of the transcoded MPEG-2 bit stream is different from the value of the VBV Delay of the original MPEG-2 bit stream since the bit rate changes between the original MPEG-2 bit stream and the transcoded MPEG-2 bit stream. VBV Delay of the transcoded MPEG-2 bit stream is hereinlater referred to as "Vbv Delay (Vbv_Delay)". The value of VBV Delay of the original MPEG-2 bit stream is written in VBV Delay of the differential bit stream. VBV Delay of the differential bit stream is same as that of VBV Delay of the original MPEG-2 bit stream.

The differential BS multiplexing and encoding unit 1290 of the differential bit stream generating portion 1200 is provided with a picture header attaching unit, not shown, to obtain TR, PCT, and VBV_Delay of the original MPEG-2 bit stream from the code mode switching unit 1120, and sequentially attach Picture Start Code, TR, PCT, and VBV_Delay to the picture layer of the differential bit stream.

This means that differential BS multiplexing and encoding unit 1290 is operative to obtain VBV_Delay information indicative of the capacity of VBV buffer from the transcoding portion 1100 and attach the VBV_Delay information to the differential bit stream, which will be described later.

The differential BS multiplexing and encoding unit 1290 constitutes the VBV_Delay attaching unit according to the present invention.

The code mode switching unit 2130 and the multiplexing and encoding unit 2190 of the bit stream merging apparatus 2000 are operated to obtain VBV Delay indicative of the capacity of VBV buffer from the differential bit stream to replace Vbv Delay of the transcoded MPEG-2 bit stream with VBV Delay of the differential bit stream so as to reconstruct VBV Delay of the original MPEG-2 bit stream.

The code mode switching unit 2130 and the multiplexing and encoding unit 2190 of the bit stream merging apparatus 2000 collectively constitute the VBV_Delay attaching unit according to the present invention.

As shown in FIG. 6(c), the slice header of the differential bit stream contains "Slice Start Code (Slice_Start_Code)" and "Slice MQm Value (Slice_MQm_Value)".

Slice Start Code is defined as a unique code of 32 bit length and used to synchronize bit streams per each of slice layers. Slice MQm Value is defined as a slice quantization parameter reconstruction code, i.e., slice quantization parameter reconstruction information of 1 to 31 bit length.

The bit stream separating apparatus 1000 and the bit stream merging apparatus 2000 according to the present invention are operated to prevent the total of the bit rates of the transcoded MPEG-2 bit streams and the differential bit stream from exceeding the bit rate of the original MPEG-2 bit streams by setting quantization parameter prohibition areas.

The operation of preventing the total bit rate of the transcoded MPEG-2 bit streams and the differential bit streams from exceeding the bit rate of the original MPEG-2 bit streams by setting quantization parameter prohibition areas, is hereinlater referred to as "the control operation by means of setting quantization parameter prohibition areas".

The slice quantization parameter used to inversely quantize the original MPEG-2 bit stream is referred to as "SMQ1". The slice quantization parameter used for re-quantization to generate the transcoded MPEG-2 bit stream is referred to as "SMQ2".

The control operation by means of setting quantization parameter prohibition areas with respect to the slice re-quantization parameter SMQ2 will be described in detail.

The control operation by means of setting quantization parameter prohibition areas is performed by limiting the slice re-quantization parameters SMQ2. More specifically, a transcoder computes a slice re-quantization parameter, referred to as "SMQ2*" in accordance with the quantization characteristic inherent to the transcoder. The control operation is performed by updating SMQ2* in a fashion described hereinlater to generate slice re-quantization parameter SMQ2 in order to limit the slice re-quantization parameter.

The slice re-quantization parameter SMQ2 is computed by updating SMQ2* in accordance with a slice re-quantization parameter derivation constant, hereinlater referred to as "sm". "sm" is an integer. The slice re-quantization parameter derivation constant sm can be used to reconstruct the slice quantization parameter SMQ1. The slice re-quantization parameter derivation constant sm is also referred to as "slice quantization parameter derivation constant", which will be described later.

More specifically, the transcoding portion 1100 of the bit stream separating apparatus 1000 is operative to inversely quantize each of the macroblocks contained in the slice layers of the original MPEG-2 bit stream in accordance with a slice quantization parameter SMQ1 used for the quantization of each of the macroblocks contained in the slice layers of the original moving picture sequence information to reconstruct the original moving picture sequence signal, and quantize each of the macroblocks in the slice layers of the reconstructed original moving picture sequence signal in accordance with a slice layer re-quantization parameter SMQ2 used for the inverse-quantization of each of the macroblocks contained in the slice layers of the transcoded MPEG-2 bit stream to generate the transcoded MPEG-2 bit stream.

The differential bit stream generating portion 1200 of the bit stream separating apparatus 1000 includes a slice quantization parameter reconstruction information generating unit operative to generate slice quantization parameter reconstruction information Slice MQm Value used to reconstruct slice quantization parameter SMQ1.

The prediction error calculating unit 1230 and the differential BS multiplexing and encoding unit 1290 of the differential bit stream generating portion 1200 collectively constitute the slice quantization parameter reconstruction information generating unit according to the present invention.

The differential bit stream generating portion 1200 is operative to generate the slice quantization parameter reconstruction information sm in accordance with Equations (1) and (2) as follows:

intra-picture                                  Equation (1)

$$sm = \left\lceil \frac{SMQ2^* - 1}{2 \times SMQ1} \right\rceil$$

inter-picture                                  Equation (2)

$$sm = \left\lceil \frac{SMQ2^* - 1}{SMQ1 + 0.5} - 1 \right\rceil$$

where ⌈ ⌉ in the above equation is intended to mean the rounding operation.

Then, the slice re-quantization parameter SMQ2 is computed by using the slice quantization parameter SMQ1 and the slice quantization parameter derivation constant sm by Equations (3) and (4) as follows:
   intra-picture $SMQ2=2sm \times SMQ1+1$ $(sm \neq 0)=SMQ1$ $(sm=0)$     Equation (3)

inter-picture $SMQ2=(sm+1) \times SMQ1$                              Equation (4)

The fractional portions of $$\frac{SMQ2^* - 1}{2 \times SMQ1} \text{ and } \frac{SMQ2^* - 1}{SMQ1 + 0.5} - 1$$

of Equation (1) and Equation (2) are dropped. Furthermore, the slice quantization parameter derivation constant sm and the slice re-quantization parameter SMQ2 thus computed are integers. This leads to the fact that the slice re-quantization parameter SMQ2 is limited to certain values, thereby setting prohibition areas for the slice re-quantization parameter SMQ2.

The process of encoding the slice headers of the differential bit streams performed by the bit stream separating apparatus 1000 will be described hereinlater.

The bit stream separating apparatus 1000 is operated to compute the slice quantization parameter derivation constant sm on the basis of SMQ1, SMQ2* in accordance with Equations (1) and (2), write the slice quantization parameter derivation constant sm into Slice MQm Value, and encode and output Slice MQm Value followed by Slice Start Code.

The slice re-quantization parameter derivation constant sm is accordingly assigned to the slice quantization parameter reconstruction code, Slice MQm Value to be used to reconstruct the slice quantization parameter SMQ1. The slice re-quantization parameter derivation constant sm is to be used to reconstruct the slice quantization parameter SMQ1 from the slice re-quantization parameter SMQ2, and is, therefore, referred to as slice quantization parameter derivation constant, hereinlater.

This means that the differential bit stream generating portion 1200 of the bit stream separating apparatus 1000 is operative to generate the slice quantization parameter reconstruction information Slice MQm Value on the basis of the slice quantization parameter derivation constant sm used to reconstruct the slice quantization parameter SMQ1 from the slice re-quantization parameter SMQ2.

The slice quantization parameter derivation constant sm will be also used as an initial value of m_prev used to update a macroblock quantization parameter in each of macroblocks in the respective slice layer during the encoding operation, which will be described later.

The process of decoding the slice headers of the differential bit streams performed by the bit stream merging apparatus 2000 will be described hereinlater.

The code mode switching unit 2130, the coefficient information reconstructing unit 2140, the differential coefficient information reconstructing unit 2150, the adding unit 2160, and the reconstructed coefficient information scanning unit 2170 of the bit stream merging apparatus 2000 collectively constitute a slice macroblock quantization parameter reconstruction information reconstructing section, not shown.

The slice macroblock quantization parameter reconstruction information reconstructing section is operative to reconstruct the slice quantization parameter reconstruction information, the first macroblock quantization parameter reconstruction information, sm used to reconstruct the slice quantization parameter (SMQ1) from the differential bit stream to reconstruct the slice quantization parameter (SMQ1).

The code mode switching unit 2130, the coefficient information reconstructing unit 2140, the differential coefficient information reconstructing unit 2150, the adding unit 2160, and the reconstructed coefficient information scanning unit 2170 of the bit stream merging apparatus 2000 collectively constitute the slice quantization parameter reconstruction information reconstructing section according to the present invention.

The bit stream merging apparatus 2000 is operated to decode Slice MQm Value followed by Slice Start Code to obtain the slice quantization parameter derivation constant sm. The bit stream merging apparatus 2000 is also operated to obtain SMQ2 from the transcoded MPEG-2 bit stream. The bit stream merging apparatus 2000 is then operated to compute SMQ1 on the basis of sm and SMQ2 in accordance with Equation (5) and (6) as follows:

intra-picture                                  Equation (5)

$$SMQ1 = \frac{SMQ2 - 1}{2 \times sm} \quad (sm \neq 0)$$
$$\phantom{SMQ1} = SMQ2 \quad (sm = 0)$$

inter-picture $SMQ1=SMQ2/(sm+1)$                              Equation (6)

The slice quantization parameter derivation constant sm will be also used as an initial value of m_prev used to update a macroblock quantization parameter in each of macroblocks in the respective slice layer during the decoding operation, which will be described later.

2. Middle Layer Codes of the Differential Bit Stream

The macroblock layer of the MPEG-2 bit streams contains macroblock attribute information including a macroblock address indicating the position of the macroblock, a macroblock address increment, i.e., MBAI indicating the number of the macroblock addresses to be skipped, and a coded block pattern indicating the positions of encoded blocks and non-encoded blocks in the macroblock layer, which will be described hereinlater.

Figure 7:
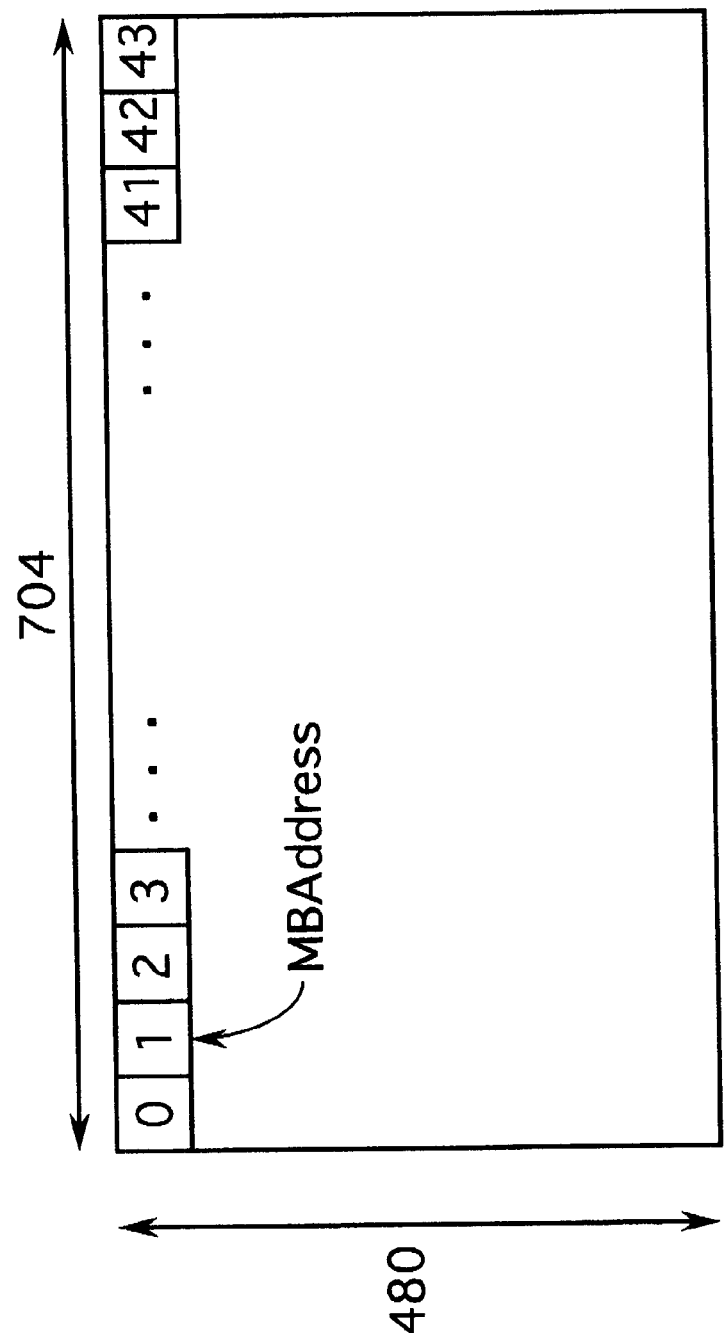
FIG. 7 is a schematic diagram showing MB addresses.

The macroblock address, i.e., MB address of a macroblock is defined as a MB position index in the horizontal direction, starting from "0" up to "MBLength-1". Here, "MBLength" is intended to mean the number of macroblocks aligned for one line. FIG. 7 shows MB addresses of picture information with spatial resolution of 704 [pel]×480 [lines].

As shown in FIG. 6(d), the macroblock layer of the differential bit stream includes macroblock attribute information, i.e., MB attribute information containing a macroblock address increment, i.e., MBAI indicating the number of the macroblock addresses to be skipped, macroblock quantization parameter reconstruction information, i.e., MB quantization parameter reconstructing codes (MQ Δm Value) used to reconstruct macroblock quantization parameters, differential CBP value strings (CBP_y, CBP_uv), which are differential coded block patterns between the coded block patterns of the original MPEG-2 bit stream and the transcoded MPEG-2 bit stream. The MBAI contained in the macroblock layer of the differential bit stream is referred to as "differential MBAI". The macroblock contained in the differential bit stream is referred to as "differential macroblock".

The differential bit stream generating portion 1200 of the bit stream separating apparatus 1000 is operated to input macroblocks of the original MPEG-2 bit stream and the transcoded MPEG-2 bit stream from the transcoding portion 1100 to generate macroblocks of the differential bit stream, which are the differences between the macroblocks of the original MPEG-2 bit stream and the transcoded MPEG-2 bit stream with respect to the respective macroblock addresses as shown in FIG. 4. This means that the differential bit stream generating portion 1200 is operated to generate the differential macroblocks of the differential bit stream with respect to the macroblock addresses so as to eliminate macroblocks remained unchanged between the original MPEG-2 bit stream and the transcoded MPEG-2 bit stream with respect to the respective macroblock addresses.

The differential coefficient information separating unit 1220, the prediction error computing unit 1230, the differential coefficient information zigzag scanning unit 1240, and the differential BS multiplexing and encoding unit 1290 of the differential bit stream generating portion 1200 collectively constitute the differential macroblock coding unit according to the present invention.

The differential BS multiplexing and encoding unit 1290 of the bit stream separating apparatus 1000 is provided with a MBAI coding unit, not shown. The MBAI coding unit is adapted to generate the MBAI of the macroblock attribute information of the differential bit stream. MBAI indicates the number of the macroblock addresses eliminated by the differential bit stream generating portion 1200 with respect to the macroblocks of the differential bit streams generated by the differential bit stream generating portion 1200 so that the macroblocks of the differential bit stream correspond to the macroblocks of the original MPEG-2 bit stream and the macroblocks of the transcoded MEPG-2 bit stream with respect to the respective macroblock addresses.

The macroblock address increment MBAI of the differential bit stream will be described in detail.

The differential bit stream is generated as a result of encoding differences between the original MPEG-2 bit stream and the transcoded MPEG-2 bit stream. There are provided macroblocks whose coefficient information remains unchanged after the re-quantization operation. Furthermore, macroblocks consisting of only zero coefficients remains unchanged after the re-quantization operation. Those macroblocks do not contain any significant information and are accordingly intended to be skipped. More specifically, not all of the macroblocks of the transcoded MPEG-2 bit stream contain significant information to be encoded for the differential bit stream.

The differential bit stream generating portion 1200 is therefore operated to generate the differential macroblocks of the differential bit stream for the macroblocks whose coefficient information changed after the re-quantization operation with respect to the macroblock addresses so as to eliminate macroblocks remained unchanged between the original MPEG-2 bit stream and the transcoded MPEG-2 bit stream with respect to the respective macroblock addresses.

This means that the macroblocks of the differential bit stream do not correspond to the macroblocks of the transcoded MPEG-2 bit stream in a one-to-one relationship.

The macroblock address increment MBAI of the differential bit stream indicates the position of a macroblock of the differential bit stream as a difference between the address of macroblock previously encoded and the address of the concerned macroblock.

The process of computing and encoding the macroblock address increment MBAIs in a slice layer performed by the bit stream separating apparatus 1000 will be described in reference to the flowchart of FIG. 8. The process of encoding and decoding the macroblock address increment MBAI is referred to as "MB address control".

Figure 8:
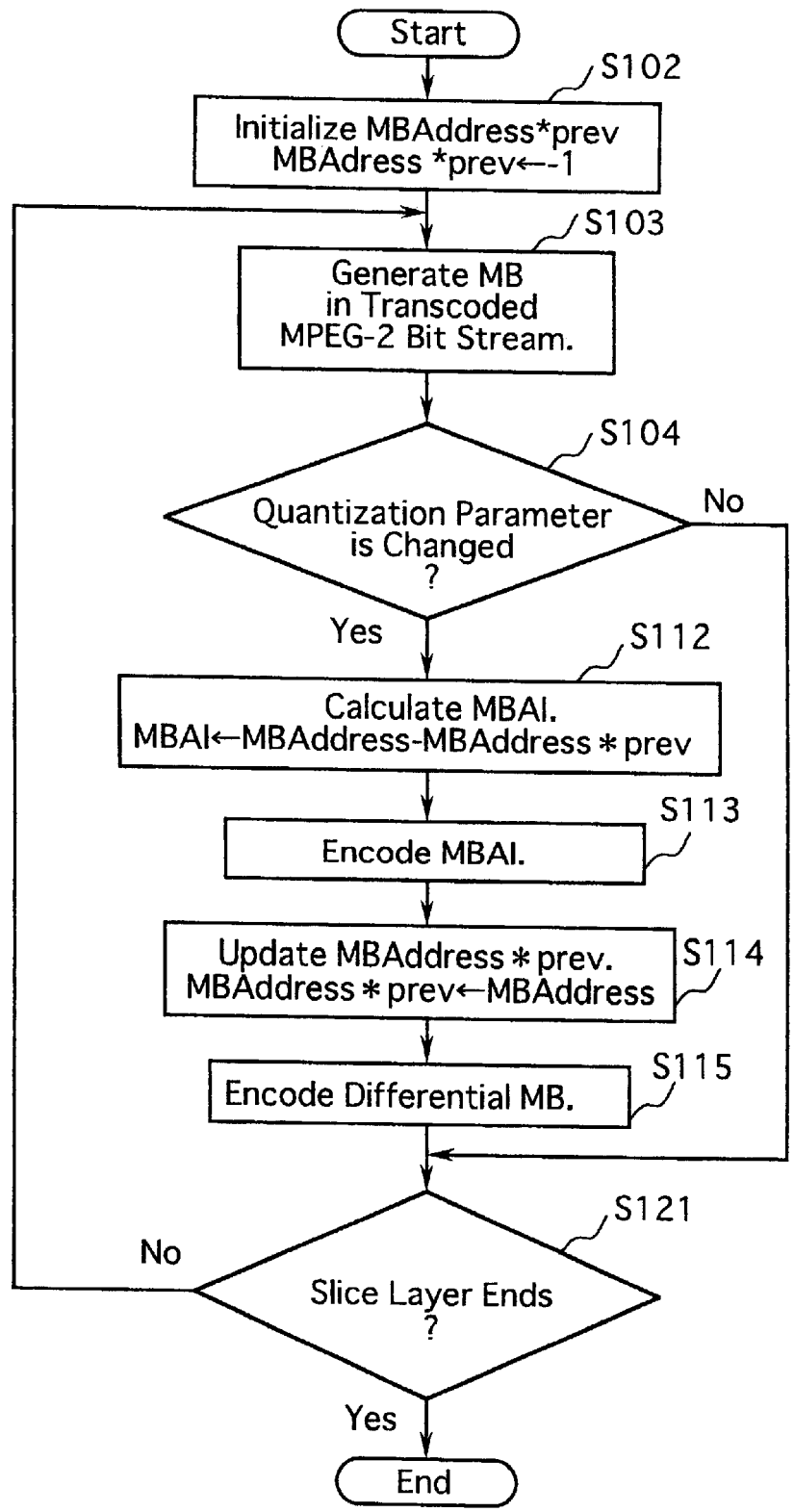
FIG. 8 is a flowchart showing the flow of the process of MB address control performed during the encoding operation according to the present invention.

In the flowchart of FIG. 8, the address of the concerned macroblock is referred to as "MBAddress", the address of the macroblock previously encoded is referred to as "MBAddress*prev".

In the step S102, MBAddress*prev is initialized to −1. The step S102 goes forward to the step S103 in which a macroblock in the slice layer of the transcoded MPEG-2 bit stream is encoded. The step S103 goes forward to the step S104 in which it is judged whether the quantization parameter of the macroblock of the transcoded MPEG-2 bit stream just generated is changed from the quantization parameter of the corresponding macroblock of the slice layer of the original MPEG-2 bit stream. If it is judged that the quantization parameter is not changed, the step S104 goes forward to the step S121. Otherwise, the step S104 goes forward to the S112 in which MBAI is computed as follows:

MBAI=MBAddress−MBAddress*prev wherein MBAddress is the address of the concerned macroblock just judged. This means that the value of MBAI is computed by adding one to MBAdress at the initial routine of the flow chart since MBAddress*prev is minus one at the initial routine.

The step S112 goes forward to the step S113 in which MBAI is encoded to a variable length code in accordance with a variable length code table, which will be described later. The step S113 goes forward to the step S114 in which MBAddress*prev is updated by assigning MBAddress to MBAddress*prev. The step S114 goes forward to the step S115 in which all the codes of the differential macroblock are encoded. The step S115 goes forward to the step S121 in which it is judged whether the slice layer ends, that is, it is judged whether all the macroblocks of the slice layer of the transcoded MPEG-2 bit stream have been processed. If it is judged that all the macroblocks of the slice layer of the transcoded MPEG-2 bit stream have not yet been processed, the step S121 goes forward to the step S103. Otherwise, the step S121 goes forward to the step END.

As described hereinearlier, the macroblocks of the differential bit stream do not correspond to the macroblocks of the transcoded MPEG-2 bit stream in a one-to-one relationship. This means that the MB addresses of the differential bit stream do not correspond to those of the transcoded MPEG-2 bit stream. This leads to the fact that the MBAIs of the differential bit stream are independent of MBAIs of the transcoded MPEG-2 bit stream. In the process of decoding MBAI of the differential bit stream, i.e., the process of MB address control, macroblocks of the differential bit stream are sequentially matched with the corresponding macroblocks of the transcoded MPEG-2 bit streams.

The process of decoding MBAI in a slice layer performed by the bit stream merging apparatus 2000 will be described in reference to the flowchart of FIG. 9.

Figure 9:
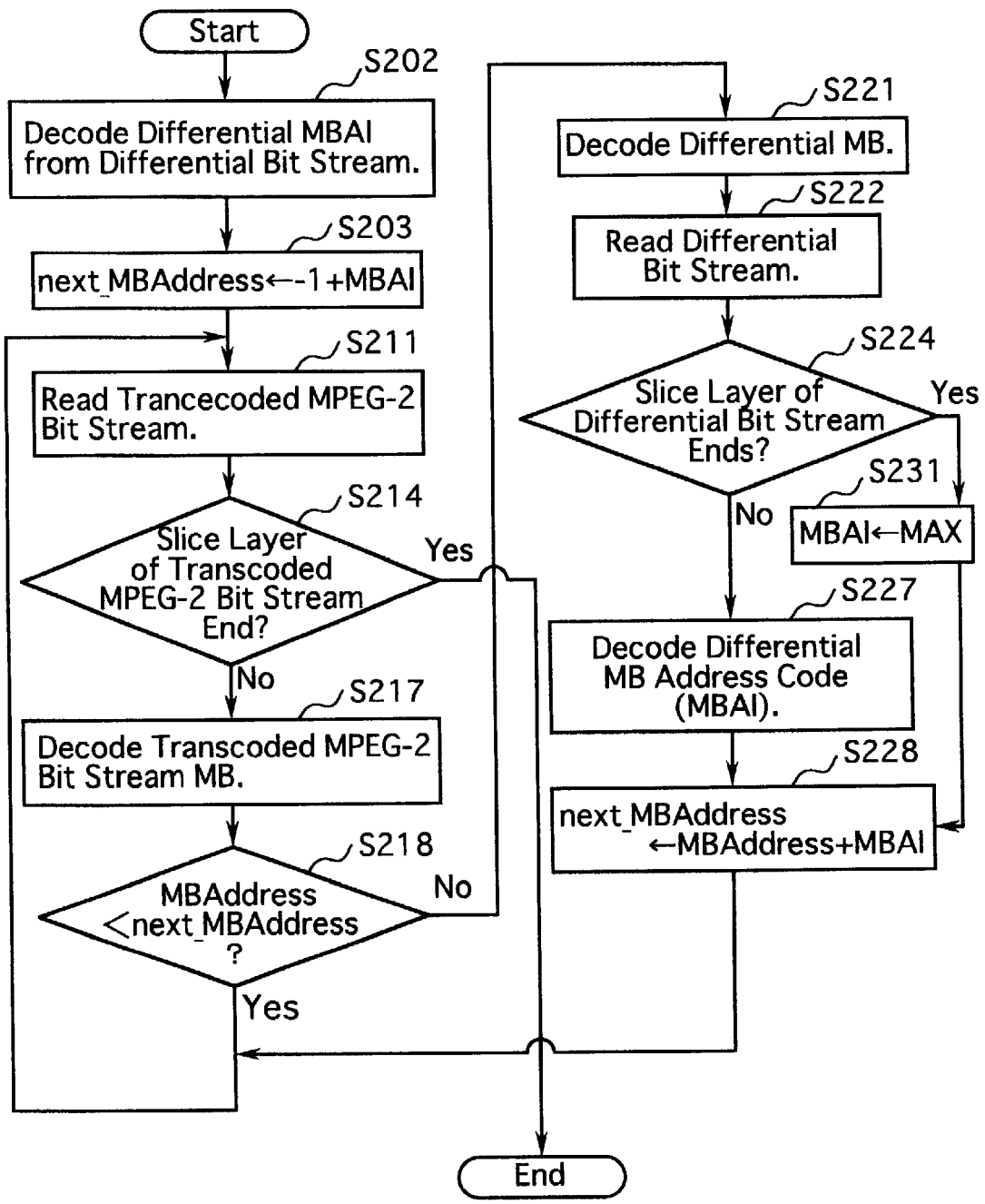
FIG. 9 is a flowchart showing the flow of the process of MB address control performed during the decoding operation according to the present invention.

In the flowchart of FIG. 9, the address of the concerned macroblock is referred to as "MBAddress", the address of the macroblock to be decoded subsequently is referred to as "next_MBAddress.

In the step S202, a differential MBAI of the leading macroblock in the slice layer of the differential bit stream is read and decoded. The step S202 goes forward to the step S203 in which next_MBAddress is computed on the basis of the differential MBAI just decoded as follows:

next_MBAddress=−1+MBAI

Figure 10:
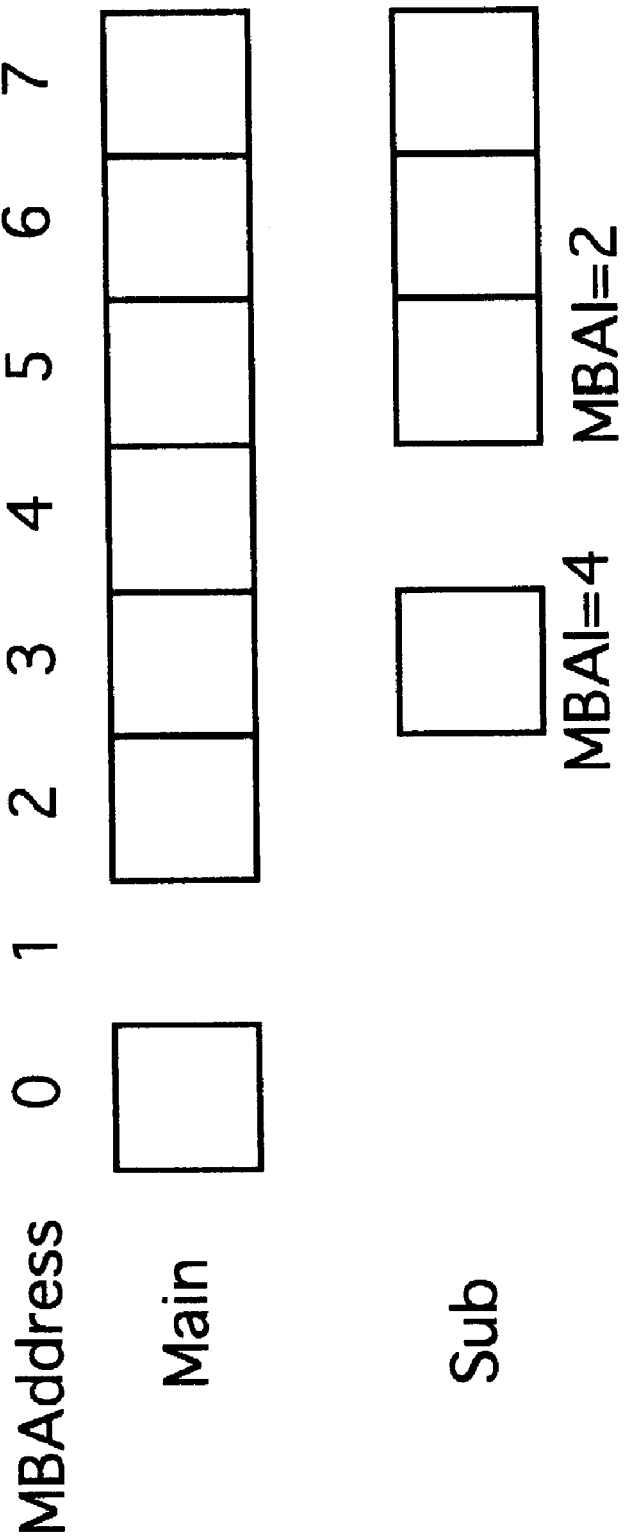
FIG. 10 is a schematic view for explaining the relationship between MB addresses of transcoded MPEG-2 bit streams and MB addresses of differential bit streams.

The schematic view of FIG. 10 shows an example of the MB addresses of the transcoded MPEG-2 bit stream and the differential bit stream to explain the relationship between the MB addresses of the transcoded MPEG-2 bit stream and the MB addresses of the differential bit stream.

In the example shown in FIG. 10, the transcoded MPEG-2 bit stream is referred to as "Main" and the differential bit stream is referred to as "Sub". The address of the first macroblock of the slice layer of the differential bit stream (Sub) corresponds to the MB address 3 of the transcoded MPEG-2 bit stream (Main) and MBAI of the first macroblock of the differential bit stream is 4. This means that next_MBAddress is computed in the step S203 as follows:

next_MBAddress=−1+4=3

In the step S211, one macroblock of the transcoded MPEG-2 bit stream is read. The step S211 goes forward to the step S214 in which it is judged whether the slice layer of the transcoded MPEG-2 bit stream ends, i.e., all the macroblocks of the slice layer of the transcoded MPEG-2 bit stream have been read. If it is judged that the all the macroblocks of the slice layer of the transcoded MPEG-2 bit stream have been read, the step S214 goes to the step END. Otherwise, the step S214 goes forward to the step S217 in which the concerned macroblock of the slice layer of the transcoded MPEG-2 bit stream is decoded. The step S217 goes forward to the step S218 in which it is judged whether MBAddress is less than next_MBAddress. If it is judged that MBAddress is less than next_MBAddress, the step S218 returns to the step S211. The steps from the step S211 to the step S217 are repeated until the MBAddress becomes not less than next_MBAddress. If it is judged that MBAddress is not less than next_MBAddress in the step S218, the step S218 goes forward to the step S221 in which macroblock of MBAddress of the differential bit stream is decoded. The step S221 goes forward to the step S222 in which the macroblock (MBAddress) of the differential bit stream is read. The step S222 goes forward to the step S224 in which it is judged whether the slice layer of the differential bit stream ends, that is, it is judged whether all the macroblocks of the slice layer of the differential bit stream have been processed. If it is judged that all the macroblocks of the slice layer of the differential bit stream have been processed, the step S224 goes forward to the step S231 in which the maximum value of MBAI is assigned to MBAI. Here, the maximum value of MBAI can be calculated, for instance, as a difference between the greatest MB address and the smallest MB address of the differential bit stream. Then, the step S231 goes forward to the step S228. If it is judged that all the macroblocks of the slice layer of the differential bit stream have not yet been processed in the step S224, the step S224 goes forward to the step S227 in which the next differential MBAI of the differential bit stream is read and decoded. The step S227 goes forward to the step S228 in which next_MBAddress is updated as follows:

next_MBAddress=MBAddress+MBAI  Equation (7)

In the example shown in FIG. 10, the differential bit stream has another macroblock of the MB address 5 next to the first macroblock of the MB address 3. This meant that MBAI=2 is decoded in the step S227 and next_MBAddress is computed in the step S228 as follows:

next_MBAddress=3+2=5

Then, the step S228 returns to the step S211. The steps S211 to S217 are repeated until MBAddress becomes not less than next_MBAddress.

The macroblock quantization parameter reconstruction information, i.e., MB quantization parameter reconstructing code (MQ Δm Value) of the differential bit stream will be described in detail. The MB quantization parameter reconstructing code MQ Δm Value can be referred to as "differential MB quantization parameter derivation constant" as well.

The quantization parameter used to inversely quantize the original MPEG-2 bit stream is referred to as "MQ1". The quantization parameter used for re-quantization to generate the transcoded MPEG-2 bit stream is referred to as "MQ2".

The control operation by means of setting quantization parameter prohibition areas is performed with respect to the macroblock re-quantization parameter MQ2 in the same manner as described in the control operation by means of setting quantization parameter areas with respect to the slice re-quantization parameter SMQ2.

A transcoder computes a re-quantization parameter, referred to as "MQ2*" in accordance with the quantization characteristic inherent to the transcoder. The control operation is performed by updating MQ2* to generate re-quantization parameter MQ2 in order to limit the quantization parameter.

This means that the re-quantization parameter MQ2 is computed by updating MQ2* in accordance with a quantization parameter derivation constant, hereinlater referred to as "m". "m" is an integer. MB quantization parameter reconstructing code (MQ Δm Value) is used to reconstruct the macroblock quantization parameter MQ1. "m" is also referred to as "re-quantization parameter derivation constant".

More specifically, the transcoding portion 1100 of the bit stream separating apparatus 1000 is operated to input the macroblocks of the original MPEG-2 bit stream to inversely quantize each of the macroblocks contained in the original MPEG-2 bit stream in accordance with the macroblock quantization parameter MQ1 to reconstruct the original moving picture sequence information, and quantize each of the macroblocks of the reconstructed original moving picture sequence information in accordance with the macroblock re-quantization parameter MQ2 to generate the transcoded MPEG-2 bit stream.

The differential bit stream generating portion 1200 includes a macroblock quantization parameter reconstruction information generating unit, not shown, operative to generate macroblock quantization parameter reconstruction information, i.e., MB quantization parameter reconstructing code (MQ Δm Value) used to reconstruct the macroblock quantization parameter MQ1.

The prediction error calculating unit 1230 and the differential BS multiplexing and encoding unit 1290 of the differential bit stream generating portion 1200 collectively constitute the macroblock quantization parameter reconstruction information generating unit according to the present invention.

The differential bit stream generating portion 1200 is operative to generate the macroblock quantization parameter reconstruction information MQ Δm Value) on the basis of the macroblock quantization parameter derivation constant m used to reconstruct the macroblock quantization parameter MQ1 from the macroblock re-quantization parameter MQ2.

The differential bit stream generating portion 1200 is operated compute m in accordance with Equations (8) and (9) as follows:

intra-picture $\quad$ Equation (8)
$$m = \left\lceil \frac{MQ2^* - 1}{2 \times MQ1} \right\rceil$$

inter-picture $\quad$ Equation (9)
$$m = \left\lceil \frac{MQ2^* - 1}{MQ1 + 0.5} - 1 \right\rceil$$

where in the above equation is intended to mean the rounding operation.

Then, the differential bit stream generating portion 1200 compute the re-quantization parameter MQ2 by using the quantization parameter MQ1 and the re-quantization parameter derivation constant m by Equations (10) and (11) as follows:
intra-picture $MQ2=2m \times MQ1+1$ (sm≠0)=MQ1 (sm=0) $\quad$ Equation (10)

inter-picture $MQ2=(m+1) \times MQ1$ $\quad$ Equation (11)

The fractional portions of $$\frac{MQ2^* - 1}{2 \times MQ1} \text{ and } \frac{MQ2^* - 1}{MQ1 + 0.5} - 1$$

of Equation (8) and Equation (9) are dropped. Furthermore, the re-quantization parameter derivation constant m and the re-quantization parameter MQ2 thus computed are integers. This leads to the fact that the re-quantization parameter MQ2 is limited to certain values, thereby setting prohibition areas for the re-quantization parameter MQ2.

The differential bit stream generating portion 1200 of the bit stream separating apparatus 1000 is operated to compute the MB quantization parameter derivation constant m on the basis of MQ1, MQ2 in accordance with Equations (8) and (9), compute a differential MB quantization derivation constant Δm, which is a difference between the present MB quantization parameter derivation constant m just computed and the previous MB quantization parameter derivation constant, i.e., "m_prev", previously computed, and write the differential MB quantization parameter derivation constant Δm thus computed into the MB quantization parameter reconstruction information, i.e., MB quantization parameter reconstructing code MQ Δm Value.

This means that the bit stream generating portion 1200 of the bit stream separating apparatus 1000 is operated to generate the macroblock quantization parameter reconstruction information MQ Δm Value on the basis of a difference Δm between the macroblock quantization parameter derivation constant m and the macroblock quantization parameter derivation constant previously computed, i.e., m_prev.

The process of encoding the MB quantization parameter reconstructing code (MQ Δm Value) performed by the bit stream separating apparatus 1000 will be described in reference to the flowchart of FIG. 11, hereinlater.

Figure 11:
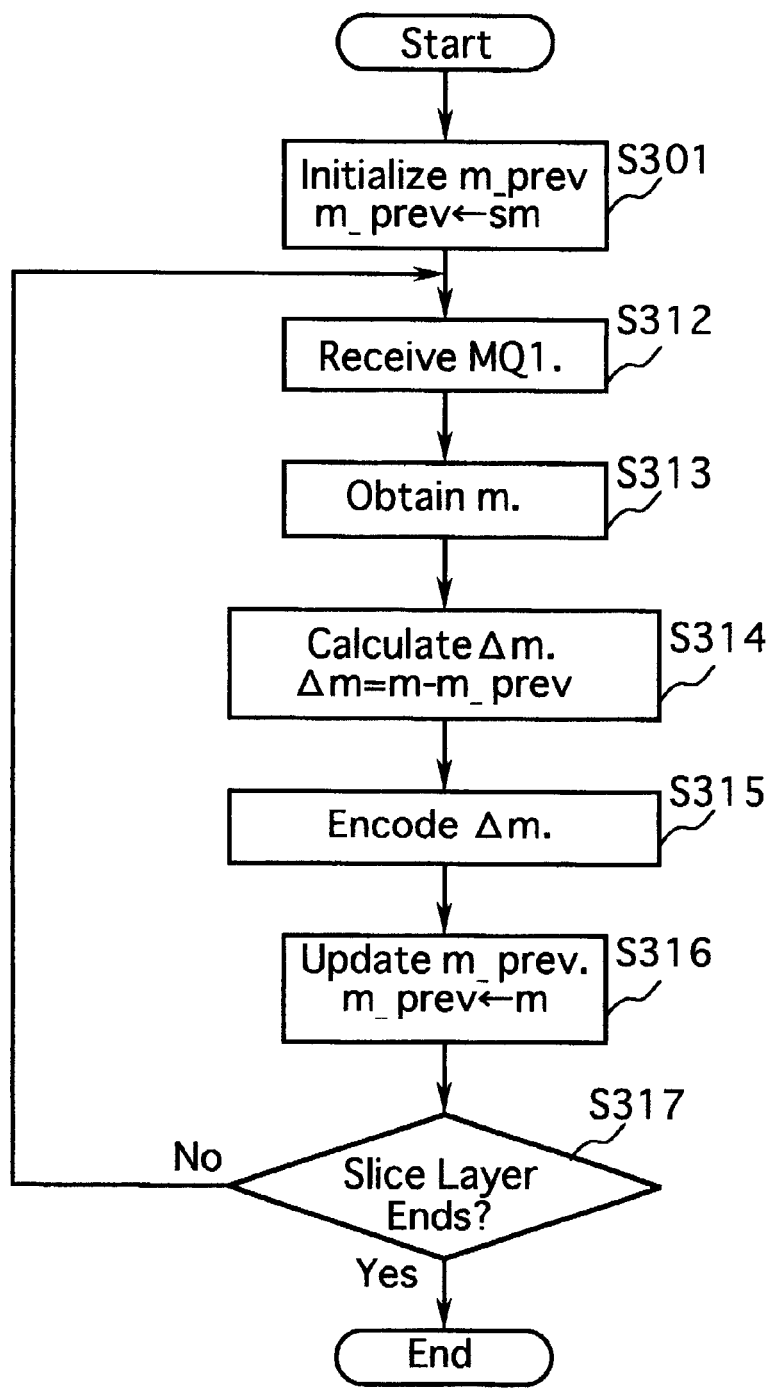
FIG. 11 is a flowchart showing the process of encoding differential quantization parameter information according to the present invention.

In the flowchart of FIG. 11, the slice re-quantization parameter derivation constant computed as a result of the slice header processing is referred to as "sm", and the previous MB quantization parameter derivation previously encoded is referred to as "m_prev".

In the step S301, m_prev is initialized to be sm. The step S301 goes forward to the step S312 in which MB quantization parameter MQ1 is received and decoded by the demultiplexing and decoding unit 1110 from a macroblock of the concerned slice layer of the original MPEG-2 bit stream. The step S312 goes forward to the step S313 in which MB quantization parameter derivation constant m is obtained. The step S313 goes forward to the step S314 in which differential MB quantization parameter derivation constant Δm is computed in accordance with the equation as follows:

Δm=m−m_prev

The step S314 goes forward to the step S315 in which Δm is encoded to a variable length code in accordance with a Δm specific code table, which will be described later. The step S315 goes forward to the step S316 in which m_prev is updated by assigning the present m to m_prev.

The step S316 goes forward to the step S317 in which it is judged whether the slice layer ends, that is, it is judged whether all the macroblocks of the slice layer of the transcoded MPEG-2 bit stream have been processed. if it is judged that all the macroblocks of the slice layer of the transcoded MPEG-2 bit stream have been processed in the step S317, the step S317 goes to the step END. Otherwise, the step S317 returns to the step S312. The steps from S312 to the step S316 are repeated until all the macroblocks of the slice layer of the transcoded MPEG-2 bit stream have been processed.

More specifically, there are provided two methods of encoding the differential MB quantization derivation constant Δm to a variable length code.

The differential MB quantization derivation constant Δm can be used to reconstruct macroblock quantization parameter, and therefore is the macroblock quantization parameter reconstruction information.

The first method of encoding macroblock quantization parameter reconstruction information, i.e., Δm to a variable length code is performed in accordance with a code table crated on the basis of the occurrence probability, i.e., frequency of occurrences.

The second method of encoding macroblock quantization parameter reconstruction information, i.e., Δm to a variable length code is performed by computing a variable length code to be assigned to macroblock quantization parameter reconstruction information, i.e., Δm in accordance with an equation.

The second method of encoding macroblock quantization parameter reconstruction information Δm to a variable length code will be described hereinlater.

The macroblock quantization parameter reconstruction information generating unit of the differential bit stream generating portion 1200 is operative to encode macroblock quantization parameter reconstruction information Δm to variable length codes.

Figure 12:
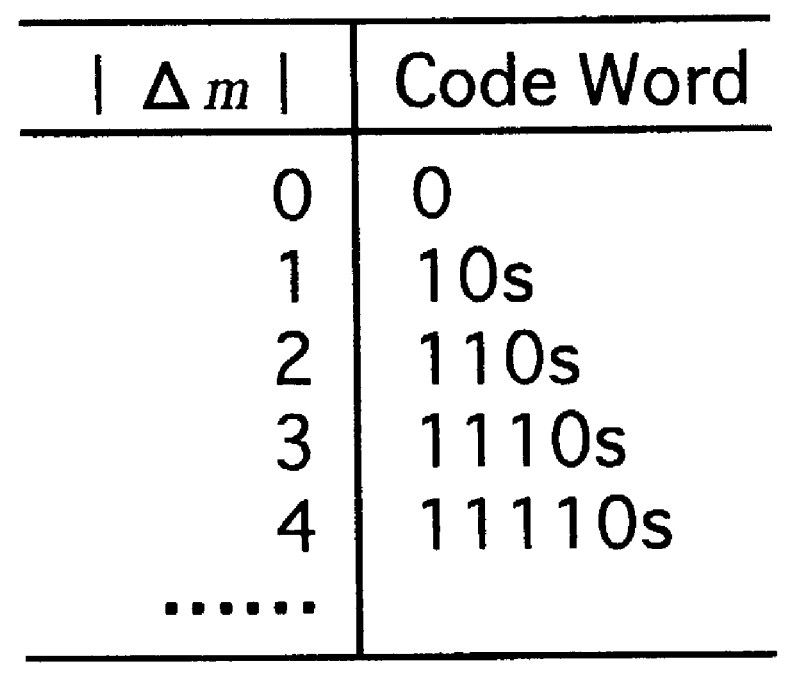

A code table used to encode a differential MB quantization parameter derivation constant, i.e., macroblock quantization parameter reconstruction information Δm to a variable length code is shown in FIG. 12. The variable length code will be hereinlater referred to as "code word". The code words to be assigned to Δm are defined from −30 to 30. The final code of the code word, i.e., "s" is referred to as "sign bit" indicating whether Δm is positive or negative. This means that 0 is assigned to "s" if Δm is positive while 1 is assigned to "s" if Δm is negative. The variable length code to be assigned to Δm in accordance with the code table thus constructed makes it possible to indicate the absolute value of Δm, i.e., |Δm| by the number of consecutive ones and the sign of Δm by the sign bit "s". The sign bit also indicates the end of the word code.

The length of the code word, i.e., "codelength" and the value of the code word, i.e., "codeword" can be computed in accordance with the equations as follows:

codelength=1 (Δm=0)=|Δm|+2 (Δm≠0)

codeword=$2^{(|\Delta m|+2)}-2^2+1$ (Δm<0)=0 (Δm=0)=$2^{(|\Delta m|+2)}-2^2$ (Δm>0)

From the above equations, it is understood that the variable length code to be assigned to the differential MB quantization derivation constant, macroblock quantization parameter reconstruction information, Δm can be computed in accordance with the equations in stead of using any code table.

The macroblock quantization parameter reconstruction information generating unit of the differential bit stream generating portion 1200 according to the preset invention is therefore able to compute variable length codes to be assigned to the macroblock quantization parameter reconstruction information Δm in accordance with the absolute value of the macroblock quantization parameter reconstruction information Δm to encode macroblock quantization parameter reconstruction information Δm to variable length codes.

The process of decoding the MB quantization parameter reconstructing code (MQ Δm Value) performed by the bit stream merging apparatus 2000 will be described in reference to the flowchart of FIG. 13, hereinlater.

The code mode switching unit 2130, the coefficient information reconstructing unit 2140, the differential coefficient information reconstructing unit 2150, the adding unit 2160, and the reconstructed coefficient information scanning unit 2170 of the bit stream merging apparatus 2000 collectively constitute a macroblock quantization parameter reconstruction information reconstructing unit, not shown.

The macroblock quantization parameter reconstruction information reconstructing unit is operative to reconstruct the macroblock quantization parameter reconstruction information m, Δm used to reconstruct the macroblock quantization parameter MQ1 from the differential bit stream to reconstruct the macroblock quantization parameter MQ1.

The code mode switching unit 2130, the coefficient information reconstructing unit 2140, the differential coefficient information reconstructing unit 2150, the adding unit 2160, and the reconstructed coefficient information scanning unit 2170 of the bit stream merging apparatus 2000 collectively constitute the macroblock quantization parameter reconstruction information reconstructing section according to the present invention.

In the flowchart of FIG. 13, the slice re-quantization parameter derivation constant computed as a result of the slice header processing is referred to as "sm", and the previous MB quantization parameter derivation previously decoded is referred to as "m_prev".

In the step S401, m_prev is initialized to be sm. The step S401 goes forward to the step S411 in which one macroblock of the concerned slice layer of the differential bit stream is read. The step S411 goes forward to the step S412 in which differential MB quantization derivation constant Δm is decoded from the differential bit stream. The step S412 goes forward to the step S413 in which MB quantization parameter derivation constant m is calculated for the macroblock in accordance with an equation as follows:

m=Δm+m_prev

The step S413 goes forward to the step S414 in which MQ2 is received from the transcoded MPEG-2 bit stream. The step S414 goes forward to the step S415 in which MQ1 is computed in accordance with equations as follows:

intra-picture $$MQ1 = \frac{MQ2-1}{2m}(m \neq 0)$$

$$= MQ2 \quad (m = 0)$$

Equation (12)

inter-picture $$MQ1=MQ2 \ (m+1)$$

Equation (13)

The step S415 goes forward to the step S416 in which m_prev is updated by assigning the present m to m_prev. The step S416 goes forward to the step S417 in which it is judged whether slice layer ends, that is, it is judged whether all the macroblocks of the slice layer of the differential bit stream have been processed. If it is judged that all the macroblocks of the slice layer of the differential bit stream have been processed, the step S417 goes to the step END. Otherwise, the step S417 returns to the step 411. The steps from S411 to the step 416 are repeated until all the macroblocks of the slice layer of the differential bit stream have been processed.

As shown in FIG. 6(d), the macroblock layer of the differential bit stream includes differential CBP value strings (CBP_y, CBP_uv), which are differential coded block patterns between the coded block patterns of the original MPEG-2 bit stream and the transcoded MPEG-2 bit stream. The differential BS multiplexing and encoding unit 1290 of differential bit stream generating portion 1200 is provided with a differential coded block pattern generating unit, not shown, operative to generate the differential coded block patterns between the coded block patterns of the original MPEG-2 bit stream and the coded block patterns of the transcoded MPEG-2 bit stream. The differential coded block pattern generating unit constitutes the coded block pattern generating unit according to the present invention.

The macroblock layer includes blocks consisting of encoded blocks and non-encoded blocks, a coded block pattern indicating the positions of the respective encoded blocks and non-encoded blocks in the macroblock layer.

Each of the differential CBP value strings (CBP_y, CBP_uv) indicates the positions of the encoded blocks and non-encoded blocks in the macroblock layer of the original MPEG-2 bit stream with respect to non-encoded blocks of the macroblock layer of the transcoded MPEG-2 bit stream.

The differential CBP value strings (CBP_y, CBP_uv), will be described hereinlater.

Figure 14:
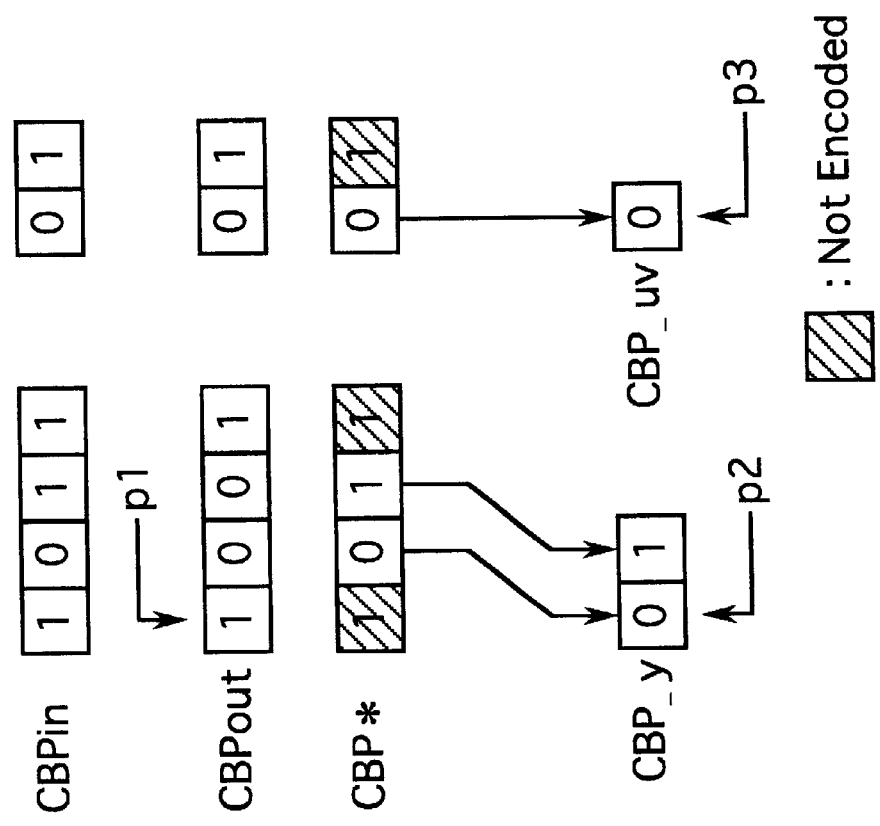
FIG. 14 is a schematic view explaining the encoding principle of differential CBP value strings according to the present invention.

The coded block patterns of the original MPEG-2 bit stream, the transcoded MPEG-2 bit stream, and the differential CBP value strings of the differential bit stream are shown in FIG. 14. Coded block pattern is referred to as "CBP", hereinlater. CBP=1 indicates an encoded block while CBP=0 indicate a non-encoded block. The macroblock layer includes six blocks consisting of encoded blocks and non-encoded blocks. The coded block pattern is a value string indicative of the positions of encoded blocks and non-encoded blocks in the macroblock layer. The coded block patterns of the original MPEG-2 bit stream and the transcoded MPEG-2 bit stream are refereed to as "CBPin" and "CBPout", respectively. Differences between the coded block patterns of the original MPEG-2 bit stream and the transcoded MPEG-2 bit stream are referred to as "CBP*". Blocks of the macroblock layer consist of four brightness blocks and two color-difference blocks. The differential CBP value strings consisting of differential brightness CBP value strings (CBP_y) and differential color-difference CBP value strings (CBP_uv).

Six blocks of the original MPEG-2 bit stream and the transcoded MPEG-2 bit stream are indexed with [p1]. Six blocks of the differential bit stream are indexed with [p2], and [p3]. p1, p2, and p3 are referred to as "block index".

Each of p1 is any integer of 0, 1, 2, 3, 4, and 5. For p1, integers of 0 to 3 indicate four brightness blocks and integers of 4 and 5 indicate two color-difference blocks.

Each of p2 is any integer of 0, 1, 2, and 3. Each of p3 is any integer of 0 and 1. For p2, the integers of 0, 1, 2, and 3 indicate four brightness blocks and for p3, the integers of 0 and 1 indicate two color-difference blocks. This means that [p2] and [p3] indicates the positions of brightness block and color-difference block in the differential bit stream, respectively. More specifically, the differential CBP value strings may consist of CBP_y[p2] including CBP_y[0], CBP_y[1], CBP_y[2], and CBP_y[3], and CBP_uv[p3] each including CBP_uv[0], and CBP_uv[1] each indicating encoded color-difference blocks and non-encoded color-difference blocks.

An encoded block of a macroblock layer of the original MPEG-2 bit stream is converted to an encoded block or a non-encoded block in the corresponding macroblock layer of the transcoded MPEG-2 bit stream after the transcoding operation while, on the other hand, a non-encoded block of a macroblock layer of the original MPEG-2 bit stream is converted to a non-encoded block in the corresponding macroblock layer of the transcoded MPEG-2 bit stream after the transcoding operation. This leads to the fact that an encoded block of a macroblock layer of the transcoded MPEG-2 bit stream corresponds to an encoded block of the corresponding macroblock layer of the original MPEG-2 bit stream.

This means that the coded block pattern of a macroblock layer of the transcoded MPEG-2 bit stream, i.e., CBPout [p1]=1 corresponds to the coded block pattern of the concerned macroblock layer of the original MPEG-2 bit stream, i.e., CBPin[p1]=1, and the differences of coded block patterns, CBP*[p1]=1 as shown in FIG. 14.

The differential coded block pattern generating unit of the differential bit stream generating portion 1200 is therefore operated to not generate differential CBP value strings with respect to encoded blocks of the transcoded MPEG-2 bit stream. In FIG. 14, CBP_y[0], CBP_y[3], and CBP_uv[1] corresponding to the coded block patterns of the transcoded MPEG-2 bit stream, CBPout [p1]=1, are accordingly not generated.

The differential coded block pattern generating unit of the differential bit stream generating portion 1200 is, on the other hand, operated to generate the differential CBP value strings such as CBP_y[p2] and CBP_uv[p3] each indicating the positions of the encoded blocks and non-encoded blocks in the macroblock layer of the original MPEG-2 bit stream with respect to the non-encoded blocks of the macroblock layer of the transcoded MPEG-2 bit stream, CBPout [p1]=0. This means that the differential coded block pattern generating unit of the differential bit stream generating portion 1200 is operated to generate CBP* and write CBP* into the differential CBP value strings such as CBP_y[p2] and CBP_uv[p3] with respect to the non-encoded blocks of the transcoded MPEG-2 bit stream, i.e., CBPout[p1]=0 as shown in FIG. 14.

Each of the differential CBP value strings (CBP_y, CBP_uv), therefore, indicates the positions of the encoded blocks and non-encoded blocks in the macroblock layer of the original MPEG-2 bit stream with respect to non-encoded blocks of the macroblock layer of the transcoded MPEG-2 bit stream.

Figure 15:
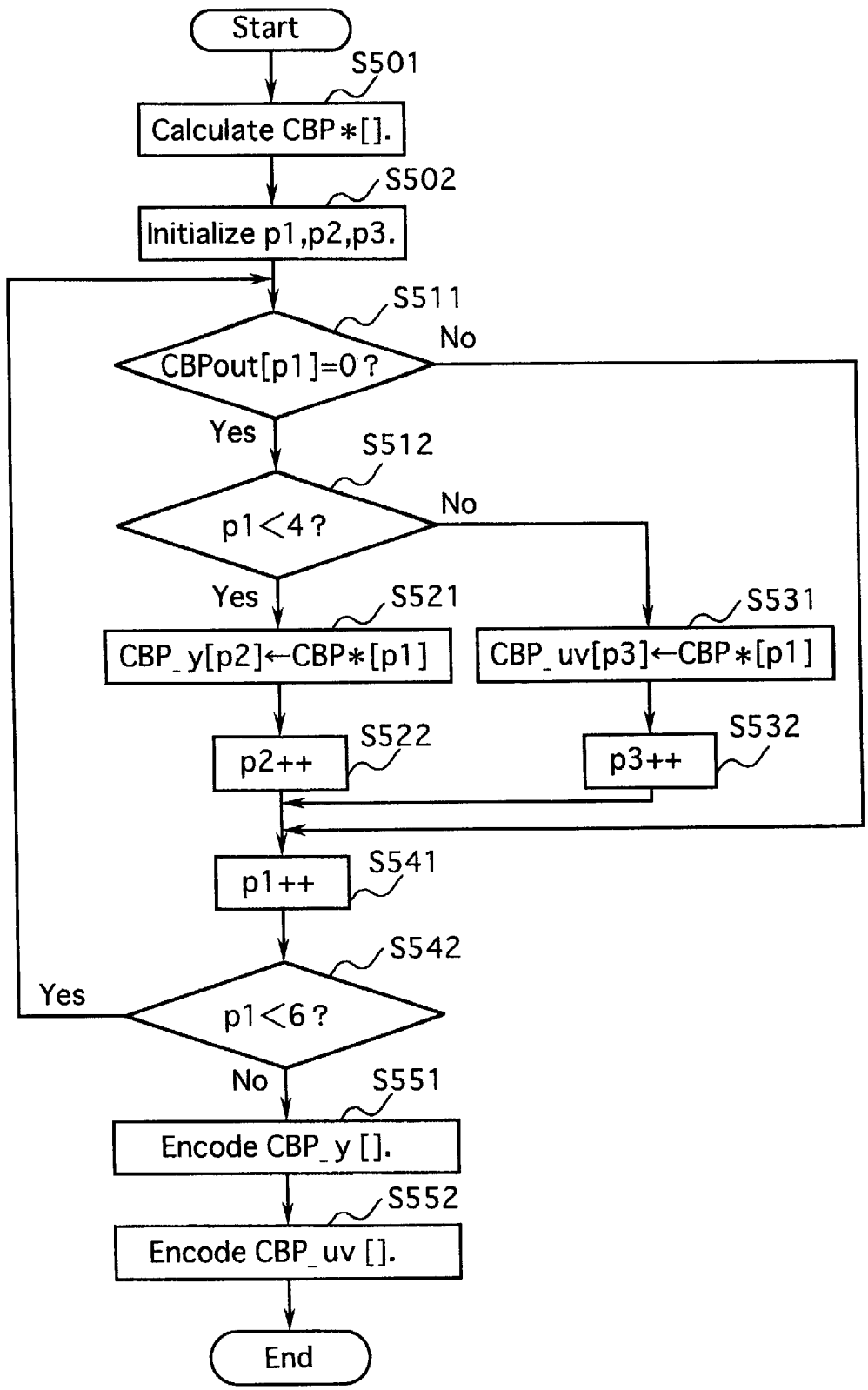
FIG. 15 is a flowchart showing the process of encoding differential CBP value strings according to the present invention.

The process of encoding the differential CBP value strings performed by the bit stream separating apparatus 1000 will be described in reference to FIG. 15.

In the step S501, CBP*[p1] is calculated. The step S501 goes forward to the step S502 in which block indexes p1, p2, and p3 are initialized to 0. The step S502 goes forward to the step S511 in which it is judged whether CBPout[p1] is equal to 0 or not. If it is judged that CBPout[p1] is not equal to 0, the step S511 goes forward to the step S541. Otherwise, the step S511 goes forward to the S512 in which it is judged if p1 is less than 4 or not. If it is judged that p1 is not less than 4, the step S512 goes forward to the S531. Otherwise, the step S512 goes forward to the step S521 in which CBP* is assigned to CBP_y[p1]. The step S521 goes forward to the step S522 in which p2 is incremented by one. The step S522 goes forward to the step S541 in which p1 is incremented by one. In the step S531, in which CBP* is assigned to CBP_uv[p3]. The step S531 goes forward to the step S532 in which p3 is incremented by one. The step S532 goes forward to the step S541.

The step S541 goes forward to the step S542 in which it is judged whether p1 is less than 6. If it is judged that p1 is not less than 6, the step S542 goes forward to the step S551. Otherwise step S542 returns to the step S511. The steps S511 to S541 are repeated until p1 becomes not less than 6 (equal to 6).

If it is judged that p1 is not less than 6 in the step S542, the step S542 goes forward to the step S551 in which CBP_y[ ] is encoded. This means that differential CBP value strings CBP_y[ ] are encoded to variable length codes. The step S551 goes forward to the step S552 in which CBP_uv[ ] is encoded. This means that differential CBP value strings CBP_uv[ ] are encoded to variable length codes. Then the step S552 goes forward to the step END.

More specifically, the differential coded block pattern generating unit of the differential bit stream generating portion 1200 is equipped with an unnecessary block counting section, a storage section, a differential brightness CBP encoding section, a differential color-difference CBP encoding section.

The unnecessary block counting section is operative to count the number of the unnecessary brightness blocks, i.e., the number of non-encoded brightness blocks, hereinlater referred to as "n_y" and the number of the unnecessary color-difference blocks, i.e., the number of non-encoded color-difference blocks, hereinlater referred to as "n_uv" in the macroblock of the transcoded MPEG-2 bit stream.

The storage section is operative to store a plurality of brightness tables each used to encode the differential brightness CBP value strings to respective variable length codes, and a plurality of color-difference tables each used to encode the differential color-difference CBP value strings to respective variable length codes.

The differential brightness CBP encoding section is operative to select a brightness table from among from among said brightness tables in response to the number of said unnecessary brightness blocks n_y counted by said unnecessary block counting section, and encode the differential brightness CBP value strings to variable length codes in accordance with the brightness table thus selected.

The differential color-difference CBP encoding section is operative to select one color-difference table from among said color-difference tables in response to the number of said unnecessary differential color-difference blocks n_uv counted by said unnecessary block counting section, and encode the differential color-difference CBP value strings to variable length codes in accordance with the color-difference table thus selected.

The prediction error calculating unit 1230, the differential coefficient information zigzag scanning unit 1240, and the differential BS multiplexing and encoding unit 1290 of the transcoding portion 1200 constitutes the unnecessary block counting section, the storage section, the differential brightness CBP encoding section, and the differential color-difference CBP encoding section according to the present invention.

Examples of the codes tables used to encode differential CBP value strings CBP_y[ ] and CBP_uv[ ] to variable length codes are shown in FIG. 16.

The process of encoding differential CBP value strings has so far been described. The process of decoding differential CBP value strings will be described in detail hereinlater.

Figure 17:
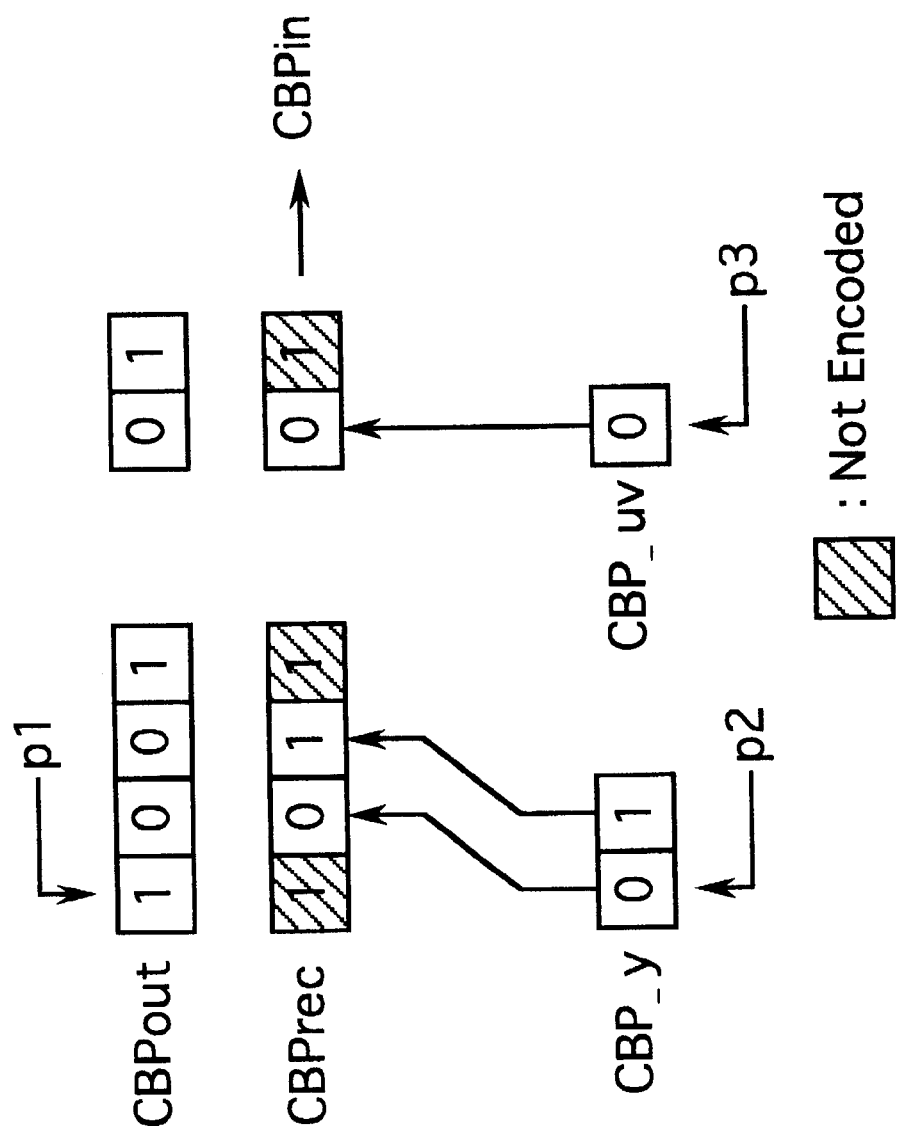
FIG. 17 is a schematic view explaining the principle of decoding the differential CBP value strings according to the present invention.

The principle of decoding differential CBP value strings will be described in reference to FIG. 17. In FIG. 17, coded block patterns reconstructed by the bit stream merging apparatus 2000 is referred to as "CBPrec".

More specifically, the code mode switching unit 2130, the coefficient information reconstructing unit 2140, and differential coefficient information reconstructing unit 2150, the adding unit 2160 and the reconstructed coefficient information scanning unit 2170 collectively constitute a coded block pattern reconstructing section operative to reconstruct the coded block patterns "CBPrec" of the macroblock layers of the original MPEG-2 bit stream on the basis of the differential coded block patterns (CBP_y, CBP_uv) of the differential bit stream.

With respect to encoded blocks of the transcoded MPEG-2 bit stream, i.e., CBPout[p1]=1, the corresponding blocks of the original MPEG-2 bit stream are encoded blocks, and no differential CBP value strings such as CBP_y[p2] and CBP_uv[p3] are therefore provided in the differential bit stream, as described hereinbefore. The coded block pattern reconstructing section of the bit stream merging apparatus 2000 is therefore operated to assign 1 to the corresponding coded block pattern CBPrec[p1] with respect to encoded blocks of the transcoded MPEG-2 bit stream, CBPout[p1]=1 as shown in FIG. 17.

With respect to non-encoded blocks of the transcoded MPEG-2 bit stream, i.e., CBPout[p1]=0, the bit stream merging apparatus 2000 is operated to assign the corresponding differential CBP value strings such as CBP_y[p2] and CBP_uv[p3] to corresponding CBPrec[p1].

The coded block pattern reconstructing section of the bit stream merging apparatus 2000 is operated to generate CBPrec[p1] to reconstruct the coded block pattern of the original MPEG-2 bit stream, i.e., CBPin[p1]. This means that the bit stream merging apparatus 2000 is operated to assign CBPrec[p1] to CBPin[p1] of the reconstructed original MPEG-2 bit stream as shown in FIG. 17.

The process of decoding differential CBP value strings for one macroblock performed by the coded block pattern reconstructing section of the bit stream merging apparatus 2000 will be described in reference to FIG. 18.

Figure 18:
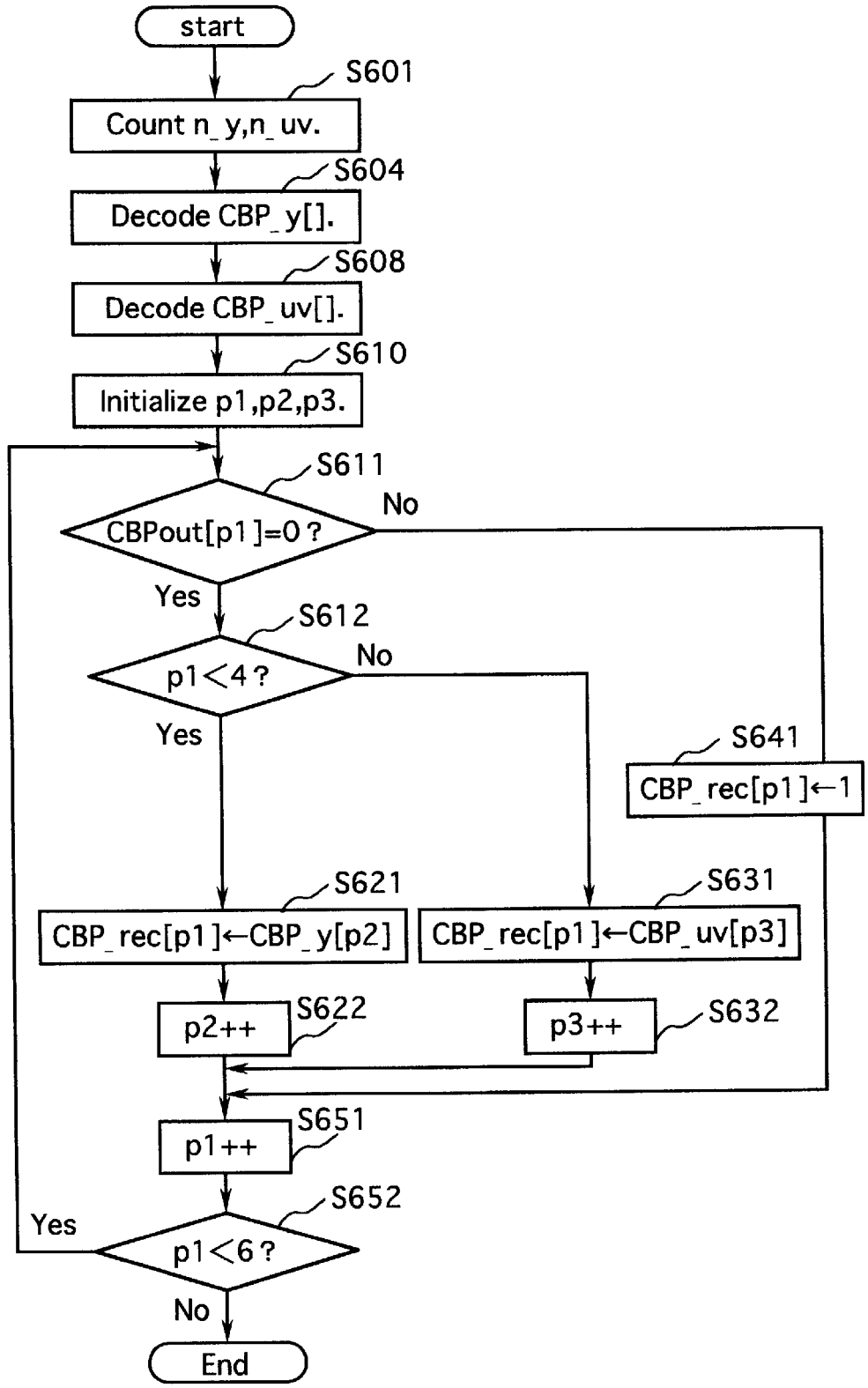
FIG. 18 is a flowchart showing the process of decoding the CBP value strings according to the present invention.

In the flowchart of FIG. 18, the number of the coded block patterns of the macroblock layer of the transcoded MPEG-2 bit stream, indicating the number of non-encoded brightness blocks in the macroblock layer, hereinlater referred to as "n_y", and the number of coded block patterns of the macroblock layer of the transcoded MPEG-2 bit stream, indicating the non-encoded color-difference blocks in the macroblock layer, hereinlater referred to as "n_uv". The bit stream merging apparatus 2000 has a table memory unit, not shown, in which a plurality of brightness code tables and color-difference code tables are stored. The brightness code table is used to encode differential CBP value strings to variable length codes, and the color-difference code table is used to encode color-difference CBP value strings to variable length codes.

In the step S601, n_y and n_uv are counted to determine one brightness code table and one color-difference code table used to decode the differential CBP value strings CBP_y[ ] and CBP_uv[ ] from among a plurality of brightness code tables and color-difference code tables stored in the table memory unit of the bit stream merging apparatus 2000. The step S601 goes forward to the step S604, in which the differential CBP value strings CBP_y [p2] are decoded in accordance with the brightness code table. The step S604 goes forward to the step S608 in which differential CBP value strings CBP_uv[p3] are decoded in accordance with the color-difference code table. The step S608 goes forward to the step S610 in which block index p1, p2, and p3 are initialized to 0.

The step S610 goes forward to the step S611 in which it is judged whether CBPout[p1] is equal to zero or not. If it is judged that CBPout[p1] is not equal to zero, the step S611 goes forward to the step S641. If it is judged that CBPout[p1] is equal to zero, the step S611 goes forward to the step S612 in which it is judged whether p1 is less than 4 or not. If it is judged that p1 is not less than 4, the step S612 goes forward to the step S631 in which CBP_uv[p3] is assigned to CBP_rec[p1]. Otherwise, the step S612 goes forward to the step S621 in which CBP_y [p2] is assigned to CBP rec[p1]. The step S621 goes forward to the step S622 in which p2 is incremented by one. Then the step S622 goes forward to the step S651. The step S631 goes forward to the step S632 in which p3 is incremented by one. Then the step S632 goes forward to the step S651. If it is judged that CBPout[p1] is not equal to zero, the step S611 goes forward to the step S641 in which one is assigned to CBP_rec[p1]. Then, the step S641 goes forward to the step S651. In the step S651, p1 is incremented by one. The step S651 goes forward to the step S652 in which it is judged whether p1 is less than 6 or not. If it is judged that p1 is less than 6, the step S652 returns to the step S611. The steps S611 to S651 are repeated until p1 becomes not less than 6. If it is judged that p1 is not less than 6 in the step S652, the step S652 goes to the step END.

Upon terminating the process of decoding differential CBP value strings for one macroblock, the coded block pattern reconstructing section of the bit stream merging apparatus 2000 is operated to generate all the coded block patterns, i.e., CBPrec[p1] for the macroblock and, then, reconstruct the coded block patterns CBPin[p1] of the reconstructed original MPEG-2 bit stream by assigning CBPrec[p1] to CBPin[p1], i.e., coded block patterns of the reconstructed original MPEG-2 bit stream.

As will be understood from the foregoing description, the middle layer codes of the differential bit stream such as macroblock address increments, i.e., MBAI, MB quantization parameter reconstructing codes (MQ Δm Value), differential CBP value strings (CBP_y, CBP_uv) are encoded and decoded sequentially for each macroblock.

3. Lower Layer Codes of the Differential Bit Stream

The block layer of the MPEG-2 bit stream such as the original MPEG-2 bit stream and the transcoded MPEG-2 bit stream includes coefficient information including 8 by 8 matrices of coefficient.

FIG. 26 shows a table explaining the differential information contained in the upper layer, the middle layer and the lower layer of the differential bit stream. As will be seen from the table, the amount of information contained the differential bit stream is smaller than the amount of information contained in the original MPEG-2 bit stream. This means the amount of bits to be transmitted per second from the differential bit stream will not exceed that of the original MPEG-2 bit stream.

The block layer of the differential bit streams contains differential coefficient information between the original MPEG-2 bit stream and the transcoded MPEG-2 bit stream as shown in FIG. 26.

Figure 19:
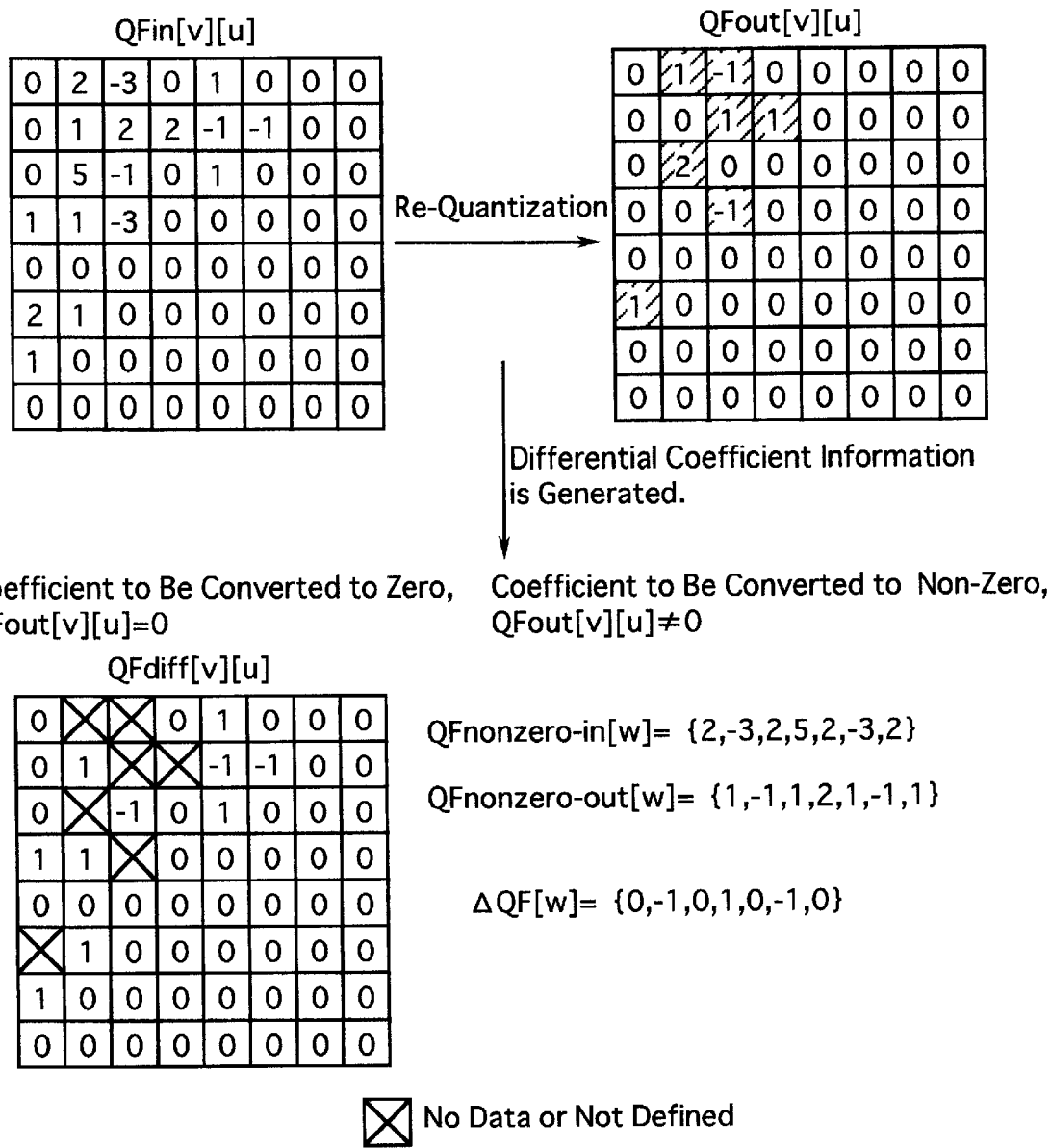
FIG. 19 is a schematic view for explaining the principle of encoding differential coefficient information according to the present invention.

The principle of encoding the differential coefficient information will be described hereinlater in reference to FIG. 19. In FIG. 19, the coefficient information including coefficients of the original MPEG-2 bit stream is referred to as "QFin[v][u]", coefficient information including coefficients of the transcoded MPEG-2 bit stream is referred to as "QFout[v][u]", and differential coefficient information of the differential bit stream is referred to as "QFdiff[v][u]".

The coefficient information includes zero coefficients (whose values are equal to zero) and non-zero coefficients (whose values are not equal to zero) as described hereinbefore. Zero coefficients of the original MPEG-2 bit stream are converted to zero coefficients in the transcoded MPEG-2 bit stream; non-zero coefficients of the original MPEG-2 bit stream are converted to different coefficients in the transcoded MPEG-2 bit stream as shown in FIG. 19. This means that the values of the non-zero coefficients of the original MPEG-2 bit stream are converted to the different values of non-zero coefficients in the transcoded MPEG-2 bit stream. This leads to the fact that non-zero coefficients of the transcoded MPEG-2 bit stream correspond to non-zero coefficients of the original MPEG-2 bit stream.

Non-zero coefficients and zero coefficients of the original MPEG-2 bit stream are referred to as "QFnonzero-in" and "QFzero-in", respectively, and non-zero coefficients and zero coefficients of the transcoded MPEG-2 bit stream are referred to as "QFnonzero-out" and "QFzero-out", respectively.

Coefficients of the original MPEG-2 bit stream include coefficients to be converted to zero coefficients "QFzero-out" of the transcoded MPEG-2 bit stream, and coefficients to be converted to non-zero coefficients QFnonzero-out of the transcoded MPEG-2 bit stream. The coefficients of the original MPEG-2 bit stream to be converted to zero coefficients of the transcoded MPEG-2 bit stream is hereinlater referred to as "QFin-to-zero", and the coefficients of the original MPEG-2 bit stream to be converted to non-zero coefficients of the transcoded MPEG-2 bit stream is hereinlater referred to as "QFin-to-nonzero".

The bit stream separating apparatus 1000 is therefore operated to read the coefficients QFin-to-nonzero of the original MPEG-2 bit stream in a zigzag fashion to generate differential non-zero coefficient information by computing the differences between the coefficients of the original MPEG-2 bit stream and the transcoded MPEG-2 bit stream. The bit stream separating apparatus 1000 is, on the other hand, operated to scan the coefficients QFin-to-zero of the original MPEG-2 bit stream in a zigzag fashion to generate zero coefficient information by using the coefficients of the original MPEG-2 bit stream as shown in FIG. 19.

The process of transcoding the original MPEG-2 bit stream to generate the transcoded MPEG-2 bit stream is performed through the steps of:

a) inversely quantizing the original MPEG-2 bit stream to reconstruct the original moving picture sequence information; and b) sequentially re-quantizing the original moving picture sequence information thus inversely quantized to generate the original MPEG-2 bit stream.

The operation of inversely quantizing the original MPEG-2 bit stream to reconstruct the original moving picture information, and sequentially re-quantizing the original moving picture information thus reconstructed to reconstruct the original MPEG-2 bit stream, however, require a large amount of memory for temporally storing the original moving picture information reconstructed.

The bit stream separating apparatus 1000 is, on the other hand, adapted to transcode the original MPEG-2 bit stream to generate the transcoded MPEG-2 bit stream directly from the original MPEG-2 bit stream through the single combined operation of the inverse-quantization and re-quantization in stead of inversely quantizing and sequentially re-quantizing the original MPEG-2 bit stream, thereby eliminating the process of reconstructing the original moving picture sequence information, and increasing the efficiency and speed of the transcoding process.

This means that the bit stream separating apparatus 1000 can directly compute and generate the coefficient information QF2 of the transcoded MPEG-2 bit stream on the basis of the coefficient information QF1 of the original MPEG-2 bit stream, the quantization parameter MQ1, and the re-quantization parameter MQ2.

The bit stream separating apparatus 1000 is operated to the coefficient information QF2 of the transcoded MPEG-2 bit stream on the basis of the coefficient information QF1 of the original MPEG-2 bit stream, the quantization parameter MQ1, and the re-quantization parameter MQ2 as follows:

intra-picture $$QF2 = QF1 \times MQ1/MQ2 + \text{sign}(QF1)/2$$

inter-picture $$QF2 = (QF1 + \text{sign}(QF1) \times 1/2) \times MQ1/MQ2$$

where sign (QF1) is to be "+1" when QF1 is positive and to be "−1" when QF1 is negative.

More specifically, the transcoding portion 1100 of the bit stream separating apparatus 1000 is operated to convert each of the macroblocks contained in the original MPEG-2 bit stream on the basis of the ratio of the macroblock quantization parameter MQ1 to the macroblock re-quantization parameter MQ2 to generate the transcoded MPEG-2 bit stream.

Similar to the macroblock quantization parameter MQ1 and the macroblock re-quantization parameter MQ2, the transcoding portion 1100 of the bit stream separating apparatus 1000 is operated to generate convert each of the macroblocks contained in the slice layers of the original MPEG-2 bit stream on the basis of the ratio of the slice quantization parameter SMQ1 to the slice re-quantization parameter SMQ2 to generate the transcoded MPEG-2 bit stream.

The process of encoding coefficient information of the block layer of the differential bit stream performed by the bit stream separating apparatus 1000 will be described in detail.

The process of encoding coefficient information of the block layer is performed through the steps of:

a) generating differential coefficient information including differential zero coefficient information and differential non-zero coefficient information;

b) encoding the differential zero coefficient information; and c) encoding the differential non-zero coefficient information.

The differential coefficient information of the differential bit stream is referred to as "QFdiff[v][u]. Where (u, v) is referred to as "intra-block index" indicating the position of a coefficient, and $(u, v) \in [0, 7]$.

The bit stream separating apparatus 1000 is operated to assign QFin[v][u] to be converted to QFzero-out[v][u] to QFdiff[v][u], assign QFin[v][u] to be converted to QFnonzero-out[v][u] to a one-dimensional value string, hereinlater referred to as "QFnonzero-in[w]", and assign QFnonzero-out[v][u] to another one-dimensional value string, hereinlater referred to as "QFnonzero-out[w]" as shown in FIG. 19.

More specifically, the bit stream separating apparatus 1000 is provided with a QF memory unit, and is operated to create memory sections in the QF memory unit including QFdiff[v][u], QFnonzero-in[w], QFnonzero-out[w], and QFnonzero-rec[w], which will be described later. The bit stream separating apparatus 1000 is, then, operated to store QFin[v][u] to be converted to QFzero-out[v][u] in QFdiff [v][u], store QFin[v][u] to be converted to QFnonzero-out [v][u] in the QFnonzero-in[w], and store QFnonzero-out[v] [u] to QFnonzero-out[w].

During the re-quantization process, the fractional portions such as $$\left( \frac{MQ2^* - 1}{2 \times MQ1}, \frac{MQ2^* - 1}{MQ1 + 0.5} - 1 \right)$$

have been dropped as described hereinbefore. This means there will be a prediction error between the real non-zero coefficient of the original MPEG-2 bit stream, referred to as "real QFnonzero-in[w]" and the estimated non-zero coefficient of the original MPEG-2 bit stream "estimated QFnonzero-in[w]" estimated on the basis of non-zero coefficient of the transcoded MPEG-2 bit stream, i.e., QFnonzero-out[w]. The prediction error is hereinlater referred to as "Δ QF[w]".

The coefficient information thus reconstructed on the basis of QFnonzero-out[w] and the prediction error Δ QF[w] is referred to as "QFnonzero-rec[w]".

Figure 20:
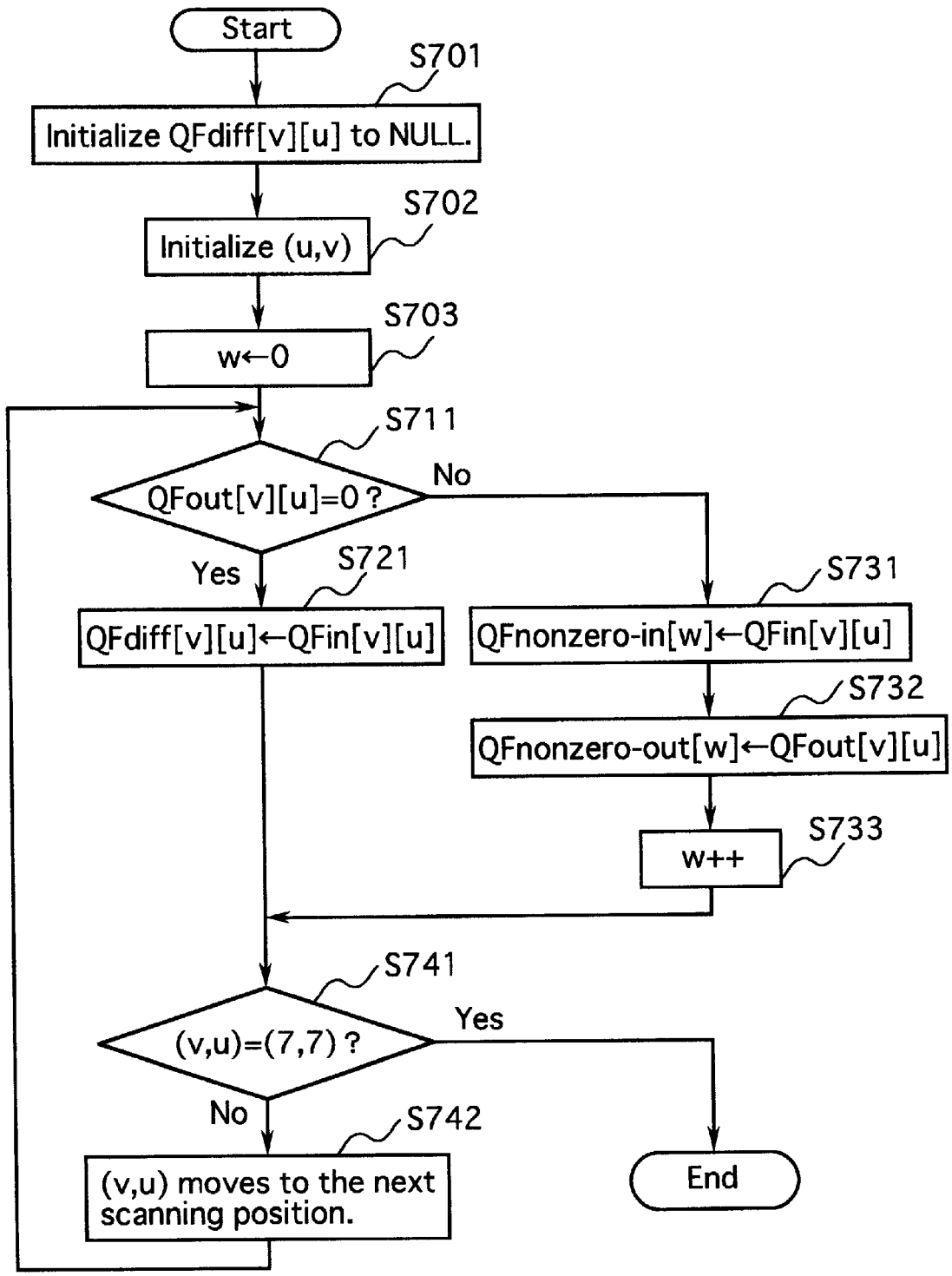
FIG. 20 is a flowchart showing the flow of the process of generating differential coefficient information according to the present invention.
Figure 27:
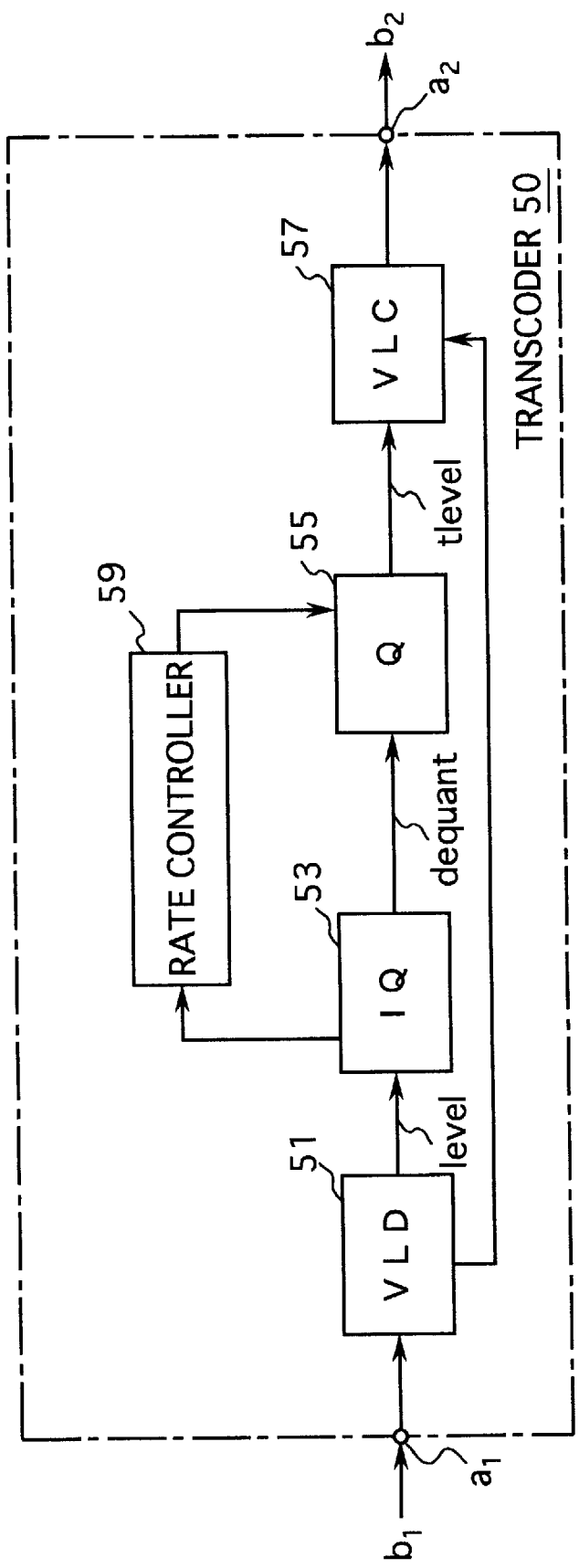
FIG. 27 is a schematic block diagram showing a first conventional transcoder 50.
Figure 28:
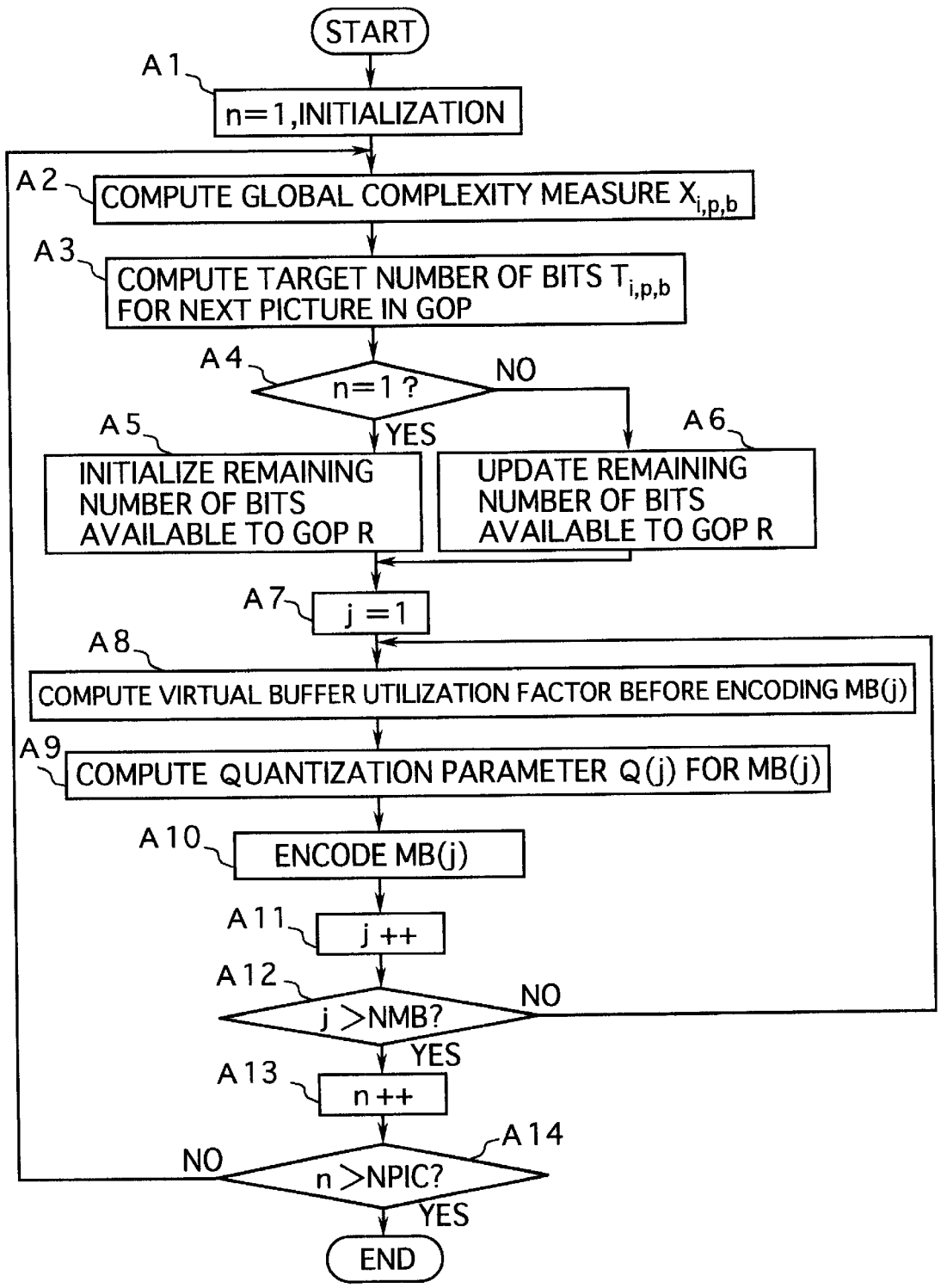
FIG. 28 is a flowchart showing the flow of the rate control operation of MPEG-2 performed by the first conventional transcoder shown in FIG. 27.
Figure 29:
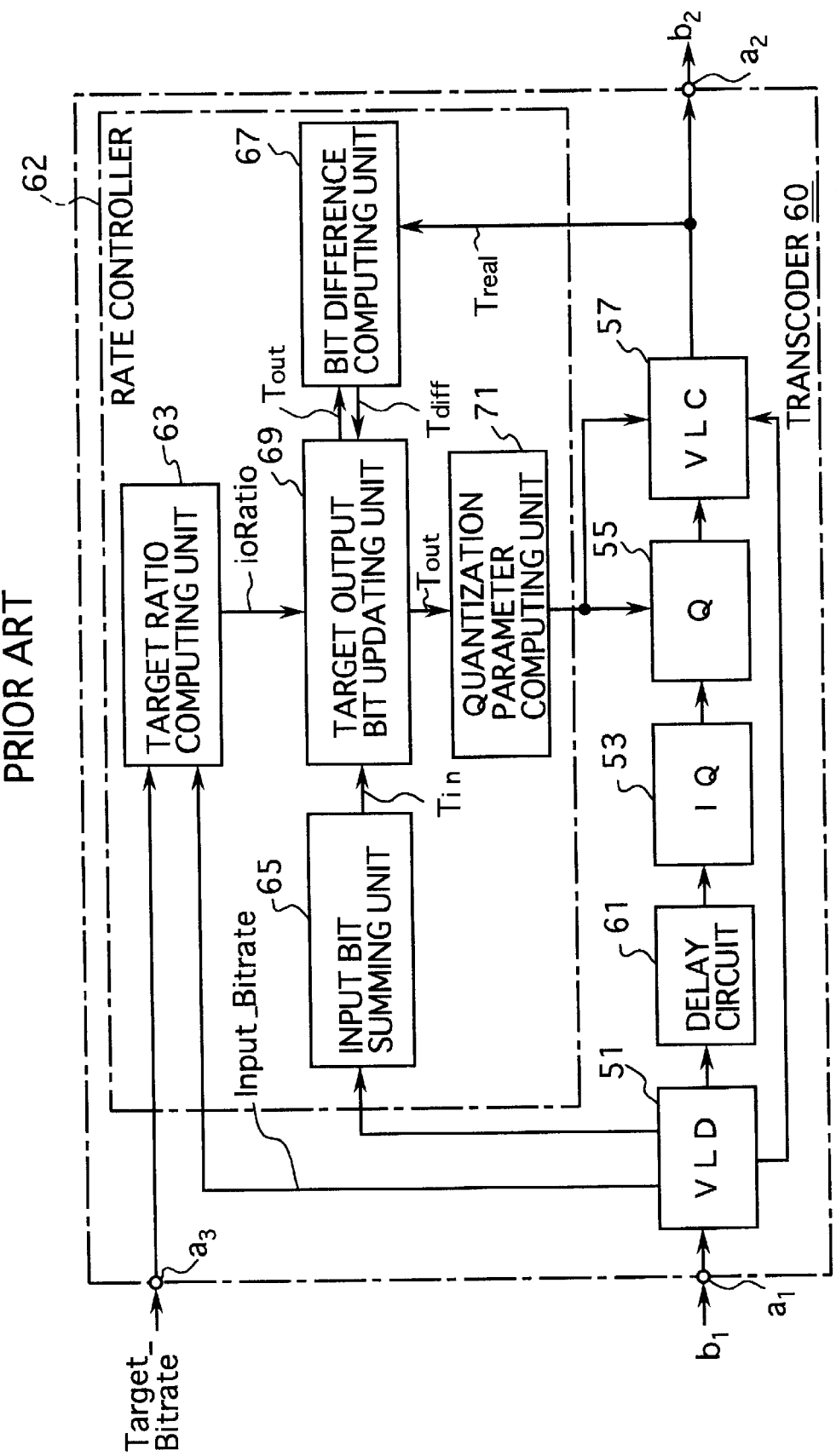
FIG. 29 is a schematic block diagram showing a second conventional transcoder 60.
Figure 30:
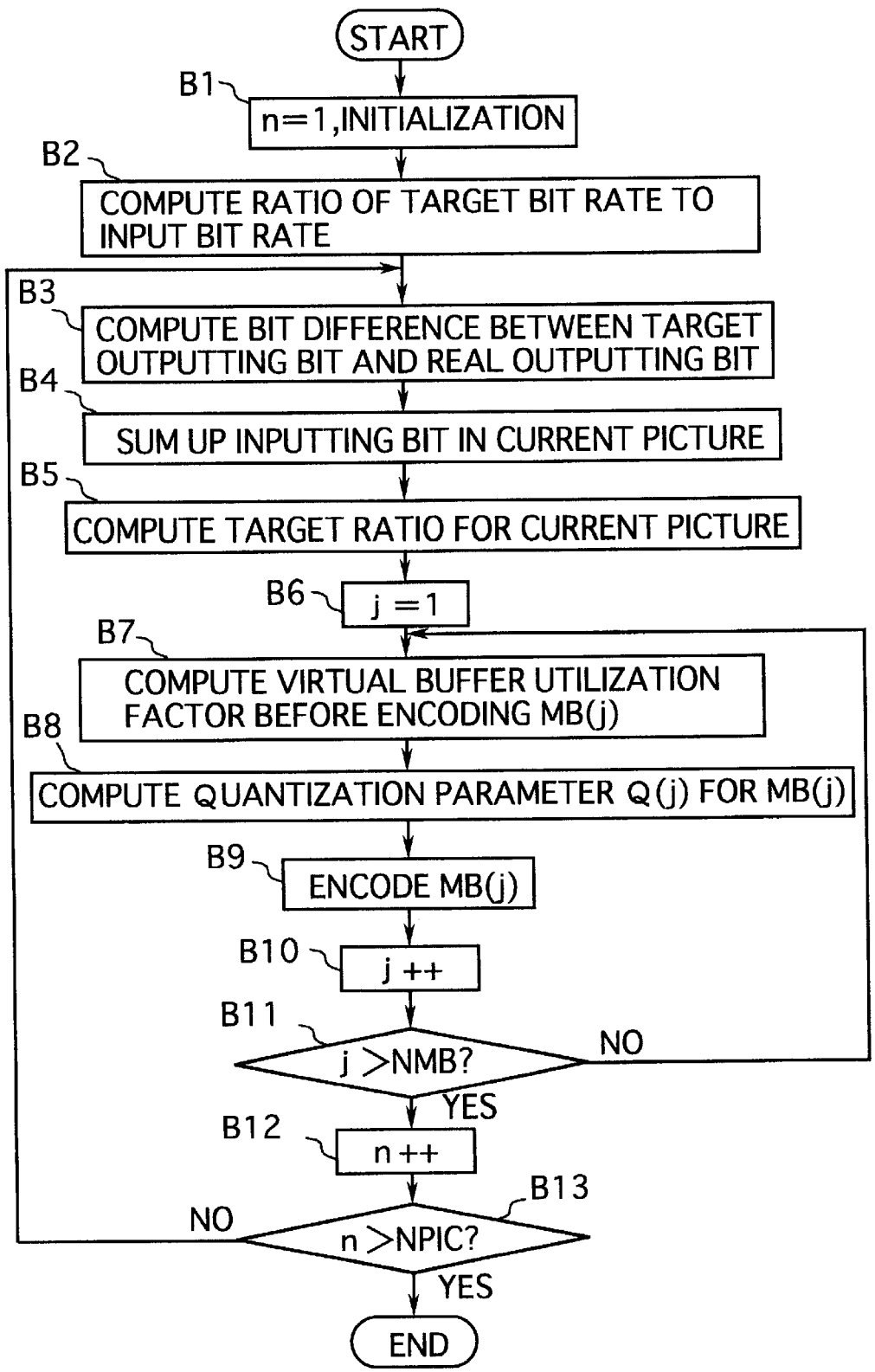
FIG. 30 is a flowchart showing the flow of the rate control operation of MPEG-2 performed by the second conventional transcoder shown in FIG. 29.
Figure 31:
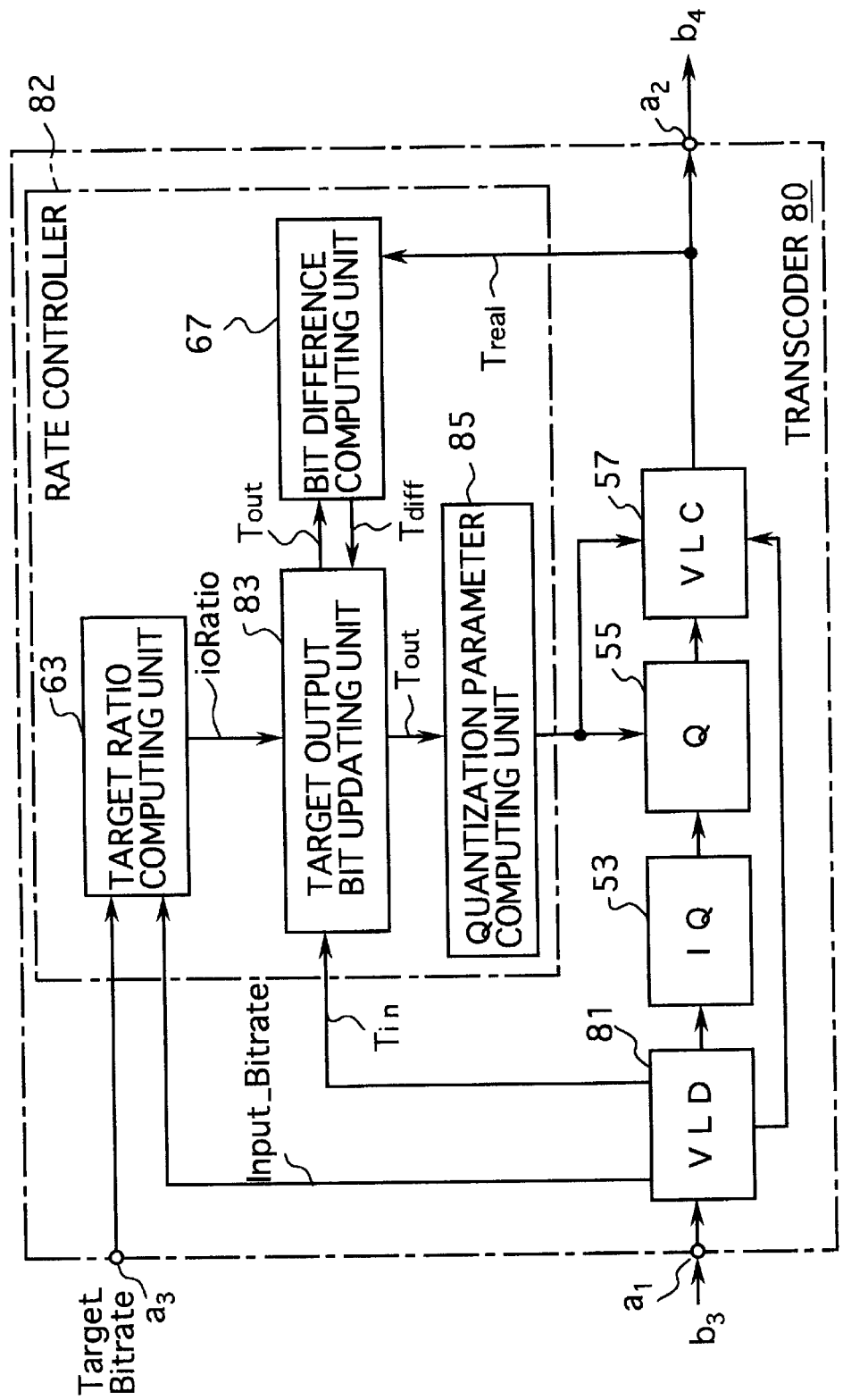
FIG. 31 is a schematic block diagram showing a third conventional transcoder 80.
Figure 32:
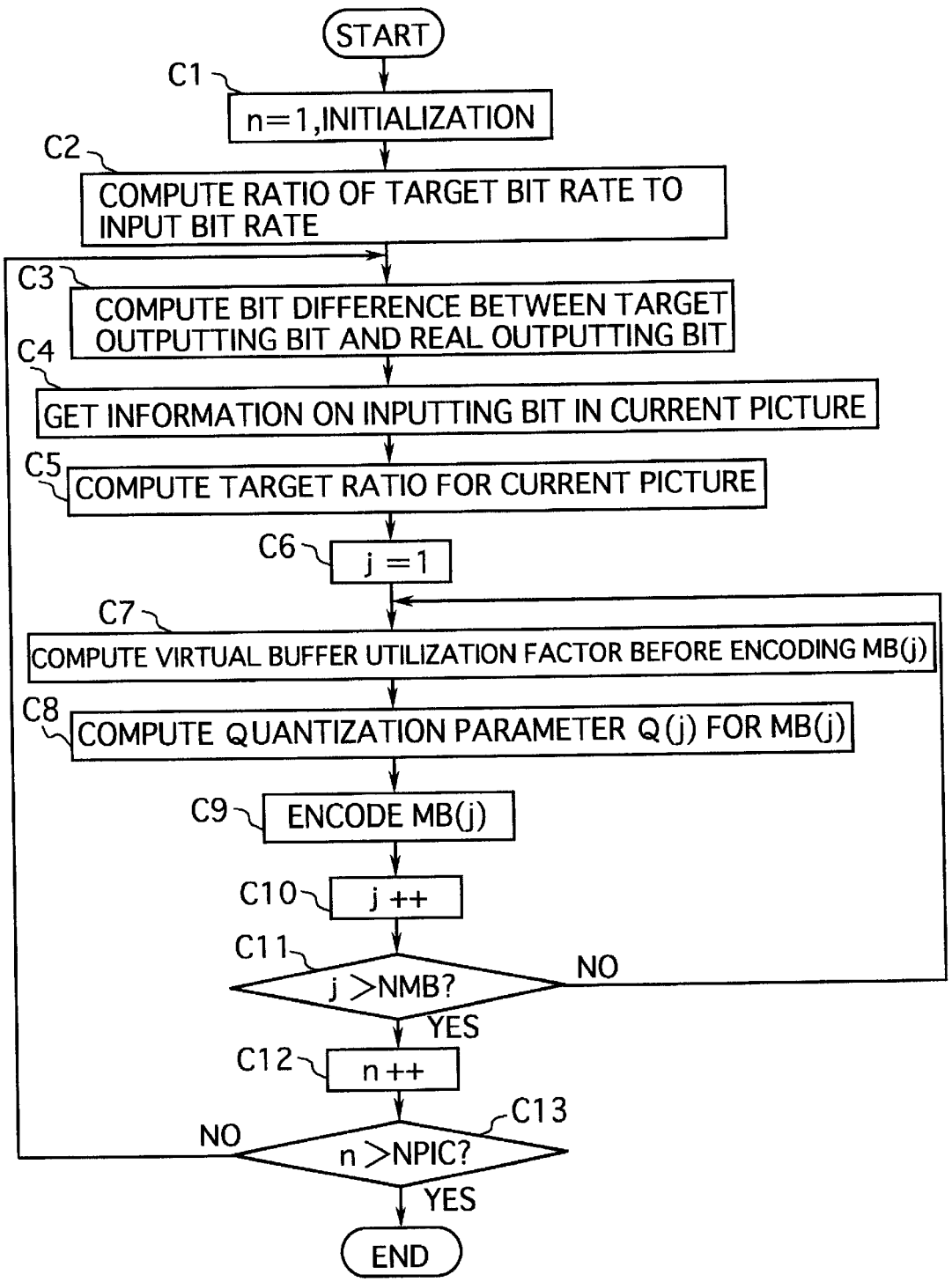
FIG. 32 is a flowchart showing the flow of the rate control operation of MPEG-2 performed by the third conventional transcoder shown in FIG. 31.
Figure 33:
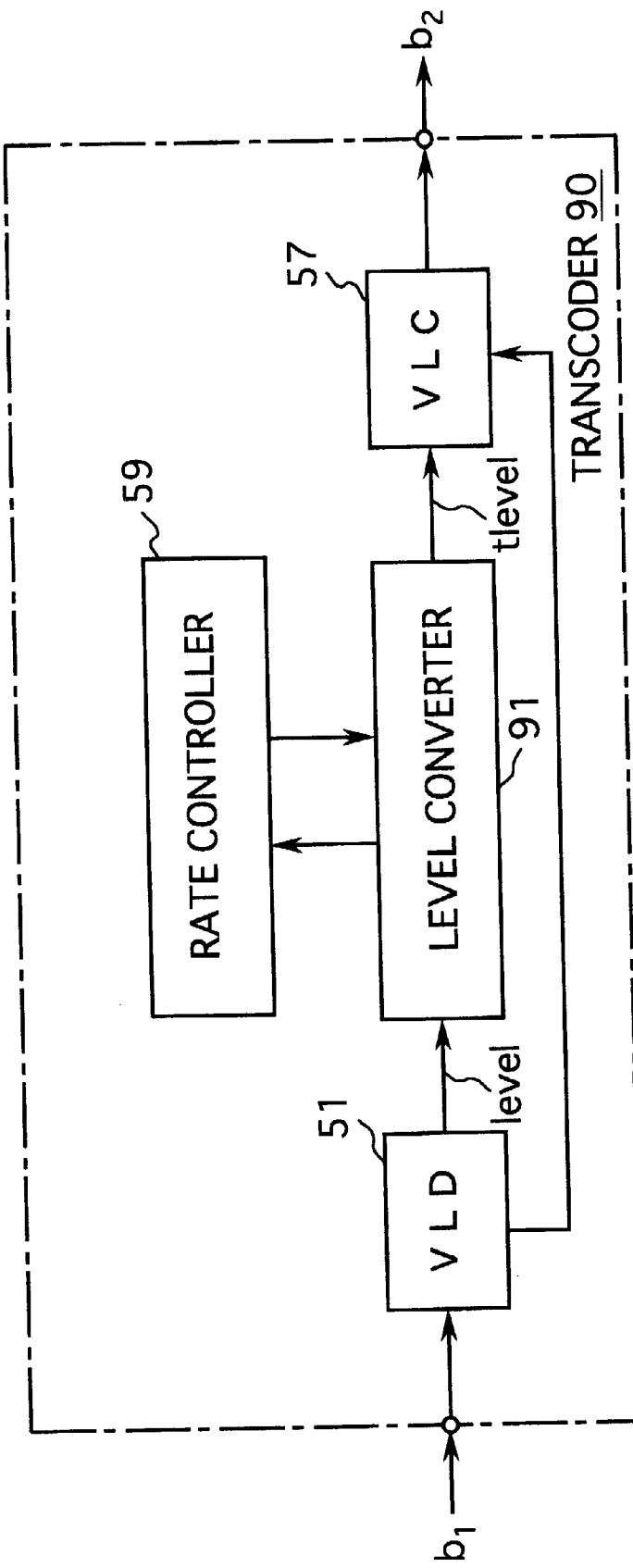
FIG. 33 is a schematic block diagram showing a fourth conventional transcoder 90.

The process of (a) generating differential coefficient information including QFdiff[v][u], QFnonzero-in[w], and QFnonzero-out[w] will be described in reference to the flowchart shown in FIG. 20.

In the step S701, QFdiff[v][u] is initialized to NULL. The step S701 goes forward to the step S702 in which (v, u) is initialized to (0, 0). The step S702 goes forward to the step S703 in which w is initialized to zero. The step S703 goes forward to the step S711 in which it is it is judged whether QFout[v][u] is equal to zero or not. If it is judged that QFout[v][u] is equal to zero, the step S711 goes forward to the step S721 in which QFin[v][u] corresponding to QFout [v][u] is assigned to QFdiff[v][u] as follows:

QFdiff[v][u]=QFin[v][u] (QFout[v][u]=0)         Equation (14)

Then, the step S721 goes forward to the step S741.

If it is judged that QFout[v][u] is not equal to zero in the step S711, the step S711 goes forward to the step S731 in which QFin[v][u] corresponding to QFout[v][u] is assigned to QFnonzero-in[w]. Here, QFdiff[v][u] remains NULL. NULL is intended to mean "empty" or "not defined".

The step S731 goes forward to the step S732 in which QFout[v][u] is assigned to QFnonzero-out[w]. The step S732 goes forward to the step S733 in which w is incremented by one. Then the step S733 goes forward to the step S741.

In the step S741, it is judged whether (v, u) is (7, 7) or not. If it is judged that (v, u) is (7, 7), the step S741 goes forward to the step END. Otherwise, the step S741 goes forward to the step S742 in which (v, u) goes to the next position in a zigzag fashion. As described herein earlier, coefficients in the block layers are scanned in a zigzag fashion. This means intra-block index (v, u) pointing coefficients in the block layer moves in a zigzag fashion. Then the step S742 goes forward to the step S711. The steps S711 to S733 and S742 are repeated until (v, u) becomes (7, 7), this means all the coefficients in the block layer are processed.

The process of (b) encoding differential zero coefficient information will be described hereinlater.

As described hereinbefore, QFdiff[v][u] contains defined values of QFin[v][u] corresponding to QFout[v][u]=0 and non-defined values of NULL. The differential coefficient information zigzag scanning unit 1240 of the bit stream separating apparatus 1000 is operated to scan QFdiff[v][u] in a zigzag fashion to read only the defined values to generate one-dimensional value strings.

The differential coefficient information zigzag scanning unit 1240 is subsequently operated to generate the differential zero coefficient information including combinations of run and level, the run on the basis of the one-dimensional value strings thus generated.

The bit stream separating apparatus 1000 is then operated to encode the combinations of run and level, and attaching EOB codes at the ends of respective combinations of run and level, the run.

There are provided three methods of encoding the combinations of run and level, the run.

The first method of encoding the combinations of run and level is performed through the step of encoding each of the combinations of run and level as one unit. In this case, each of the combinations of run and level can be encoded in accordance with MPEG-2 standard code. Also run-level code table can be used for encoding each of combinations of run and level to a variable length code.

The second method of encoding the combinations of run and level is performed by encoding runs and levels separately, that is, through the step of firstly encoding run and secondly encoding level. In this case, variable length codes are prepared for runs and levels separately.

The third method of encoding the combinations of run and level is performed through the step of firstly encoding run, and secondly encoding level on the basis of the re-quantization parameter derivation constant m and the value of level.

More specifically, the differential bit stream generating portion 1200 is provided with a storage unit, a variable length code table selecting unit, and a variable length encoding unit, not shown. The storage unit is operative to store a plurality of level code tables are stored. The level code table is used to encode differential zero coefficient information, i.e., level to a variable length code. The variable length code table selecting unit is operative to select a level code table from among the level code tables in response to the re-quantization parameter derivation constant m. The variable length encoding unit is operative to encode the differential zero coefficient information to variable length codes in accordance with the table selected by the variable length code table selecting unit.

Alternatively, the differential bit stream generating portion 1200 can compute the level code table. This is the most efficient method of encoding combinations of run and level.

The third method of encoding the combinations of run and level will be described in detail.

Variable length codes, i.e., code words for run and level are shown in FIG. 21 and FIG. 22. A run code table for intra-picture is shown in FIG. 21(*a*) and a run code table for inter-picture is shown in FIG. 21(*b*). The run code tables shown in FIG. 21(*a*) and FIG. 21(*b*) are created in accordance with the Huffman coding algorithm on the basis of run occurrence probability, i.e., frequency of run occurrences.

As shown in FIG. 21, one-bit code word is assigned to run=0. The code word is assigned to level in accordance with the level code table selected on the basis of the re-quantization parameter derivation constant m. This means that the variable length code assigned to (run, level)=(0, ±1) is "0s" (m=1) or "00s" (m≧2) in accordance with the third method. The first code of the code word stands for the code word of run, the remaining code(s) of the code word stands for the code word of level.

The variable length code assigned to (run, level)=(0, ±1) is, on the other hand, determined to "1s" (first DCT coefficient) or "11s" (DCT coefficient other than the first one) in accordance with the MPEG-2 standard.

As will be seen from the foregoing description, the code length of the variable length code assigned to (run, level)=(0, ±1) in accordance with the third method is the same as that of the variable length code assigned to (run, level)=(0, ±1) in accordance with the MPEG-2 standard.

The occurrence probability of run whose value is equal to 0 is more than 50%, and the occurrence probability of run whose value is equal to 0 or 1 is more than 70% for intra-picture. Furthermore, the occurrence probability of run whose value is equal to 0 or 1 is more than 50% for inter-picture. The run code tables used for the third method are created in accordance with the Huffman coding algorithm on the basis of run occurrence probability as described hereinbefore. In the case of the third method, code words of short code length are therefore assigned to runs of high occurrence probability, for instance, runs whose values are equal to 0 and 1, thereby reducing the total of code length, and increasing the efficiency of the encoding operation.

FIG. 22 shows an example of the level code table for the re-quantization parameter derivation constant m=6. In FIG. 22, the code word of level can be expressed by "zero" and sign bit "s" followed by the consecutive "ones" for the number of |level|−1. The maximum value of |level| is the value of the re-quantization parameter derivation constant m.

The code words shown in FIG. 22 are the same as those of code table of the differential MB quantization parameter deviation constant Δm shown in FIG. 12. This leads to the fact that if the variable length codes, i.e., code words shown in FIG. 22 are assigned to levels, each of the code words can be computed to decode level by counting the number of consecutive ones in the code word, thereby making it possible to compute the code words without using the level code table.

More specifically, the differential bit stream generating portion 1200 is provided with a storage unit, a run coding unit, and a level coding unit. The storage unit is operative to store a run table used to encode the runs to respective variable length codes. The level coding unit operative to compute the levels to variable length codes, by computing the variable length codes to be assigned to the levels on the basis of a first quantization parameter derivation constant Δm used to reconstruct the first macroblock quantization parameter MQ1 from the second macroblock quantization parameter MQ2.

The differential coefficient information zigzag scanning unit 1240 and the differential BS multiplexing and encoding unit 1290 of the differential bit stream generating portion 1200 collectively constitute the storage unit, the run coding unit, and the level coding unit according to the present invention.

Upon terminating the process of encoding differential zero coefficient information in the block layer, the differential non-zero coefficient information will be encoded in the block layer.

The process of (c) encoding differential non-zero coefficient information will be described hereinlater.

Differential non-zero coefficient information stored in the one-dimensional value string QFnonzero-in[w] and the one-dimensional value string QFnonzero-out[w] is read and encoded in the following manner.

The prediction error ΔQF[w] is computed from the quantization parameter MQ1, the re-quantization parameter MQ2, and QFnonzero-out[w] as follows:

$$\Delta QF[w] = QFnonzero\text{-}in[w] - \left\lfloor QFnonzero\text{-}out[w] \times \frac{MQ2}{MQ1} + \frac{1}{2} \right\rfloor \quad \text{Equation (15)}$$

where ⌊ ⌋ in the above equation is intended to mean the rounding operation, and ΔQF[w] is intended to mean the prediction error between the real QFnonzero-in[w] and the estimated QFnonzero-in[w] estimated on the basis of QFnonzero-out[w] as described hereinbefore.

Then, the prediction error ΔQF[w] thus computed is encoded to a variable length code.

There are provided two methods of encoding the prediction error ΔQF[w].

The first method of encoding the prediction error ΔQF[w] is performed using a predetermined prediction error code table. This means that the bit stream separating apparatus 1000 is provided with a prediction error code table memory unit in which the prediction error code table is stored. The bit stream separating apparatus 1000 is operated to encode the prediction error ΔQF[w] to a variable length code in accordance with the prediction error code table.

The second method of encoding the prediction error ΔQF[w] is performed on the basis of the re-quantization parameter derivation constant m and the value of level.

More specifically, the differential bit stream generating portion 1200 is provided with a storage unit, a variable length code table selecting unit, and a variable length encoding unit, not shown. The storage unit is operative to store a plurality of prediction error code tables are stored. The prediction error code table is used to encode differential non-zero coefficient information, i.e., prediction error ΔQF[w] to a variable length code. The variable length code table selecting unit is operative to select a prediction error code table from among the prediction error code tables in response to the re-quantization parameter derivation constant m. The variable length encoding unit is operative to encode the differential non-zero coefficient information, i.e., ΔQF[w] to variable length codes in accordance with the table selected by the variable length code table selecting unit.

The prediction error calculating unit 1230, the differential coefficient information zigzag scanning unit 1240, and the differential BS multiplexing and encoding unit 1290 of the differential bit stream generating portion 1200 collectively constitute the storage unit, the variable length code table selecting unit, and the variable length code encoding unit according to the present invention.

Alternatively, the bit stream separating apparatus 1000 can compute the ΔQF[w] code table. This is a quite efficient method of encoding the prediction error ΔQF[w].

The second method of encoding the prediction error ΔQF[w] will be described in detail.

Examples of variable length codes, i.e., code words of the prediction error ΔQF[w] for the intra-picture and the re-quantization parameter derivation constant m=6 are shown in FIG. 23.

The maximum value of |ΔQF[w]| is the value of the re-quantization parameter derivation constant m, i.e., 6. |ΔQF[w]| is accordingly any integer of 0 to 6.

The sign bit "s" indicates whether ΔQF[w] is positive or negative. This means that 0 is assigned to "s" if ΔQF[w] is positive while 1 is assigned to "s" if ΔQF[w] is negative. The sign bit "s" is required only for the intra-picture. This means that the sign bit "s" is omitted for the inter-picture.

The code words of the prediction error ΔQF[w] for the intra-picture are same as those of code table of the differential MB quantization parameter deviation constant Δm shown in FIG. 12. This leads to the fact that if the variable length codes, i.e., code words shown in FIG. 23 are assigned to the prediction error ΔQF[w], each of the code words can be computed to decode ΔQF[w] by counting the number of consecutive ones in the code word, thereby making it possible to compute the code words without using the prediction error code table.

This means that the differential bit stream generating portion 1200 is operative to compute a variable length code to be assigned to the prediction error ΔQF[w] on the basis of the quantization parameter derivation constant Δm used to reconstruct the macroblock quantization parameter MQ1 from the macroblock re-quantization parameter MQ2, and the prediction error ΔQF[w].

The process of encoding the coefficient information of the block layer has thus far been described.

The principle of decoding the differential coefficient information will be described in reference to FIG. 24. The differential coefficient information includes differential zero coefficient information having combinations of run and level such as (3, 1), (1, 1), (1, 1), and (0, −1), EOB codes, and differential non-zero coefficient information having the prediction error ΔQF[w] such as 0, −1, 0, and 1 aligned in the order as shown in FIG. 24.

The process of decoding the differential coefficient information to reconstruct the coefficient information in the block layer of the original MPEG-2, i.e., QFin[v][u] performed by the bit stream merging apparatus 2000 will be described in detail.

The process of decoding the differential coefficient information in the block layer to reconstruct the coefficient information in the block layer of the original MPEG-2, i.e., QFin[v][u] is performed through the steps of:

a) receiving the re-quantization parameter derivation constant m:

b) decoding differential zero coefficient information to reconstruct the coefficient information in the block layer of the original MPEG-2 bit stream:

c) decoding non-zero coefficient information to reconstruct the coefficient information in the block layer of the original MPEG-2 bit stream: and d) combing the differential non-zero coefficient information reconstructed in the step (b) with the non-zero coefficient information reconstructed in the step (c) to reconstruct the coefficient information in the block layer of the original MPEG-2 bit stream.

The process of (a) receiving the re-quantization parameter derivation constant m is performed by the bit stream merging apparatus 2000 from the differential bit stream.

More specifically, the code mode switching unit 2130, the coefficient information reconstructing unit 2140, the differential coefficient information reconstructing unit 2150, the adding unit 2160 and the reconstructed coefficient information scanning unit 2170 of the bit stream merging apparatus 2000 is provided with a macroblock quantization parameter reconstruction information reconstructing section, not shown. The macroblock quantization parameter reconstruction information reconstructing section is operative to reconstruct re-quantization parameter derivation constant m used to reconstruct the macroblock quantization parameter (MQ1) from said differential coded moving picture sequence signal to reconstruct the macroblock quantization parameter (MQ1).

The code mode switching unit 2130, the coefficient information reconstructing unit 2140, the differential coefficient information reconstructing unit 2150, the adding unit 2160 and the reconstructed coefficient information scanning unit 2170 of the bit stream merging apparatus 2000 collectively constitute the macroblock quantization parameter reconstruction information reconstructing section according to the present invention.

The process of (b) decoding differential zero coefficient information to reconstruct the coefficient information in the block layer of the original MPEG-2 bit stream will be described in detail.

The differential coefficient information reconstructing unit 2150 of the bit stream merging apparatus 2000 is operated to input the differential zero coefficient information including combinations of run and level form the differential bit stream to decode the combinations of run and level (run, level) in accordance with re-quantization parameter derivation constant m previously received, and reconstruct the block layer, i.e., 8 by 8 matrices of coefficients in accordance with intra-block index (v, u). 8 by 8 matrices of coefficients reconstructed up to this process include coefficients whose values are NULL (not defined). The differential coefficient information reconstructing unit 2150 is operated to continue and repeat the above operation until EOB is read to reconstruct the zero coefficient information in the block layer.

The process of (c) decoding differential non-zero coefficient information to reconstruct the non-zero coefficient information in the block layer of the original MPEG-2 bit stream will be described in detail.

The bit stream merging apparatus 2000 is provided with a memory unit for storing one-dimensional value string QFnonzero-out[w]. The coefficient information reconstructing unit 2140 of the bit stream merging apparatus 2000 is operated to input and read the combinations of run and level of the transcoded MPEG-2 bit stream from the BS demultiplexing and decoding unit 2110 to store the coefficients thus read into the one-dimensional value string QFnonzero-out[w] in a zigzag fashion one after another to reconstruct 8 by 8 matrices of coefficients.

The coefficient information reconstructing unit 2140 of the bit stream merging apparatus 2000 is operated to input the prediction error ΔQF from the differential BS demultiplexing and decoding unit 2120 to decode the prediction error ΔQF in accordance with the prediction error code table selected on the basis of the re-quantization parameter derivation constant m.

The coefficient information reconstructing unit 2140 of the bit stream merging apparatus 2000 is then operated to read QFnonzero-out[w] to reconstruct the non-zero coefficient information, i.e., QFnonzero-rec[w] on the basis of QFnonzero-out[w], the prediction error ΔQF thus decoded, the re-quantization parameter MQ2 received from the transcoded MPEG-2 bit stream, and the quantization parameter MQ1 reconstructed from the MB information in accordance with Equation (16) as follows:

$$QFnonzero\text{-}rec = \Delta QF + \left\lfloor QFnonzero\text{-}out \times \frac{MQ2}{MQ1} + \frac{1}{2} \right\rfloor \quad \text{Equation (16)}$$

where in the above equation is intended to mean the rounding operation.

The process of (d) combing the differential zero coefficient information reconstructed in the step (b) with the coefficient information reconstructed in the step (c) to reconstruct the coefficient information in the block layer of the original MPEG-2 bit stream will be described hereinlater.

The adding unit 2160 and the reconstructed coefficient information scanning unit 2170 of the bit stream merging apparatus 2000 are operated to input 8 by 8 matrices reconstructed by the coefficient information reconstructing unit 2140 and the coefficient information QFnonzero-out[w] to scan coefficients of the 8 by 8 matrices in a zigzag fashion and sequentially replace NULL in the 8 by 8 matrices with the coefficient information QFnonzero-rec[w] decoded in the process (b) to reconstruct 8 by 8 matrices, i.e., the block layer of the original MPEG-2 bit stream as shown in FIG. 24.

The adding unit 2160 and the reconstructed coefficient information scanning unit 2170 of the bit stream merging apparatus 2000 are then operated to the scan and encode 8 by 8 matrices thus reconstructed in a zigzag fashion to generate the combinations of run and level.

Experimental simulations were performed to test the performance of the bit stream separating apparatus 1000 under the following conditions:

Test Sequence: 150 pieces of Buses (size 704 pixels 480 lines, 4:2:0 format)
Input MPEG-2 bit streams: GOP structure; N=15, M=3, the bit rate of 15 Mbps.

The result of the experimental simulations is shown in FIG. 25. In FIG. 25, the horizontal axis is intended to mean the bit rate of the transcoded MPEG-2 bit stream and the vertical axis is intended to mean the bit rate of respective bit stream. It is seen from FIG. 25 that the total bit rte of the transcoded MPEG-2 bit stream and the differential bit stream does not exceed the bit rate of the input (original) MPEG-2 bit stream.

As will be understood from the foregoing description, the bit stream separating apparatus 1000 thus constructed can input an original MPEG-2 bit stream, and transcode the original MPEG-2 bit stream to separate into and generate a transcoded MPEG-2 bit stream and a differential bit stream. The bit stream merging apparatus 2000 thus constructed can input and merge the transcoded MPEG-2 bit stream and the differential bit stream to generate the original MPEG-2 bit stream.

This means that the bit stream separating apparatus 1000 can input an original MPEG-2 bit stream of, for instance, a video theater, to generate the transcoded MPEG-2 bit stream and the differential bit stream. The operator of the bit stream separating apparatus 1000 can send the transcoded MPEG-2 bit stream to a client and store the differential bit stream. The client can decode the transcoded MPEG-2 bit stream to watch the video theater. If the client is interested in the video theater and likes to watch the high-quality video theater, the client can request the operator to send the differential bit stream. The operator of the bit stream separating apparatus 1000 sends the stored differential bit stream to the client in response to the client's request. Upon receiving the differential bit stream, the client can operate the bit stream merging apparatus 2000 to merge the differential bit stream just received and the transcoded MPEG-2 bit stream previously received to reconstruct the original, i.e., high-quality MPEG-2 bit stream to watch the high-quality video theater. This leads to the fact that the bit stream separating apparatus 1000 and the bit stream merging apparatus 2000 makes it possible for the operator to eliminate the time and effort to send the original MPEG-2 bit stream again.

The many features and advantages of the invention are apparent from the detailed specification, and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described herein, and accordingly, all suitable modifications and equivalents may be construed as being encompassed within the scope of the invention.

What is claimed is:

1. A coded signal separating apparatus for transcoding a first coded moving picture sequence signal to generate a second coded moving picture sequence signal and a differential coded moving picture sequence signal being a difference between said first coded moving picture sequence signal and said second coded moving picture sequence signal, comprising:

inputting means for inputting said first coded moving picture sequence signal therethrough, said first coded moving picture sequence signal generated as a result of encoding original moving picture sequence signal and consisting of a series of first picture information having first coefficient information, said first coefficient information including a matrix of first coefficients;

coded signal converting means for inputting said first coded moving picture sequence signal from said inputting means, and converting said first coded moving picture sequence signal inputted through said inputting means to generate said second coded moving picture sequence signal, said second coded moving picture sequence signal consisting of a series of second picture information having second coefficient information, said second coefficient information including a matrix of second coefficients, each of said original moving picture sequence signal, said first coded moving picture sequence signal, and said second coded moving picture sequence signal is in the form of a hierarchical structure including one or more sequence layers each having a plurality of screens sharing common information, one or more picture layers each having a plurality of slices sharing common information with respect to one of said screens, one or more slice layers each having a plurality of macroblocks with respect to one of said slices, one or more macroblock layers each having a plurality of blocks with respect to one of said macroblocks, and one or more block layers each having block information with respect to one of said blocks; and differential coded signal generating means for inputting said first coded moving picture sequence signal and said second coded moving picture sequence signal from said coded signal converting means to generate said differential coded moving picture sequence signal, whereby said differential coded signal generating means is operative to generate said differential coded moving picture sequence signal on the basis of said first coefficient information obtained from said series of first picture information of said first coded moving picture sequence signal, and said second coefficient information obtained from said series of said second picture information of said second coded moving picture sequence signal.

2. A coded signal separating apparatus as set forth in claim 1, in which said differential coded signal generating means is operative to generate said differential coded moving picture sequence signal in the form of said hierarchical structure.

3. A coded signal separating apparatus as set forth in claim 1, in which said second coefficient information includes second zero coefficient information consisting of zero coefficients and second non-zero coefficient information consisting of non-zero coefficients, said first coefficient information includes zero conversion first coefficient information consisting of zero conversion first coefficients to be converted by said coded signal converting means to said zero coefficients, and non-zero conversion first coefficient information consisting of non-zero conversion first coefficients to be converted by said coded signal converting means to said non-zero coefficients, said differential coded signal generating means includes:

a coefficient information separating unit for inputting said first coefficient information and said second coefficient information from said coded signal converting means to separate into said zero conversion first coefficient information and said second zero coefficient information from said non-zero conversion first coefficient information and said second non-zero coefficient information, respectively;

a zero coefficient encoding unit for inputting said zero conversion first coefficient information from said coefficient information separating unit to extract differential information between said zero conversion first coefficient information and said second zero coefficient information to generate differential zero coefficient information;

a non-zero coefficient encoding unit for inputting said non-zero conversion first coefficient information and said second non-zero coefficient information from said coefficient information separating unit to extract differential information between said non-zero conversion first coefficient information and said second non-zero coefficient information to generate differential non-zero coefficient information.

4. A coded signal separating apparatus as set forth in claim 3, in which said non-zero coefficient encoding unit is operative to generate said differential non-zero coefficient information on the basis of the values of said first coefficients of said non-zero conversion first coefficient information and the values of said second coefficients of said second non-zero coefficient information.

5. A coded signal separating apparatus as set forth in claim 4, in which said coded signal converting means is operated to obtain a first macroblock quantization parameter used for the quantization of each of said macroblocks contained in said original moving picture sequence signal to generate said macroblocks contained in said first coded moving picture sequence signal from said first coded moving picture sequence signal, and a second macroblock quantization parameter to be used for the inverse-quantization of each of said macroblocks contained in said second coded moving picture sequence signal from said second coded moving picture sequence signal, whereby said non-zero coefficient encoding unit is operative to input said first macroblock quantization parameter and said second macroblock quantization parameter from said coded signal converting means, compute a prediction error between said non-zero conversion first coefficient information and an estimated non-zero conversion first coefficient information on the basis of a ratio of said second macroblock quantization parameter to said first macroblock quantization parameter, and said second non-zero coefficient information.

6. A coded signal separating apparatus as set forth in claim 5, in which said differential coded signal generating means is operative to compute a variable length code to be assigned to said prediction error on the basis of a first quantization parameter derivation constant used to reconstruct said first macroblock quantization parameter from said second macroblock quantization parameter, and said prediction error.

7. A coded signal separating apparatus as set forth in claim 3, in which said zero coefficient encoding unit is operative to scan said zero conversion first coefficient information in a zigzag fashion to generate said differential zero coefficient information including combinations of run and level, said run being the number of consecutive zero-value coefficients, said level being the value of a non-zero value coefficient immediately followed by said consecutive zero-value coefficients whereby said zero coefficient encoding unit is operative to eliminate zero coefficients in said zero conversion first coefficient information to compress the amount of information in said differential zero coefficient information.

8. A coded signal separating apparatus as set forth in claim 7, in which said differential coded signal generating means is provided with:

a storage unit for storing a run table used to encode said runs to respective variable length codes;

a run coding unit operative to encode said runs to variable length codes in accordance with said run table in consideration of the frequency of occurrences; and a level coding unit operative to compute said levels to variable length codes by computing said variable length codes to be assigned to said levels on the basis of a first quantization parameter derivation constant used to reconstruct said first macroblock quantization parameter from said second macroblock quantization parameter.

9. A coded signal separating apparatus as set forth in claim 3, in which said differential coded signal generating means is provided with a storage unit for storing a plurality of tables each used to encode said respective differential zero coefficient information and said respective differential non-zero coefficient information to respective variable length codes, a variable length code table selecting unit operative to select a table from among said tables in response to said first quantization parameter derivation constants; and a variable length encoding unit operative to encode said differential zero coefficient information and said differential non-zero coefficient information to variable length codes in accordance with said table selected by said variable length code table selecting unit.

10. A coded signal separating apparatus as set forth in claim 1, in which said macroblock layer includes blocks consisting of encoded blocks and non-encoded blocks, and a coded block pattern indicating the positions of said respective encoded blocks and non-encoded blocks in said macroblock layer, said differential coded signal generating means is provided with a coded block pattern generating unit operative to generate differential coded block patterns between said coded block patterns of said first coded moving picture sequence signal and said coded block patterns of said second coded movingpicture sequence signal.

11. A coded signal separating apparatus as set forth in claim 10, in which said coded block pattern generating unit is operative to generate differential CBP value strings each indicating the positions of said encoded blocks and non-encoded blocks in said macroblock layer of said first coded moving picture sequence signal with respect to non-encoded blocks of said macroblock layer of said second coded moving picture sequence signal.

12. A coded signal separating apparatus as set forth in claim 11, in which each of said macroblocks includes said blocks consisting of brightness blocks and color-difference blocks, said differential CBP value strings consisting of differential brightness CBP value strings and differential color-difference CBP value strings, said differential brightness CBP value strings each indicating the positions of said encoded brightness blocks and non-encoded brightness blocks in said respective macroblock layer of said first coded moving picture sequence signal with respect to non-encoded brightness blocks in said respective macroblock layer of said second coded moving picture sequence signal, differential color-difference CBP value strings each indicating the positions of said encoded color-difference blocks and non-encoded color-difference blocks in said respective macroblock layer of said first coded moving picture sequence signal with respect to non-encoded color-difference blocks in said respective macroblock layer of said second coded moving picture sequence signal, said coded block pattern generating unit is further equipped with:

an unnecessary block counting section operative to count the number of said unnecessary brightness blocks and the number of said unnecessary color-difference blocks in said macroblock of said second coded moving picture sequence signal;

a storage section for storing a plurality of brightness tables each used to encode said differential brightness CBP value strings to respective variable length codes, and a plurality of color-difference tables each used to encode said differential color-difference CBP value strings to respective variable length codes;

a differential brightness CBP encoding section operative to encode said differential brightness CBP value strings to variable length codes in accordance with said brightness table; and a differential color-difference CBP encoding section operative to encode said differential color-difference CBP value strings to variable length codes in accordance with said color-difference table, whereby said differential brightness CBP encoding section is operative to select one brightness table from among said brightness tables in response to the number of said unnecessary brightness blocks counted by said unnecessary block counting section, and said differential color-difference CBP encoding section is operative to select one color-difference table from among said color-difference tables in response to the number of said unnecessary differential color-difference blocks counted by said unnecessary block counting section.

13. A coded signal separating apparatus as set forth in claim 1, in which said macroblock layer contains macroblock attribute information including a macroblock address indicating the position of said macroblock, and a macroblock address increment, i.e., MBAI indicating the number of said macroblock addresses to be skipped, said differential coded signal generating means includes:

a differential macroblock coding unit operative to input macroblocks of said first coded moving picture sequence signal and macroblocks of said second coded moving picture sequence signal from said coded signal converting means to generate macroblocks of said differential coded moving picture sequence signal, said macroblocks of said differential coded moving picture sequence signal being differences between said macroblocks of said first coded moving picture sequence signal and said macroblocks of said second coded moving picture sequence signal with respect to said respective macroblock addresses so as to eliminate macroblocks remained unchanged between said first coded moving picture sequence signal and said second coded moving picture sequence signal with respect to said respective macroblock addresses; and a MBAI coding unit operative to generate said MBAIs of said macroblock attribute information of said differential coded moving picture sequence signal, said MBAIs of said differential coded moving picture sequence signal indicates the number of macroblock addresses of said macroblocks eliminated by said differential macroblock coding unit with respect to said macroblocks of said differential coded moving picture sequence signal generated by said differential macroblock coding unit so that said macroblocks of said differential coded moving picture sequence signal correspond to said macroblocks of said first coded moving picture sequence signal and said macroblocks of said second coded moving picture sequence signal with respect to said respective macroblock addresses.

14. A coded signal separating apparatus as set forth in claim 1, in which
said coded signal converting means is operative to inversely quantize each of said macroblocks contained in said first coded moving picture sequence signal in accordance with said first macroblock quantization parameter to reconstruct said original moving picture sequence signal, and quantize each of said macroblocks of said reconstructed original moving picture sequence signal in accordance with said second macroblock quantization parameter to generate said second coded moving picture sequence signal; and
said differential coded signal generating means includes a macroblock quantization parameter reconstruction information generating unit operative to generate macroblock quantization parameter reconstruction information used to reconstruct said first macroblock quantization parameter.

15. A coded signal separating apparatus as set forth in claim 14, in which said macroblock quantization parameter reconstruction information generating unit is operative to generate said macroblock quantization parameter reconstruction information on the basis of a first quantization parameter derivation constant used to reconstruct said first macroblock quantization parameter from said second macroblock quantization parameter.

16. A coded signal separating apparatus as set forth in claim 15, in which said macroblock quantization parameter reconstruction information generating unit is operative to generate said macroblock quantization parameter reconstruction information on the basis of a difference between said first quantization parameter derivation constant and previously generated macroblock quantization parameter reconstruction information of said macroblocks of said differential coded moving picture sequence signal.

17. A coded signal separating apparatus as set forth in claim 16, in which said macroblock quantization parameter reconstruction information generating unit is operative to compute variable length codes to be assigned to said macroblock quantization parameter reconstruction information in accordance with the absolute value of said macroblock quantization parameter reconstruction information.

18. A coded signal separating apparatus as set forth in claim 1, in which
said coded signal converting means is operative to convert each of said macroblocks contained in said first coded moving picture sequence signal on the basis of the ratio of said first macroblock quantization parameter to said second macroblock quantization parameter to generate said second coded moving picture sequence signal; and
said differential coded signal generating means includes a macroblock quantization parameter reconstruction information generating unit operative to generate macroblock quantization parameter reconstruction information used to reconstruct said first macroblock quantization parameter.

19. A coded signal separating apparatus as set forth in claim 1, in which
said coded signal converting means is operative to inversely quantize each of said macroblocks contained in said slice layers of said first coded moving picture sequence signal in accordance with a first slice quantization parameter used for the quantization of each of said macroblocks contained in said slice layers of said original moving picture sequence signal to reconstruct said original moving picture sequence signal, and quantize each of said macroblocks in said slice layers of said reconstructed original moving picture sequence signal in accordance with a second slice quantization parameter used for the inverse-quantization of each of said macroblocks contained in said slice layers of said second coded moving picture sequence signal to generate said second coded moving picture sequence signal; and
said differential coded signal generating means includes a slice quantization parameter reconstruction information generating unit operative to generate slice quantization parameter reconstruction information used to reconstruct said first slice quantization parameter.

20. A coded signal separating apparatus as set forth in claim 19, in which said slice quantization parameter reconstruction information generating unit is operative to generate said slice quantization parameter reconstruction information on the basis of a first slice quantization parameter derivation constant used to reconstruct said first slice quantization parameter from said second slice quantization parameter.

21. A coded signal separating apparatus as set forth in claim 1, in which
said coded signal converting means is operative to convert each of said macroblocks contained in said slice layers of said first coded moving picture sequence signal on the basis of the ratio of said first slice quantization parameter to said second slice quantization parameter to generate said second coded moving picture sequence signal; and
said differential coded signal generating means includes a slice quantization parameter reconstruction information generating unit operative to generate slice quantization parameter reconstruction information used to reconstruct said first slice quantization parameter.

22. A coded signal separating apparatus as set forth in claim 1, in which said differential coded signal generating means is provided with a attaching unit operative to obtain information indicative of the capacity of VBV buffer from said first coded moving picture sequence signal and attach said information to said differential coded moving picture sequence signal.

23. A coded signal separating apparatus as set forth in claim 1, in which each of said sequence layers includes a sequence header indicative of the start of said sequence layer, said differential coded signal generating means includes a sequence header attaching unit operative to attach said sequence headers to said respective sequence layers of said differential coded moving picture sequence signal.

24. A coded signal separating apparatus as set forth in claim 1, in which said first coded moving picture sequence signal is to be transmitted at a first bit rate, said differential coded signal generating means includes a bit rate information attaching unit operative to generate first bit rate information indicative of said first bit rate and attach said first bit rate information to said differential coded moving picture sequence signal.

25. A coded signal separating apparatus as set forth in claim 24, in which said bit rate information attaching unit is operative to generate said first bit rate information on the basis of the value of said first bit rate divided by 400 and attach said first bit rate information to said differential coded moving picture sequence signal.

26. A differential coded signal generating apparatus for inputting a first coded moving picture sequence signal and a second coded moving picture sequence signal to generate a differential coded moving picture sequence signal, said second coded moving picture sequence signal being generated as a result of transcoding said first coded moving picture sequence signal, said differential coded moving picture sequence signal being a difference between said first coded moving picture sequence signal and said second coded moving picture sequence signal, comprising:

first coded signal inputting means for inputting said first coded moving picture sequence signal therethrough, said first coded moving picture sequence signal generated as a result of encoding original moving picture sequence signal and consisting of a series of first picture information having first coefficient information, said first coefficient information including a matrix of first coefficients;

second coded signal inputting means for inputting said second coded moving picture sequence signal therethrough, said second coded moving picture sequence signal consisting of a series of second picture information having second coefficient information, said second coefficient information including a matrix of second coefficients; and differential coded signal generating means for inputting said first coded moving picture sequence signal from said first coded signal inputting means and said second coded moving picture sequence signal from said second coded signal inputting means to generate said differential coded moving picture sequence signal, whereby said differential coded signal generating means is operative to generate said differential coded moving picture sequence signal on the basis of said first coefficient information obtained from said series of said first picture information of said first coded moving picture sequence signal, and said second coefficient information obtained from said series of said second picture information of said second coded moving picture sequence signal.

27. A coded signal merging apparatus for inputting a second coded moving picture sequence signal and a differential coded moving picture sequence signal to reconstruct a first coded moving picture sequence signal, said differential coded moving picture sequence signal being a difference between said first coded moving picture sequence signal and said second coded moving picture sequence signal, comprising:

second coded signal inputting means for inputting said second coded moving picture sequence signal therethrough, said second coded moving picture sequence signal generated as a result of transcoding said first coded moving picture sequence signal and consisting of a series of second picture information having second coefficient information, said second coefficient information including a matrix of second coefficients, said first coded moving picture sequence signal generated as a result of encoding original moving picture sequence signal and consisting of a series of first picture information having first coefficient information, said first coefficient information including a matrix of first coefficients;

differential coded signal inputting means for inputting said differential coded moving picture sequence signal therethrough, said differential coded moving picture sequence including differential coefficient information between said first coefficient information and said second coefficient information, each of said original moving picture sequence signal, said first coded moving picture sequence signal, said second coded moving picture sequence signal, and said differential coded moving picture sequence signal is in the form of a hierarchical structure including one or more sequence layers each having a plurality of screens sharing common information, one or more picture layers each having a plurality of slices sharing common information with respect to one of said screens, one or more slice layers each having a plurality of macroblocks with respect to one of said slices, one or more macroblock layers each having a plurality of blocks with respect to one of said macroblocks, and one or more block layers each having block information with respect to one of said blocks; and first coded signal merging means for inputting said second coded moving picture sequence signal from said second coded signal inputting means and said differential coded moving picture sequence signal from said differential coded signal inputting means to reconstruct said first coded moving picture sequence signal, whereby said first coded signal merging means is operative to reconstruct said first coded moving picture sequence signal on the basis of said second coefficient information obtained from said series of second picture information of said second coded moving picture sequence signal, and said differential coefficient information obtained from said differential coded signal inputting means.

28. A coded signal merging apparatus as set forth in claim 27, in which said second coefficient information includes second zero coefficient information consisting of zero coefficients and second non-zero coefficient information consisting of non-zero coefficients, said first coefficient information includes zero conversion first coefficient information consisting of zero conversion first coefficients to be converted to said zero coefficients, and non-zero conversion first coefficient information consisting of non-zero conversion first coefficients to be converted to said non-zero coefficients, said first coded signal merging means is provided with:

a zero conversion first coefficient information generating unit operative to reconstruct said zero conversion first coefficients on the basis of said second zero coefficient information of said second coded moving picture sequence signal and said differential coefficient information of said differential coded moving picture sequence signal;

a non-zero conversion first coefficient information generating unit operative to reconstruct said non-zero conversion first coefficients on the basis of said second non-zero coefficient information of said second coded moving picture sequence signal and said differential coefficient information of said differential coded moving picture sequence signal; and a first coefficient information merging unit operative to merge said zero conversion first coefficients information reconstructed by said zero conversion first coefficient information generating unit and non-zero conversion first coefficient information reconstructed by said non-zero conversion first coefficient information generating unit to reconstruct said first coefficient information.

29. A coded signal merging apparatus as set forth in claim 27, in which each of said macroblock layers of said first coded moving picture sequence signal and said second coded moving picture sequence signal includes blocks consisting of encoded blocks and non-encoded blocks, and a coded block pattern indicating the positions of said respective encoded blocks and non-encoded blocks in said macroblock layer, each of said macroblock layers of differential coded moving picture sequence signal includes a differential coded block pattern being a difference between said coded block patterns of respective macroblock layers of said first coded moving picture sequence signal and said second coded moving picture sequence signal, first coded signal merging means is provided with a coded block pattern reconstructing section operative to reconstruct said coded block patterns of said macroblock layers of said first coded moving picture sequence signal on the basis of said differential coded block patterns of said differential coded moving picture sequence signal.

30. A coded signal merging apparatus as set forth in claim 27, in which said first coded moving picture sequence signal includes a first macroblock quantization parameter used for the quantization of each of said macroblocks contained in said original moving picture sequence signal, said second coded moving picture sequence signal includes a second macroblock quantization parameter to be used for the inverse-quantization of each of said macroblocks contained in said second coded moving picture sequence signal, said first coded signal merging means is provided with a macroblock quantization parameter reconstruction information reconstructing section operative to reconstruct said first macroblock quantization parameter reconstruction information used to reconstruct said first macroblock quantization parameter from said differential coded moving picture sequence signal to reconstruct said first macroblock quantization parameter.

31. A coded signal merging apparatus as set forth in claim 27, in which said first coded moving picture sequence signal includes a first slice quantization parameter used for the quantization of each of said macroblocks contained in said slice layer of said original moving picture sequence signal, said second coded moving picture sequence signal includes a second slice quantization parameter to be used for the inverse-quantization of each of said macroblocks contained in said slice layer of said second coded moving picture sequence signal, said first coded signal merging means is provided with a slice quantization parameter reconstruction information reconstructing section operative to reconstruct said first slice quantization parameter reconstruction information used to reconstruct said first slice quantization parameter from said differential coded moving picture sequence signal to reconstruct said first slice quantization parameter.

32. A coded signal merging apparatus as set forth in claim 27, in which said first coded signal merging means is provided with a VBV_Delay attaching unit operative to obtain VBV_Delay information indicative of the capacity of VBV buffer from said differential coded moving picture sequence signal and attach said VBV_Delay information to said first coded moving picture sequence signal.

33. A coded signal merging apparatus as set forth in claim 27, in which said first coded moving picture sequence signal is to be transmitted at a first bit rate, said differential coded moving picture sequence signal includes first bit rate information indicative of said first bit rate, said first coded signal merging means includes a bit rate information reconstructing unit operative to obtain said first bit rate information from said differential coded moving picture sequence signal to reconstruct said first coded moving picture sequence signal at said first bit rate.

34. A coded signal separating and merging apparatus comprising:

coded signal separating means for transcoding a first coded moving picture sequence signal to generate a second coded moving picture sequence signal and a differential coded moving picture sequence signal being a difference between said first coded moving picture sequence signal and said second coded moving picture sequence signal; and coded signal merging means for inputting said second coded moving picture sequence signal and said differential coded moving picture sequence signal to reconstruct said first coded moving picture sequence signal, said coded signal separating means including:

an inputting unit for inputting said first coded moving picture sequence signal therethrough;

a coded signal converting unit for inputting said first coded moving picture sequence signal from said inputting unit, and converting said first coded moving picture sequence signal inputted through said inputting unit to generate said second coded moving picture sequence signal;

a differential coded signal generating unit for inputting said first coded moving picture sequence signal and said second coded moving picture sequence signal from said coded signal converting unit to generate said differential coded moving picture sequence signal;

a second coded signal outputting unit for outputting said second coded moving picture sequence signal generated by said coded signal converting unit; and a differential coded signal outputting unit for outputting said differential coded moving picture sequence signal generated by said differential coded signal generating unit;

said coded signal merging means including:

a second coded signal inputting unit for inputting said second coded moving picture sequence signal therethrough;

a differential coded signal inputting unit for inputting said differential coded moving picture sequence signal therethrough;

a first coded signal merging unit for inputting said second coded moving picture sequence signal from said second coded signal inputting unit and said differential coded moving picture sequence signal from said differential coded signal inputting unit to reconstruct said first coded moving picture sequence signal; and a first coded signal outputting unit for outputting said first coded moving picture sequence signal reconstructed by said first coded signal merging unit.

35. A coded signal separating method of transcoding a first coded moving picture sequence signal to generate a second coded moving picture sequence signal and a differential coded moving picture sequence signal being a difference between said first coded moving picture sequence signal and said second coded moving picture sequence signal, comprising the steps of:

(a) inputting said first coded moving picture sequence signal therethrough, said first coded moving picture sequence signal generated as a result of encoding original moving picture sequence signal and consisting of a series of first picture information having first coefficient information, said first coefficient information including a matrix of first coefficients;

(b) converting said first coded moving picture sequence signal inputted in said step (a) to generate said second coded moving picture sequence signal, said second coded moving picture sequence signal consisting of a series of second picture information having second coefficient information, said second coefficient information including a matrix of second coefficients, each of said original moving picture sequence signal, said first coded moving picture sequence signal, and said second coded moving picture sequence signal is in the form of a hierarchical structure including one or more sequence layers each having a plurality of screens sharing common information, one or more picture layers each having a plurality of slices sharing common information with respect to one of said screens, one or more slice layers each having a plurality of macroblocks with respect to one of said slices, one or more macroblock layers each having a plurality of blocks with respect to one of said macroblocks, and one or more block layers each having block information with respect to one of said blocks; and (c) generating said differential coded moving picture sequence signal in response to said first coded moving picture sequence signal and said second coded moving picture sequence signal inputted in said step (b), whereby said step (c) has the step of generating said differential coded moving picture sequence signal on the basis of said first coefficient information obtained from said series of said first picture information of said first coded moving picture sequence signal, and said second coefficient information obtained from said series of said second picture information of said second coded moving picture sequence signal.

36. A coded signal separating method as set forth in claim 35, in which said step (c) has the step of generating said differential coded moving picture sequence signal in the form of said hierarchical structure.

37. A coded signal separating method as set forth in claim 35 or claim 36, in which said second coefficient information includes second zero coefficient information consisting of zero coefficients and second non-zero coefficient information consisting of non-zero coefficients, said first coefficient information includes zero conversion first coefficient information consisting of zero conversion first coefficients to be converted to said zero coefficients in said step (b), and non-zero conversion first coefficient information consisting of non-zero conversion first coefficients to be converted to said non-zero coefficients in said step (b), said step (c) further includes the steps of:

(c1) separating into said zero conversion first coefficient information and said second zero coefficient information from said non-zero conversion first coefficient information and said second non-zero coefficient information, respectively;

(c2) extracting differential information between said zero conversion first coefficient information and said second zero coefficient information separated in said step (c1) to generate differential zero coefficient information; and (c3) extracting differential information between said non-zero conversion first coefficient information and said second non-zero coefficient information separated in said step (c1) to generate differential non-zero coefficient information.

38. A coded signal separating method as set forth in claim 37, in which said step (c3) has the step of generating said differential non-zero coefficient information on the basis of the values of said first coefficients of said non-zero conversion first coefficient information and the values of said second coefficients of said second non-zero coefficient information.

39. A coded signal separating method as set forth in claim 38, in which said step (b) has the step of obtaining a first macroblock quantization parameter used for the quantization of each of said macroblocks contained in said original moving picture sequence signal to generate said macroblocks contained in said first coded moving picture sequence signal from said first coded moving picture sequence signal, and a second macroblock quantization parameter to be used for the inverse-quantization of each of said macroblocks contained in said second coded moving picture sequence signal from said second coded moving picture sequence signal, whereby said step (c3) has the step of computing a prediction error between said non-zero conversion first coefficient information and an estimated non-zero conversion first coefficient information on the basis of a ratio of said second macroblock quantization parameter to said first macroblock quantization parameter, and said second non-zero coefficient information.

40. A coded signal separating method as set forth in clam 39, in which said step (c) has the step of computing a variable length code to be assigned to said prediction error on the basis of a first quantization parameter derivation constant used to reconstruct said first macroblock quantization parameter from said second macroblock quantization parameter, and said prediction error.

41. A coded signal separating method as set forth in claim 37, in which said step (c2) has the step of scanning said zero conversion first coefficient information in a zigzag fashion to generate said differential zero coefficient information including combinations of run and level, said run being the number of consecutive zero-value coefficients, said level being the value of a non-zero value coefficient immediately followed by said consecutive zero-value coefficients whereby said step (c2) has the step of eliminating zero coefficients in said zero conversion first coefficient information to compress the amount of information in said differential zero coefficient information.

42. A coded signal separating method as set forth in claim 41, further having the step of storing a run table used to encode said runs to respective variable length codes, in which said step (c) further includes the steps of:

(c12) encoding said runs to variable length codes in accordance with said run table in consideration of the frequency of occurrences; and (c13) encoding said levels to variable length codes, by computing said variable length codes to be assigned to said levels on the basis of a first quantization parameter derivation constant used to reconstruct said first macroblock quantization parameter from said second macroblock quantization parameter.

43. A coded signal separating method as set forth in claim 37, further having the step of storing a plurality of tables each used to encode said respective differential zero coefficient information and said respective differential non-zero coefficient information to respective variable length codes, in which said step (c) further includes the steps of:

(c10) selecting a table from among said tables in response to said first quantization parameter derivation constants; and (c11) encoding said differential zero coefficient information and said differential non-zero coefficient information to variable length codes in accordance with said table selected in said step (c10).

44. A coded signal separating method as set forth in claim 35, in which said macroblock layer includes blocks consisting of encoded blocks and non-encoded blocks, and a coded block pattern indicating the positions of said respective encoded blocks and non-encoded blocks in said macroblock layer, said step (c) further includes the step of (c4) generating differential coded block patterns between said coded block patterns of said first coded moving picture sequence signal and said coded block patterns of said second coded moving picture sequence signal.

45. A coded signal separating method as set forth in claim 44, in which said step (c4) has the step of generating differential CBP value strings each indicating the positions of said encoded blocks and non-encoded blocks in said macroblock layer of said first coded moving picture sequence signal with respect to non-encoded blocks of said macroblock layer of said second coded moving picture sequence signal.

46. A coded signal separating method as set forth in claim 45, in which each of said macroblocks includes said blocks consisting of brightness blocks and color-difference blocks, said differential CBP value strings consisting of differential brightness CBP value strings and differential color-difference CBP value strings, said differential brightness CBP value strings each indicating the positions of said encoded brightness blocks and non-encoded brightness blocks in said respective macroblock layer of said first coded moving picture sequence signal with respect to non-encoded brightness blocks in said respective macroblock layer of said second coded moving picture sequence signal, differential color-difference CBP value strings each indicating the positions of said encoded color-difference blocks and non-encoded color-difference blocks in said respective macroblock layer of said first coded moving picture sequence signal with respect to non-encoded color-difference blocks in said respective macroblock layer of said second coded moving picture sequence signal, which further has the step of storing a plurality of brightness tables each used to encode said differential brightness CBP value strings to respective variable length codes, and a plurality of color-difference tables each used to encode said differential color-difference CBP value strings to respective variable length codes, in which said step (c4) further includes the steps of:

(c41) counting the number of said unnecessary brightness blocks and the number of said unnecessary color-difference blocks in said macroblock of said second coded moving picture sequence signal;

(c42) selecting one brightness table from among said brightness tables in response to the number of said unnecessary brightness blocks counted in said step (c41), and encoding said differential brightness CBP value strings to variable length codes in accordance with said brightness table thus selected; and (c43) selecting one color-difference table from among said color-difference tables in response to the number of said unnecessary differential color-difference blocks counted in said step (c41), and encoding said differential color-difference CBP value strings to variable length codes in accordance with said color-difference table thus selected.

47. A coded signal separating method as set forth in claim 35, in which said macroblock layer contains macroblock attribute information including a macroblock address indicating the position of said macroblock, and a macroblock address increment, i.e., MBAI indicating the number of said macroblock addresses to be skipped, said step (c) further includes the steps of:

(c5) generating macroblocks of said differential coded moving picture sequence signal being differences between said macroblocks of said first coded moving picture sequence signal and said macroblocks of said second coded moving picture sequence signal with respect to said respective macroblock addresses so as to eliminate macroblocks remained unchanged between said first coded moving picture sequence signal and said second coded moving picture sequence signal with respect to said respective macroblock addresses; and (c6) generating said MBAIs of said macroblock attribute infonnation of said differential coded moving picture sequence signal, said MBAIs of said differential coded moving picture sequence signal indicates the number of macroblock addresses of said macroblocks eliminated in said step (c5) with respect to said macroblocks of said differential coded moving picture sequence signal generated in said step (c5) so that said macroblocks of said differential coded moving picture sequence signal correspond to said macroblocks of said first coded moving picture sequence signal and said macroblocks of said second coded moving picture sequence signal with respect to said respective macroblock addresses.

48. A coded signal separating method as set forth in claim 35, in which said step (b) has the step of inversely quantizing each of said macroblocks contained in said first coded moving picture sequence signal in accordance with said first macroblock quantization parameter to reconstruct said original moving picture sequence signal, and quantize each of said macroblocks of said reconstructed original moving picture sequence signal in accordance with said second macroblock quantization parameter to generate said second coded moving picture sequence signal; and said step (c) includes the step of (c7) generating macroblock quantization parameter reconstruction information used to reconstruct said first macroblock quantization parameter.

49. A coded signal separating method as set forth in claim 40, in which said step (c7) has the step of generating said macroblock quantization parameter reconstruction information on the basis of a first quantization parameter derivation constant used to reconstruct said first macroblock quantization parameter from said second macroblock quantization parameter.

50. A coded signal separating method as set forth in claim 49, in which said step (c7) has the step of generating said macroblock quanitization parameter reconstruction information on the basis of a difference between said first quanitization parameter derivation constant and previously generated macroblock quanitization parameter reconstruction information of said macroblocks of said differential coded moving picture sequence signal.

51. A coded signal separating method as set forth in claim 50, in which said step (c7) has the step of computing variable length codes to be assigned to said macroblock quantization parameter reconstruction information in accordance with the absolute value of said macroblock quantization parameter reconstruction information.

52. A coded signal separating method as set forth in claim 35, in which said step (b) has the step of converting each of said macroblocks contained in said first coded moving picture sequence signal on the basis of the ratio of said first macroblock quantization parameter to said second macroblock quantization parameter to generate said second coded moving picture sequence signal; and said step (c) includes the step of (c7) generating macroblock quantization parameter reconstruction information used to reconstruct said first macroblock quantization parameter.

53. A coded signal separating method as set forth in claim 31, in which
said step (b) has the step of inversely quatizing each of said macroblocks contained in said slice layers of said first coded moving picture sequence signal in accordance with a first slice quantization parameter used for the quantization of each of said macroblocks contained in said slice layers of said original moving picture sequence signal to reconstruct said original moving picture sequence signal, and quantize each of said macroblocks in said slice layers of said reconstructed original moving picture sequence signal in accordance with a second slice quantization parameter used for the inverse-quantization of each of said macroblocks contained in said slice layers of said second code moving picture sequence signal to generate said second coded moving picture sequence signal; and
said step (c) further includes the step of (c8) generating slice quantization parameter reconstruction information used to reconstruct said first slice quantization parameter.

54. A coded signal separating method as set forth in claim 53, in which said step (c8) has the step of generating said slice quantization parameter reconstruction information on the basis of a first slice quantization parameter derivation constant used to reconstruct said first slice quantization parameter from said second slice quantization parameter.

55. A coded signal separating method as set forth in claim 35, in which
said step (b) has the step of converting each of said macroblocks contained in said slice layers of said first coded moving picture sequence signal on the basis of the ratio of said first slice quantization parameter to said second slice quantization parameter to generate said second coded moving picture sequence signal; and
said step (c) further includes the step of (c8) generating slice quantization parameter reconstruction information used to reconstruct said first slice quantization parameter.

56. A coded signal separating method as set forth in claim 35, in which said step (c) has the step of (c9) obtaining VBV_Delay information indicative of the capacity of VBV buffer from said first coded moving picture sequence signal and attaching said VBV_Delay information to said differential coded moving picture sequence signal.

57. A coded signal separating method as set forth in claim 35, in which each of said sequence layers includes a sequence header indicative of the start of said sequence layer, said step (c) includes the step of (c14) attaching said sequence headers to said respective sequence layers of said differential coded moving picture sequence signal.

58. A coded signal separating method as set forth in claim 35, in which said first coded moving picture sequence signal is to be transmitted at a first bit rate, said step (c) includes the step of (c15) generating first bit rate information indicative of said first bit rate and attaching said first bit rate information to said differential coded moving picture sequence signal.

59. A coded signal separating method as set forth in claim 58, in which said step (c15) has the step of generating said first bit rate information on the basis of the value of said first bit rate divided by 400 and attaching said first bit rate information to said differential coded moving picture sequence signal.

60. A differential coded signal generating method of inputting a first coded moving picture sequence signal and a second coded moving picture sequence signal to generate a differential coded moving picture sequence signal, said second coded moving picture sequence signal being generated as a result of transcoding said first coded moving picture sequence signal, said differential coded moving picture sequence signal being a difference between said first coded moving picture sequence signal and said second coded moving picture sequence signal, comprising the steps of:

(d) inputting said first coded moving picture sequence signal therethrough, said first coded moving picture sequence signal generated as a result of encoding original moving picture sequence signal and consisting of a series of first picture information having first coefficient information, said first coefficient information including a matrix of first coefficients;

(e) inputting said second coded moving picture sequence signal therethrough, said second coded moving picture sequence signal consisting of a series of second picture information having second coefficient information, said second coefficient information including a matrix of second coefficients; and (f) generating said differential coded moving picture sequence signal, whereby said step (f) has the step of generating said differential coded moving picture sequence signal on the basis of said first coefficient information obtained from said series of first picture information of said first coded moving picture sequence signal, and said second coefficient information obtained from said series of second picture information of said second coded moving picture sequence signal.

61. A coded signal merging method of inputting a second coded moving picture sequence signal and a differential coded moving picture sequence signal to reconstruct a first coded moving picture sequence signal, said differential coded moving picture sequence signal being a difference between said first coded moving picture sequence signal and said second coded moving picture sequence signal, comprising the steps of:

(g) inputting said second coded moving picture sequence signal therethrough, said second coded moving picture sequence signal generated as a result of transcoding said first coded moving picture sequence signal and consisting of a series of second picture information having second coefficient information, said second coefficient information including a matrix of second coefficients, said first coded moving picture sequence signal generated as a result of encoding original moving picture sequence signal and consisting of a series of first picture information having first coefficient information, said first coefficient information including a matrix of first coefficients;

(h) inputting said differential coded moving picture sequence signal therethrough, said differential coded moving picture sequence including differential coefficient information between said first coefficient information and said second coefficient information, each of said original moving picture sequence signal, said first coded moving picture sequence signal, said second coded moving picture sequence signal, and said differential coded moving picture sequence signal is in the form of a hierarchical structure including one or more sequence layers each having a plurality of screens sharing common information, one or more picture layers each having a plurality of slices sharing common information with respect to one of said screens, one or more slice layers each having a plurality of macroblocks with respect to one of said slices, one or more macroblock layers each having a plurality of blocks with respect to one of said macroblocks, and one or more block layers each having block information with respect to one of said blocks; and (i) reconstructing said first coded moving picture sequence signal from said second coded moving picture sequence signal inputted in said step (g) and said differential coded moving picture sequence signal inputted in said step (h), whereby said step (i) has the step of reconstructing said first coded moving picture sequence signal on the basis of said second coefficient information obtained from said series of second picture information of said second coded moving picture sequence signal, and said differential coefficient information obtained in said step (h).

62. A coded signal merging method as set forth in claim 61, in which said second coefficient information includes second zero coefficient information consisting of zero coefficients and second non-zero coefficient information consisting of non-zero coefficients, said first coefficient information includes zero conversion first coefficient information consisting of zero conversion first coefficients to be converted to said zero coefficients, and non-zero conversion first coefficient information consisting of non-zero conversion first coefficients to be converted to said non-zero coefficients, said step (i) further includes the steps of:

(i1) reconstructing said zero conversion first coefficients on the basis of said second zero coefficient information of said second coded moving picture sequence signal and said differential coefficient information of said differential coded moving picture sequence signal;

(i2) reconstructing said non-zero conversion first coefficients on the basis of said second non-zero coefficient information of said second coded moving picture sequence signal and said differential coefficient information of said differential coded moving picture sequence signal; and (i3) merging said zero conversion first coefficients information reconstructed in said step (i1) and non-zero conversion first coefficient information reconstructed in said step (i2) to reconstruct said first coefficient information.

63. A coded signal merging method as set forth in claim 61, in which each of said macroblock layers of said first coded moving picture sequence signal and said second coded moving picture sequence signal includes blocks consisting of encoded blocks and non-encoded blocks, and a coded block pattern indicating the positions of said respective encoded blocks and non-encoded blocks in said macroblock layer, each of said macroblock layers of differential coded moving picture sequence signal includes a differential coded block pattern being a difference between said coded block patterns of respective macroblock layers of said first coded moving picture sequence signal and said second coded moving picture sequence signal, said step (i) includes the step of (i31) reconstructing said coded block patterns of said macroblock layers of said first coded moving picture sequence signal on the basis of said differential coded block patterns of said differential coded moving picture sequence signal.

64. A coded signal merging method as set forth in claim 61, in which said first coded moving picture sequence signal includes a first macroblock quantization parameter used for the quantization of each of said macroblocks contained in said original moving picture sequence signal, said second coded moving picture sequence signal includes a second macroblock quantization parameter to be used for the inverse-quantization of each of said macroblocks contained in said second coded moving picture sequence signal, said step (i) has the step of (i32) reconstructing said first macroblock quantization parameter reconstruction information used to reconstruct said first macroblock quantization parameter from said differential coded moving picture sequence signal to reconstruct said first macroblock quantization parameter.

65. A coded signal merging method as set forth in claim 61, in which said first coded moving picture sequence signal includes a first slice quantization parameter used for the quantization of each of said macroblocks contained in said slice layer of said original moving picture sequence signal, said second coded moving picture sequence signal includes a second slice quantization parameter to be used for the inverse-quantization of each of said macroblocks contained in said slice layer of said second coded moving picture sequence signal, said step (i) includes the step of (i33) reconstructing said first slice quantization parameter reconstruction information used to reconstruct said first slice quantization parameter from said differential coded moving picture sequence signal to reconstruct said first slice quantization parameter.

66. A coded signal merging method as set forth in claim 61, in which said step (i) includes the step of (i34) obtaining information indicative of the capacity of VBV buffer from said differential coded moving picture sequence signal and attach said information to said first coded moving picture sequence signal.

67. A coded signal merging method as set forth in claim 61, in which said first coded moving picture sequence signal is to be transmitted at a first bit rate, said differential coded moving picture sequence signal includes first bit rate information indicative of said first bit rate, said step (i) includes the step of (i4) obtaining said first bit rate information from said differential coded moving picture sequence signal to reconstruct said first coded moving picture sequence signal at said first bit rate.

68. A coded signal separating and merging method comprising the steps of:

(j) transcoding a first coded moving picture sequence signal to generate a second coded moving picture sequence signal and a differential coded moving picture sequence signal being a difference between said first coded moving picture sequence signal and said second coded moving picture sequence signal; and (k) inputting said second coded moving picture sequence signal and said differential coded moving picture sequence signal to reconstruct said first coded moving picture sequence signal, said step (j) further including the steps of:

(j1) inputting said first coded moving picture sequence signal therethrough;

(j2) converting said first coded moving picture sequence signal inputted through said step (j1) to generate said second coded moving picture sequence signal;

(j3) generating said differential coded moving picture sequence signal from said first coded moving picture sequence signal inputted in said step (j1) and said second coded moving picture sequence signal generated in said step (j2);

(j4) outputting said second coded moving picture sequence signal generated in said step (j2); and (j5) outputting said differential coded moving picture sequence signal generated in said step (j3);

said step (k) including the steps of:

(k1) inputting said second coded moving picture sequence signal therethrough;

(k2) inputting said differential coded moving picture sequence signal therethrough;

(k3) reconstructing said first coded moving picture sequence signal from said second coded moving picture sequence signal inputted in said step (k1) and said differential coded moving picture sequence signal inputted in said step (k2); and (k4) outputting said first coded moving picture sequence signal reconstructed in said step (k3).

69. A computer program product comprising a computer usable storage medium having computer readable code embodied therein for transcoding a first coded moving picture sequence signal to generate a second coded moving picture sequence signal and a differential coded moving picture sequence signal being a difference between said first coded moving picture sequence signal and said second coded moving picture sequence signal, said computer readable code comprising:

(a) computer readable program code for inputting said first coded moving picture sequence signal therethrough, said first coded moving picture sequence signal generated as a result of encoding original moving picture sequence signal and consisting of a series of first picture information having first coefficient information, said first coefficient information including a matrix of first coefficients;

(b) computer readable program code for converting said first coded moving picture sequence signal inputted by said computer readable program code (a) to generate said second coded moving picture sequence signal, said second coded moving picture sequence signal consisting of a series of second picture information having second coefficient information, said second coefficient information including a matrix of second coefficients, each of said original moving picture sequence signal, said first coded moving picture sequence signal, and said second coded moving picture sequence signal is in the form of a hierarchical structure including one or more sequence layers each having a plurality of screens sharing common information, one or more picture layers each having a plurality of slices sharing common information with respect to one of said screens, one or more slice layers each having a plurality of macroblocks with respect to one of said slices, one or more macroblock layers each having a plurality of blocks with respect to one of said macroblocks, and one or more block layers each having block information with respect to one of said blocks; and (c) computer readable program code for generating said differential coded moving picture sequence signal in response to said first coded moving picture sequence signal and said second coded moving picture sequence signal inputted by said computer readable program code (b), whereby said computer readable program code (c) has the computer readable program code for generating said differential coded moving picture sequence signal on the basis of said first coefficient information obtained from said series of said first picture information of said first coded moving picture sequence signal, and said second coefficient information obtained from said series of said second picture information of said second coded moving picture sequence signal.

70. A computer program product as set forth in claim 69, in which said computer readable program code (c) has the computer readable program code for generating said differential coded moving picture sequence signal in the form of said hierarchical structure.

71. A computer program product as set forth in claim 69, in which said second coefficient information includes second zero coefficient information consisting of zero coefficients and second non-zero coefficient information consisting of non-zero coefficients, said first coefficient information includes zero conversion first coefficient information consisting of zero conversion first coefficients to be converted to said zero coefficients by said computer readable program code (b), and non-zero conversion first coefficient information consisting of non-zero conversion first coefficients to be converted to said non-zero coefficients by said computer readable program code (b), said computer readable program code (c) further includes:

(c1) computer readable program code for separating said zero conversion first coefficient information and said second zero coefficient information from said non-zero conversion first coefficient information and said second non-zero coefficient information, respectively;

(c2) computer readable program code for extracting differential information between said zero conversion first coefficient information and said second zero coefficient information separated by said computer readable program code (c1) to generate differential zero coefficient information; and (c3) computer readable program code for extracting differential information between said non-zero conversion first coefficient information and said second non-zero coefficient information separated by said computer readable program code (c1) to generate differential non-zero coefficient information.

72. A computer program product as set forth in claim 71, in which said computer readable program code (c3) has the computer readable program code for generating said differential non-zero coefficient information on the basis of the values of said first coefficients of said non-zero conversion first coefficient information and the values of said second coefficients of said second non-zero coefficient information.

73. A computer program product as set forth in claim 72, in which said computer readable program code (b) has the computer readable program code for obtaining a first macroblock quantization parameter used for the quantization of each of said macroblocks contained in said original moving picture sequence signal to generate said macroblocks contained in said first coded moving picture sequence signal from said first coded moving picture sequence signal, and a second macroblock quantization parameter to be used for the inverse-quantization of each of said macroblocks contained in said second coded moving picture sequence signal from said second coded moving picture sequence signal, whereby said computer readable program code (c3) has the computer readable program code for computing a prediction error between said non-zero conversion first coefficient information and an estimated non-zero conversion first coefficient information on the basis of a ratio of said second macroblock quantization parameter to said first macroblock quantization parameter, and said second non-zero coefficient information.

74. A computer program product as set forth in clam 73, in which said computer readable program code (c) has the computer readable program code for computing a variable length code to be assigned to said prediction error on the basis of a first quantization parameter derivation constant used to reconstruct said first macroblock quantization parameter from said second macroblock quantization parameter, and said prediction error.

75. A computer program product as set forth in claim 60, in which said computer readable program code (c2) has the computer readable program code for scanning said zero conversion first coefficient information in a zigzag fashion to generate said differential zero coefficient information including combinations of run and level, said run being the number of consecutive zero-value coefficients, said level being the value of a non-zero value coefficient immediately followed by said consecutive zero-value coefficients whereby said computer readable program code (c2) has the computer readable program code for eliminating zero coefficients in said zero conversion first coefficient information to compress the amount of information in said differential zero coefficient information.

76. A computer program product as set forth in claim 75, further having the computer readable program code for storing a run table used to encode said runs to respective variable length codes, in which said computer readable program code (c) further includes:
  (c12) computer readable program code for encoding said runs to variable length codes in accordance with said run table in consideration of the frequency of occurrences; and
  (c13) computer readable program code for encoding said levels to variable length codes, by computing said variable length codes to be assigned to said levels on the basis of a first quantization parameter derivation constant used to reconstruct said first macroblock quantization parameter from said second macroblock quantization parameter.

77. A computer program product as set forth in claim 71, further having the computer readable program code for storing a plurality of tables each used to encode said respective differential zero coefficient information and said respective differential non-zero coefficient information to respective variable length codes, said computer readable program code (c) further includes:
  (c10) computer readable program code for selecting a table from among said tables in response to said first quantization parameter derivation constants; and
  (c11) computer readable program code for encoding said differential zero coefficient information and said differential non-zero coefficient information to variable length codes in accordance with said table selected by said computer readable program code (c10).

78. A computer program product as set forth in claim 69, in which said macroblock layer includes blocks consisting of encoded blocks and non-encoded blocks, and a coded block pattern indicating the positions of said respective encoded blocks and non-encoded blocks in said macroblock layer, said computer readable program code (c) further includes (c4) computer readable program code for generating differential coded block patterns between said coded block patterns of said first coded moving picture sequence signal and said coded block patterns of said second coded moving picture sequence signal.

79. A computer program product as set forth in claim 78, in which said computer readable program code (c4) has the computer readable program code for generating differential CBP value strings each indicating the positions of said encoded blocks and non-encoded blocks in said macroblock layer of said first coded moving picture sequence signal with respect to non-encoded blocks of said macroblock layer of said second coded moving picture sequence signal.

80. A computer program product as set forth in claim 79, in which each of said macroblocks includes said blocks consisting of brightness blocks and color-difference blocks, said differential CBP value strings consisting of differential brightness CBP value strings and differential color-difference CBP value strings, said differential brightness CBP value strings each indicating the positions of said encoded brightness blocks and non-encoded brightness blocks in said respective macroblock layer of said first coded moving picture sequence signal with respect to non-encoded brightness blocks in said respective macroblock layer of said second coded moving picture sequence signal, differential color-difference CBP value strings each indicating the positions of said encoded color-difference blocks and non-encoded color-difference blocks in said respective macroblock layer of said first coded moving picture sequence signal with respect to non-encoded color-difference blocks in said respective macroblock layer of said second coded moving picture sequence signal, which further has the computer readable program product for storing a plurality of brightness tables each used to encode said differential brightness CBP value strings to respective variable length codes, and a plurality of color-difference tables each used to encode said differential color-difference CBP value strings to respective variable length codes, in which said computer readable program code (c4) further includes:
  (c41) computer readable program code for counting the number of said unnecessary brightness blocks and the number of said unnecessary color-difference blocks in said macroblock of said second coded moving picture sequence signal;
  (c42) computer readable program code for selecting a brightness table from among said brightness tables in response to the number of said unnecessary brightness blocks counted by said computer readable program code (c41), and encoding said differential brightness CBP value strings to variable length codes in accordance with said brightness table; and
  (c43) computer readable program code for selecting a color-difference table from among said color-difference tables in response to the number of said unnecessary differential color-difference blocks counted by said computer readable program code (c41), and encoding said differential color-difference CBP value strings to variable length codes in accordance with said color-difference table.

81. A computer program as set forth in claim 69, in which said macroblock layer contains macroblock attribute information including a macroblock address indicating the position of said macroblock, and a macroblock address increment, i.e., MBAI indicating the number of said macroblock addresses to be skipped, said computer readable program code (c) further includes:
  (c5) computer readable program code for generating macroblocks of said differential coded moving picture sequence signal being differences between said macroblocks of said first coded moving picture sequence signal and said macroblocks of said second coded moving picture sequence signal with respect to said respective macroblock addresses so as to eliminate macroblocks remained unchanged between said first coded moving picture sequence signal and said second coded moving picture sequence signal with respect to said respective macroblock addresses; and (c6) computer readable program code for generating said MBAIs of said macroblock attribute information of said differential coded moving picture sequence signal, said MBAIs of said differential coded moving picture sequence signal indicates the number of macroblock addresses of said macroblocks eliminated by said computer readable program code (c5) with respect to said macroblocks of said differential coded moving picture sequence signal generated by said computer readable program code (c5) so that said macroblocks of said differential coded moving picture sequence signal correspond to said macroblocks of said first coded moving picture sequence signal and said macroblocks of said second coded moving picture sequence signal with respect to said respective macroblock addresses.

82. A computer program product as set forth in claim 69, in which
said computer readable program code (b) has the computer readable program code for inversely quantizing each of said macroblocks contained in said first coded moving picture sequence signal in accordance with said first macroblock quantization parameter to reconstruct said original moving picture sequence signal, and quantize each of said macroblocks of said reconstructed original moving picture sequence signal in accordance with said second macroblock quantization parameter to generate said second coded moving picture sequence signal; and
said computer readable program code (c) includes (c7) computer readable program code for generating macroblock quantization parameter reconstruction information used to reconstruct said first macroblock quantization parameter.

83. A computer program product as set forth in claim 82, in which said computer readable program code (c7) has the computer readable program code for generating said macroblock quantization parameter reconstruction information on the basis of a first quantization parameter derivation constant used to reconstruct said first macroblock quantization parameter from said second macroblock quantization parameter.

84. A computer program product as set forth in claim 83, in which said computer readable program code (c7) has the computer readable program code for generating said macroblock quantization parameter reconstruction information on the basis of a difference between said first quantization parameter derivation constant and previously generated macroblock quantization parameter reconstruction information of said macroblocks of said differential coded moving picture sequence signal.

85. A computer program product as set forth in claim 84, in which said computer readable program code (c7) has the computer readable program code for computing variable length codes to be assigned to said macroblock quantization parameter reconstruction information in accordance with the absolute value of said macroblock quantization parameter reconstruction information.

86. A computer program product as set forth in claim 69, in which
said computer readable program code (b) has the computer readable program code for converting each of said macroblocks contained in said first coded moving picture sequence signal on the basis of the ratio of said first macroblock quantization parameter to said second macroblock quantization parameter to generate said second coded moving picture sequence signal; and
said computer readable program code (c) includes (c7) computer readable program code for generating macroblock quantization parameter reconstruction information used to reconstruct said first macroblock quantization parameter.

87. A computer program product as set forth in claim 69, in which
said computer readable program code (b) has the computer readable program code for inversely quantizing each of said macroblocks contained in said slice layers of said first coded moving picture sequence signal in accordance with a first slice quantization parameter used for the quantization of each of said macroblocks contained in said slice layers of said original moving picture sequence signal to reconstruct said original moving picture sequence signal, and quantize each of said macroblocks in said slice layers of said reconstructed original moving picture sequence signal in accordance with a second slice quantization parameter used for the inverse-quantization of each of said macroblocks contained in said slice layers of said second coded moving picture sequence signal to generate said second coded moving picture sequence signal; and
said computer readable program code (c) further includes (c8) computer readable program code for generating slice quantization parameter reconstruction information used to reconstruct said first slice quantization parameter.

88. A computer program product as set forth in claim 87, in which said computer readable program code (c8) has the computer readable program code for generating said slice quantization parameter reconstruction information on the basis of a first slice quantization parameter derivation constant used to reconstruct said first slice quantization parameter from said second slice quantization parameter.

89. A computer program product as set forth in claim 69, in which
said computer readable program code (b) has the computer readable program code for converting each of said macroblocks contained in said slice layers of said first coded moving picture sequence signal on the basis of the ratio of said first slice quantization parameter to said second slice quantization parameter to generate said second coded moving picture sequence signal; and
said computer readable program code (c) further includes (c8) computer readable program code for generating slice quantization parameter reconstruction information used to reconstruct said first slice quantization parameter.

90. A computer program product as set forth in claim 69, in which said computer readable program code (c) has (c9) computer readable program code for obtaining VBV_Delay information indicative of the capacity of VBV buffer from said first coded moving picture sequence signal and attaching said VBV_Delay information to said differential coded moving picture sequence signal.

91. A computer program product as set forth in claim 69, in which each of said sequence layers includes a sequence header indicative of the start of said sequence layer, said computer readable program code (c) includes (c14) computer readable program code for attaching said sequence headers to said respective sequence layers of said differential coded moving picture sequence signal.

92. A computer program product as set forth in claim 69, in which said first coded moving picture sequence signal is to be transmitted at a first bit rate, said computer readable program code (c) includes (c15) computer readable program code for generating first bit rate information indicative of said first bit rate and attaching said first bit rate information to said differential coded moving picture sequence signal.

93. A computer program product as set forth in claim 92, in which said computer readable program code (c15) has the computer readable program code for generating said first bit rate information on the basis of the value of said first bit rate divided by 400 and attaching said first bit rate information to said differential coded moving picture sequence signal.

94. A computer program product comprising a computer usable storage medium having computer readable code embodied therein for inputting a first coded moving picture sequence signal and a second coded moving picture sequence signal to generate a differential coded moving picture sequence signal, said second coded moving picture sequence signal being generated as a result of transcoding said first coded moving picture sequence signal, said differential coded moving picture sequence signal being a difference between said first coded moving picture sequence signal and said second coded moving picture sequence signal, comprising:
- (d) computer readable program code for inputting said first coded moving picture sequence signal therethrough, said first coded moving picture sequence signal generated as a result of encoding original moving picture sequence signal and consisting of a series of first picture information having first coefficient information, said first coefficient information including a matrix of first coefficients;
- (e) computer readable program code for inputting said second coded moving picture sequence signal therethrough, said second coded moving picture sequence signal consisting of a series of second picture information having second coefficient information, said second coefficient information including a matrix of second coefficients; and
- (f) computer readable program code for generating said differential coded moving picture sequence signal,
- whereby said computer readable program code (f) has the computer readable program code for generating said differential coded moving picture sequence signal on the basis of said first coefficient information obtained from said series of first picture information of said first coded moving picture sequence signal, and said second coefficient information obtained from said series of second picture information of said second coded moving picture sequence signal.

95. A computer program product comprising a computer usable storage medium having computer readable code embodied therein for inputting a second coded moving picture sequence signal and a differential coded moving picture sequence signal to reconstruct a first coded moving picture sequence signal, said differential coded moving picture sequence signal being a difference between said first coded moving picture sequence signal and said second coded moving picture sequence signal, comprising:
- (g) computer readable program code for inputting said second coded moving picture sequence signal therethrough, said second coded moving picture sequence signal generated as a result of transcoding said first coded moving picture sequence signal and consisting of a series of second picture information having second coefficient information, said second coefficient information including a matrix of second coefficients, said first coded moving picture sequence signal generated as a result of encoding original moving picture sequence signal and consisting of a series of first picture information having first coefficient information, said first coefficient information including a matrix of first coefficients;
- (h) computer readable program code for inputting said differential coded moving picture sequence signal therethrough, said differential coded moving picture sequence including differential coefficient information between said first coefficient information and said second coefficient information, each of said original moving picture sequence signal, said first coded moving picture sequence signal, said second coded moving picture sequence signal, and said differential coded moving picture sequence signal is in the form of a hierarchical structure including one or more sequence layers each having a plurality of screens sharing common information, one or more picture layers each having a plurality of slices sharing common information with respect to one of said screens, one or more slice layers each having a plurality of macroblocks with respect to one of said slices, one or more macroblock layers each having a plurality of blocks with respect to one of said macroblocks, and one or more block layers each having block information with respect to one of said blocks; and
- (i) computer readable program code for reconstructing said first coded moving picture sequence signal from said second coded moving picture sequence signal inputted by said computer readable program code (g) and said differential coded moving picture sequence signal inputted by said computer readable program code (h),
- whereby said computer readable program code (i) has the computer readable program code for reconstructing said first coded moving picture sequence signal on the basis of said second coefficient information obtained from said series of second picture information of said second coded moving picture sequence signal, and said differential coefficient information obtained by said computer readable program code (h).

96. A computer program product as set forth in claim 95, in which said second coefficient information includes second zero coefficient information consisting of zero coefficients and second non-zero coefficient information consisting of non-zero coefficients, said first coefficient information includes zero conversion first coefficient information consisting of zero conversion first coefficients to be converted to said zero coefficients, and non-zero conversion first coefficient information consisting of non-zero conversion first coefficients to be converted to said non-zero coefficients, said computer readable program code (i) further includes:
- (i1) computer readable program code for reconstructing said zero conversion first coefficients on the basis of said second zero coefficient information of said second coded moving picture sequence signal and said differential coefficient information of said differential coded moving picture sequence signal;
- (i2) computer readable program code for reconstructing said non-zero conversion first coefficients on the basis of said second non-zero coefficient information of said second coded moving picture sequence signal and said differential coefficient information of said differential coded moving picture sequence signal; and
- (i3) computer readable program code for merging said zero conversion first coefficients information reconstructed by said computer readable program code (i1) and non-zero conversion first coefficient information reconstructed by said computer readable program code (i2) to reconstruct said first coefficient information.

97. A computer program product as set forth in claim 95, in which each of said macroblock layers of said first coded moving picture sequence signal and said second coded moving picture sequence signal includes blocks consisting of encoded blocks and non-encoded blocks, and a coded block pattern indicating the positions of said respective encoded blocks and non-encoded blocks in said macroblock layer, each of said macroblock layers of differential coded moving picture sequence signal includes a differential coded block pattern being a difference between said coded block patterns of respective macroblock layers of said first coded moving picture sequence signal and said second coded moving picture sequence signal, said computer readable program code (i) includes (i31) computer readable program code for reconstructing said coded block patterns of said macroblock layers of said first coded moving picture sequence signal on the basis of said differential coded block patterns of said differential coded moving picture sequence signal.

98. A computer program product as set forth in claim 95, in which said first coded moving picture sequence signal includes a first macroblock quantization parameter used for the quantization of each of said macroblocks contained in said original moving picture sequence signal, said second coded moving picture sequence signal includes a second macroblock quantization parameter to be used for the inverse-quantization of each of said macroblocks contained in said second coded moving picture sequence signal, said computer readable program code (i) has (i32) computer readable program code for reconstructing said first macroblock quantization parameter reconstruction information used to reconstruct said first macroblock quantization parameter from said differential coded moving picture sequence signal to reconstruct said first macroblock quantization parameter.

99. A computer program product as set forth in claim 95, in which said first coded moving picture sequence signal includes a first slice quantization parameter used for the quantization of each of said macroblocks contained in said slice layer of said original moving picture sequence signal, said second coded moving picture sequence signal includes a second slice quantization parameter to be used for the inverse-quantization of each of said macroblocks contained in said slice layer of said second coded moving picture sequence signal, said computer readable program code (i) includes (i33) computer readable program code for reconstructing said first slice quantization parameter reconstruction information used to reconstruct said first slice quantization parameter from said differential coded moving picture sequence signal to reconstruct said first slice quantization parameter.

100. A computer program product as set forth in claim 95, in which said computer readable program code (i) includes (i34) computer readable program code for obtaining VBV_Delay information indicative of the capacity of VBV buffer from said differential coded moving picture sequence signal and attach said VBV_Delay information to said first coded moving picture sequence signal.

101. A computer program product as set forth in claim 84, in which said first coded moving picture sequence signal is to be transmitted at a first bit rate, said differential coded moving picture sequence signal includes first bit rate information indicative of said first bit rate, said computer readable program code (i) includes (i4) computer readable program code for obtaining said first bit rate information from said differentially coded moving picture sequence signal to reconstruct said first coded moving picture sequence signal at said first bit rate.

102. A computer program product comprising a computer usable storage medium having computer readable code embodied therein for separating and merging a coded signal comprising:

(j) computer readable program code for transcoding a first coded moving picture sequence signal to generate a second coded moving picture sequence signal and a differential coded moving picture sequence signal being a difference between said first coded moving picture sequence signal and said second coded moving picture sequence signal; and (k) computer readable program code for inputting said second coded moving picture sequence signal and said differential coded moving picture sequence signal to reconstruct said first coded moving picture sequence signal, said computer readable program code (j) further including:

(j1) computer readable program code for inputting said first coded moving picture sequence signal therethrough;

(j2) computer readable program code for converting said first coded moving picture sequence signal inputted through said computer readable program code (j1) to generate said second coded moving picture sequence signal;

(j3) computer readable program code for generating said differential coded moving picture sequence signal from said first coded moving picture sequence signal inputted by said computer readable program code (j1) and said second coded moving picture sequence signal generated by said computer readable program code (j2);

(j4) computer readable program code for outputting said second coded moving picture sequence signal generated by said computer readable program code (j2); and (j5) computer readable program code for outputting said differential coded moving picture sequence signal generated by said computer readable program code (j3);

said computer readable program code (k) including:

(k1) computer readable program code for inputting said second coded moving picture sequence signal therethrough;

(k2) computer readable program code for inputting said differential coded moving picture sequence signal therethrough;

(k3) computer readable program code for reconstructing said first coded moving picture sequence signal from said second coded moving picture sequence signal inputted by said computer readable program code (k1) and said differential coded moving picture sequence signal inputted by said computer readable program code (k2); and (k4) computer readable program code for outputting said first coded moving picture sequence signal reconstructed by said computer readable program code (k3).

* * * * *

UNITED STATES PATENT AND TRADEMARK OFFICE
CERTIFICATE OF CORRECTION

| | | |
|---|---|---|
| PATENT NO. | : 6,895,052 B2 | Page 1 of 1 |
| APPLICATION NO. | : 09/931038 | |
| DATED | : May 17, 2005 | |
| INVENTOR(S) | : Tsuyoshi Hanamura et al. | |

It is certified that error appears in the above-identified patent and that said Letters Patent is hereby corrected as shown below:

On the Title Page, Item (73) Assignee: Hideyoshi Tominaga and Media Glue Corporation:

Signed and Sealed this

Twenty-eighth Day of November, 2006

JON W. DUDAS
*Director of the United States Patent and Trademark Office*